United States Patent [19]

Denny

[11] Patent Number: 4,817,092
[45] Date of Patent: Mar. 28, 1989

[54] THRESHOLD ALARMS FOR PROCESSING ERRORS IN A MULTIPLEX COMMUNICATIONS SYSTEM

[75] Inventor: Luan J. Denny, Sunnyvale, Calif.

[73] Assignee: International Business Machines, Armonk, N.Y.

[21] Appl. No.: 105,063

[22] Filed: Oct. 5, 1987

[51] Int. Cl.$^4$ .............................................. H04B 3/46
[52] U.S. Cl. .......................................... 371/11; 371/8; 379/2
[58] Field of Search ...................... 371/11, 15, 16, 20, 371/22, 29, 8, 9, 10; 379/279, 284, 2; 324/73 R; 364/200, 900, 513

[56] References Cited

U.S. PATENT DOCUMENTS

| | | | |
|---|---|---|---|
| 3,409,877 | 11/1968 | Alterman et al. | 379/279 |
| 3,838,261 | 9/1974 | Rice et al. | 371/9 |
| 3,909,542 | 9/1975 | Wunluck et al. | 379/279 |
| 4,260,859 | 4/1981 | Aaroen | 379/22 |
| 4,365,247 | 12/1982 | Bargeton et al. | 371/8 |
| 4,595,982 | 7/1986 | Burt | 364/300 |
| 4,601,032 | 7/1986 | Robinson | 371/23 |
| 4,648,044 | 3/1987 | Hardy | 364/513 |
| 4,649,515 | 3/1987 | Thompson | 364/900 |
| 4,710,926 | 12/1987 | Brown et al. | 371/11 |
| 4,763,329 | 8/1988 | Green | 371/11 |

Primary Examiner—A. D. Pellinen
Assistant Examiner—Geoffrey S. Evans
Attorney, Agent, or Firm—L. Keith Stephens

[57] ABSTRACT

A method and apparatus for detecting and analyzing errors in a communications system is described. The method employs expert system techniques to isolate failures to specific field replaceable units and attempts to restore the failing unit to service, if the system will not be adversely affected, by removing it from service, resetting the resource and returning it to service if it passes retesting. The expert system techniques include detailed decision trees designed for each resource in the system. The decision trees also filter extraneous sources of errors from affecting the error analysis results.

17 Claims, 37 Drawing Sheets

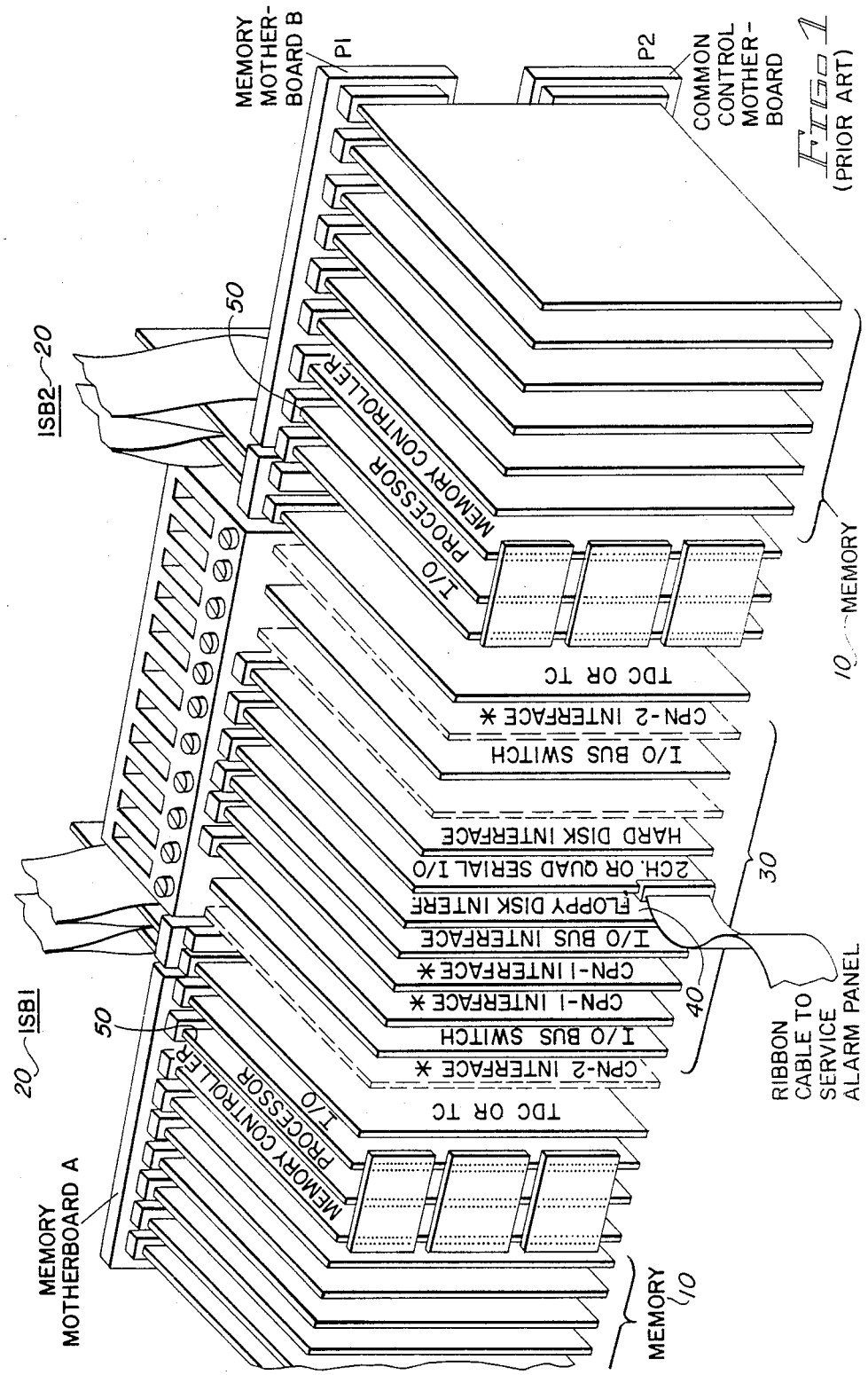

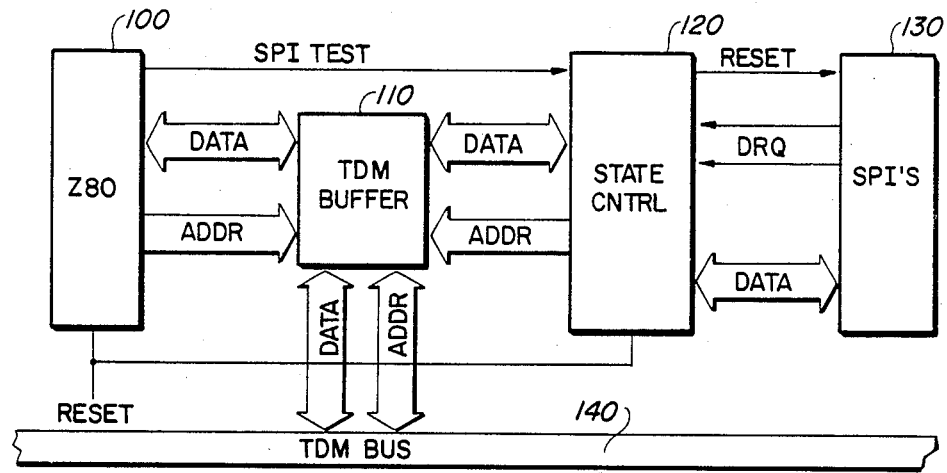

FIG-2

| PIN NUMBER | SIGNAL NAME | SOURCE | DESTINATION | FUNCTION |
|---|---|---|---|---|
| 1-9 | UNUSED | | | |
| 10 | DB0 $^{12}$ | CODER/ADC | DECODER/ADC | |
| 11 | DB2 $^{12}$ | CODER/ADC | DECODER/ADC | |
| 12 | DB4 $^{12}$ | CODER/ADC | DECODER/ADC | |
| 13 | DB6 $^{12}$ | CODER/ADC | DECODER/ADC | |
| 14 | DB8 $^{1}$ | CODER/ADC | DECODER/ADC | |
| 15 | DB10 $^{1}$ | CODER/ADC | DECODER/ADC | |
| 16 | DB12 $^{1}$ | CODER/ADC | DECODER/ADC | |
| 17 | DB14 $^{1}$ | CODER/ADC | DECODER/ADC | |
| 18 | UNUSED | | | |
| 19 | AB09 | EXPANDER | DECODER/ADC | CARD COMMAND-LSB |
| 20 | AB0-10 | EXPANDER | DECODER/ADC | CARD COMMAND |
| 21 | AB0-11 | EXPANDER | DECODER/ADC | CARD COMMAND |
| 22 | AB0-12 | EXPANDER | DECODER/ADC | CARD COMMAND |
| 23 | AB0-13 | EXPANDER | DECODER/ADC | CARD COMMAND-MSB |

FIG-3

| PIN NUMBER | SIGNAL NAME | SOURCE | DESTINATION | FUNCTION |
|---|---|---|---|---|
| 24 | DSG | TDM MB | DECODER/ADC | DIGITAL SIGNAL GND |
| 25 | SYN | EXPANDER | DECODER/ADC | NORMALIZE LINE |
| 26 | DSG | TDM MB | DECODER/ADC | DIGITAL SIGNAL GND |
| 27 | ENABLE | EXPANDER | DECODER/ADC | CARD ENABLE |
| 28 | DSG | TDM MB | DECODER/ADC | DIGITAL SIGNAL GND |
| 29 | DSG | TDM MB | DECODER/ADC | DIGITAL SIGNAL GND |
| 30 | +5V | TDM MB | ADC | IC +5V SUPPLY |
| 31-37 | UNUSED | | | |
| 38 | DCLK | EXPANDER | ADC | 4.608 MHz DATA CLOCK |
| 39 | DSG | TDM MB | ADC | DIGITAL SIGNAL GND |
| 40 | DB1 $^{12}$ | CODER/ADC | DECODER/ADC | |
| 41 | DB3 $^{12}$ | CODER/ADC | DECODER/ADC | |
| 42 | DB5 $^{12}$ | CODER/ADC | DECODER/ADC | |
| 43 | DB7 $^{12}$ | CODER/ADC | DECODER/ADC | |
| 44 | DB9 $^{1}$ | CODER/ADC | DECODER/ADC | |
| 45 | DB11 $^{1}$ | CODER/ADC | DECODER/ADC | |
| 46 | DB12 $^{1}$ | CODER/ADC | DECODER/ADC | |
| 47 | DB13 $^{1}$ | CODER/ADC | DECODER/ADC | |
| 48 | DSG | TDM MB | ADC | DIGITAL SIGNAL GND |
| 49 | AB1-9 | EXPANDER | DECODER/ADC | CARD COMMAND - LSB |
| 50 | AB1-10 | EXPANDER | DECODER/ADC | CARD COMMAND |
| 51 | AB1-11 | EXPANDER | DECODER/ADC | CARD COMMAND |
| 52 | AB1-12 | EXPANDER | DECODER/ADC | CARD COMMAND |
| 53 | AB1-13 | EXPANDER | DECODER/ADC | CARD COMMAND MSB |
| 54 | DSG | TDM MB | ADC | DIGITAL SIGNAL GND |
| 55 | UNUSED | | | |
| 56 | DSG | TDM MB | ADC | DIGITAL SIGNAL GND |

FIG. 4

| PIN NUMBER | SIGNAL NAME | SOURCE | DESTINATION | FUNCTION |
|---|---|---|---|---|
| 57 | UNUSED | | | |
| 58 | DSG | TDM MB | ADC | DIGITAL SIGNAL GND |
| 59 | DSG | TDM MB | ADC | DIGITAL SIGNAL GND |
| 60 | +5V | TDM MB | ADC | IC +5V SUPPLY |

FIG. 5

| ADDRESS BUS<br>0 123 4.56 789 | MNEMONIC | FUNCTION |
|---|---|---|
| 0 010 0.00 000 | X0ADC | TRANSMIT STIMULUS 1 |
| 0 010 0.00 001 | | UNUSED |
| 0 010 0.00 010 | X1ADC | TRANSMIT STIMULUS 1 μ-LAW |
| 0 010 0.00 011 | | UNUSED |
| 0 010 0.00 100 | X2ADC | TRANSMIT STIMULUS 2 |
| 0 010 0.00 101 | | UNUSED |
| 0 010 0.00 110 | X3ADC | TRANSMIT STIMULUS 2 μ-LAW |
| 0 010 0.00 111 | | UNUSED |
| 0 010 0.01 000 | X4ADC | TRANSMIT FIR OUTPUT |
| 0 010 0.01 001 | TDMW | TRANSMIT DIGITAL MILLIWATT |
| 0 010 0.01 010 | X5ADC | TRANSMIT FIR OUTPUT μ-LAW |
| 0 010 0.01 011 | TZSC | TRANSMIT Z80 STATUS BUS & CLEAR |
| 0 010 0.01 100 | TZS | TRANSMIT Z80 STATUS |
| 0 010 0.01 101 | TZD | TRANSMIT Z80 DATA |
| 0 010 0.01 110 | TZPD | TRANSMIT Z80 DATA PERMANENT |
| 0 010 0.01 111 | TZDCO | TRANSMIT Z80 DATA COUNT OUT |
| 0 010 0.10 000 | | RESERVED |
| 0 010 0.10 001 | TZDCI | TRANSMIT Z80 DATA COUNT IN |
| 0 010 0.10 010 | | RESERVED |
| 0 010 0.10 011 | | UNUSED |
| 0 010 0.10 100 | | RESERVED |
| 0 010 0.10 101 | | UNUSED |
| 0 010 0.10 110 | | RESERVED |

FIG. 7

| PIN NUMBER | SIGNAL NAME | SOURCE | DESTINATION | FUNCTION |
|---|---|---|---|---|
| 1 | ENABLE | EXPANDER | ADC | CARD ENABLE |
| 2-8 | UNUSED | | | |
| 9 | +5V | TDM MB | ADC | IC POWER SUPPLY |
| 10 | DSG | TDM MB | ADC | DIGITAL SIGNAL GND |
| 11-12 | UNUSED | | | |
| 13 | RESET | EXPANDER | ADC | CARD RESET |
| 14-18 | UNUSED | | | |
| 19 | +5V | TDM MB | ADC | IC POWER SUPPLY |
| 20 | DSG | TDM MB | ADC | DIGITAL SIGNAL GND |

*Fig. 6*

| ADDRESS BUS 0123 456 789 | MNEMONIC | FUNCTION |
|---|---|---|
| 0 010 0.10 111 | | UNUSED |
| 0 010 0.11 000 | TSPED0$^3$ | TRANSMIT SPEEK DATA 0 |
| 0 010 0.11 001 | TREJCMD | TRANSMIT REJECTED COMMAND |
| 0 010 0.11 010 | TSPEDI$^3$ | TRANSMIT SPEEK DATA 1 |
| 0 010 0.11 011 | | UNUSED |
| 0 010 0.11 100 | TSPED2$^3$ | TRANSMIT SPEEK DATA 2 |
| 0 010 0.11 101 | TPD | TRANSMIT PEEK DATA |
| 0 010 0.11 110 | TSPED3$^3$ | TRANSMIT SPEEK DATA 3 |
| 1 111 1.XX XXX | TCID | TRANSMIT CARD ID |

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| BUSY | X | X | X | X | X | X | X | CKSM | CRJT | X | X | X | DONE | WARM | COLD |

| ADDRESS BUS<br>0 123 4.56 789 | MNEMONIC | FUNCTION |
|---|---|---|
| 0 000 0.00 000 | ROADC | RECEIVE SAMPLE INPUT WORD 1 |
| 0 000 1.XX XXX | DOWN | COLD RESET TO CARD & REMOVE FROM TDM BUS |
| 0 000 0.00 010 | RIADC | RECEIVE SAMPLE INPUT WORD 2 |
| 0 001 1.XX XXX | UP | RETURN CARD TO TDM DATA BUS |
| 0 000 0.00 100 | | RESERVED |
| 0 000 0.00 101 | | UNUSED |
| 0 000 0.00 110 | | RESERVED |
| 0 000 0.00 111 | | UNUSED |
| 0 000 0.01 000 | | RESERVED |
| 0 000 0.01 001 | | UNUSED |
| 0 000 0.01 010 | | RESERVED |
| 0 000 0.01 011 | | UNUSED |
| 0 000 0.01 100 | | RESERVED |
| 0 000 0.01 101 | RZD | RECEIVE Z80 DATA IN |
| 0 000 0.01 110 | RZPD | RECEIVE Z80 DATA IN THE PERMANENT FIELD |
| 0 000 0.01 111 | RTESTN | RECEIVE TEST NUMBER |
| 0 000 0.10 000 | | RESERVED |
| 0 000 0.10 001 | WRST | WARM RESET |
| 0 000 0.10 010 | RSTR4 | RECEIVE SPI START |
| 0 000 0.10 011 | RSTOPT | RECEIVE STOP TEST |
| 0 000 0.10 100 | RSPEA0[45] | RECEIVE SPEEK ADDRESS 0 |
| 0 000 0.10 101 | LOADTBL[4] | LOAD TEST TABLE |

*FIG. 11*

| ADDRESS BUS<br>0 123 4.56 789 | MNEMONIC | FUNCTION |
|---|---|---|
| 0 000 0.10 110 | RSPOD0[4] | RECEIVE SPOKE DATA 0 |
| 0 000 0.10 111 |  | RESERVED |
| 0 000 0.11 000 | RSPOA0[4,5] | RECEIVE SPOKE ADDRESS 0 |
| 0 000 0.11 001 | RUSA | RECEIVE USER SUBROUTINE ADDRESS |
| 0 000 0.11 010 | RSPOD1[4] | RECEIVE SPOKE DATA 1 |
| 0 000 0.11 011 | RPD | RECEIVE POKE DATA |
| 0 000 0.11 100 | RSPOD2[4] | RECEIVE SPOKE DATA 2 |
| 0 000 0.11 101 | RPA | RECEIVE PEEK/POKE ADDRESS |
| 0 000 0.11 110 | RSPOD3[4] | RECEIVE SPOKE DATA 3 |
| 0 000 0.11 111 |  | RESERVED |

FIG-12

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| X | X | X | X | X | X | X | X | X | X | X | X | X | X | X | X |

FIG-13

| ANALOG INPUT/OUTPUT VOLTAGE | DATA BUS |||||||||||||||| 
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| +FULL SCALE | 1 | 0 | 0 | 0 | 0 | 0 | 0 | 0 | X | X | X | X | X | X | X | X |
| +1 LSB | 1 | 1 | 1 | 1 | 1 | 1 | 1 | 0 | X | X | X | X | X | X | X | X |
| +0 LSB (+ZERO) | 1 | 1 | 1 | 1 | 1 | 1 | 1 | 1 | X | X | X | X | X | X | X | X |
| -0 LSB (-ZERO) | 0 | 1 | 1 | 1 | 1 | 1 | 1 | 1 | X | X | X | X | X | X | X | X |
| -1 LSB | 0 | 1 | 1 | 1 | 1 | 1 | 1 | 0 | X | X | X | X | X | X | X | X |
| -FULL SCALE | 0 | 0 | 0 | 0 | 0 | 0 | 0 | 0 | X | X | X | X | X | X | X | X |

FIG-14

| ANALOG INPUT/OUTPUT VOLTAGE | DATA BUS |
|---|---|
| | 0 1 2 3 4 5 6 7 8 9 10 11 12 13 14 15 |
| +FULL SCALE | 0 1 1 1 1 1 1 1 1 1 1 1 X X X X |
| +1 LSB | 0 0 0 0 0 0 0 0 0 0 0 1 X X X X |
| 0 LSB (ZERO) | 0 0 0 0 0 0 0 0 0 0 0 0 X X X X |
| −1 LSB | 1 1 1 1 1 1 1 1 1 1 1 1 X X X X |
| −FULL SCALE | 1 0 0 0 0 0 0 0 0 0 0 0 X X X X |

*FIG-15*

| TEST NUMBER | DESCRIPTION |
|---|---|
| 00 | RESERVED |
| 01 | LOAD TEST TABLE |
| 02 | CHANNEL TEST |
| 03 | DIGITAL LOOP BACK TEST (8-BIT) |
| 04 | TONE SENDER TEST |
| 05 | DTMF REGISTER TEST |
| 06 | ROTARY SENDER TEST |
| 07 | ROTARY REGISTER TEST |
| 08 | CONFERENCE BRIDGE TEST |
| 09 | UNUSED |
| 10 | FREQUENCY TEST |
| 11 | SEND TEST TONE & MEASURE FREQUENCY |
| 12 | SIGNAL PROCESSOR SELF TEST |
| 13 | SINE TEST (TEST PERIOD ONLY) |
| 14 | SINE TEST (COMMAND TO STOP TEST) |
| 15 | DIGITAL LOOP BACK TEST (16-BIT) |

*FIG-16*

| RTESTN DATA | DESCRIPTION |
|---|---|
| 00XXH[6] | RESERVED FOR NO TABLE |
| 0103H[6] | DIGITAL LOOP BACK |
| 0202H[6] | 8-CHANNEL ANALOG TELEPHONE INTERFACE |
| 0302H[6] | 8-CHANNEL MWL LINE INTERFACE |
| 0402H[6] | 4-CHANNEL DIRECT TRUNK INTERFACE |
| 0502H[6] | 8-CHANNEL DID TRUNK INTERFACE |
| 0602H[6] | 8-CHANNEL PUBLIC NETWORK TIE TRUNK |
| 0702H[6] | 8-CHANNEL OPS LINE INTERFACE |
| 0802H[6] | 4-WIRE TIE TRUNK INTERFACE |
| 0902H[6] | QDTMF REGISTER (ANALOG LOOP BACK) |
| 0A05H[6] | QDTMF REGISTER (TONES) |
| 0B06H[6] | ROTARY SENDER |
| 0C07H[6] | ROTARY REGISTER |
| 0D08H[6] | CONFERENCE BRIDGE |
| 0E05H[6] | QDTMF REGISTER (PHONEMAIL) |
| 0F04H[6] | TONE SENDER, KEY '1' |
| 1004H[6] | TONE SENDER, KEY '2' |
| 1104H[6] | TONE SENDER, KEY '5' |
| 1204H[6] | TONE SENDER, KEY '9' |
| 1304H[6] | TONE SENDER, KEY '0' |

FIG. 17

| RTESTN DATA | DESCRIPTION |
|---|---|
| 1404H[6] | TONE SENDER, KEY '#' |
| 1504H[6] | TONE SENDER, INTERNAL DIAL TONE |
| 1604H[6] | TONE SENDER, TEST TONE (DUAL) |
| 1704H[6] | TONE SENDER, SILENCE |

FIG. 18

| TABLE ENTRY | DESCRIPTION |
|---|---|
| NNNNH | NUMBER OF TOTAL WORDS IN TABLE |
| A001H | BYTE OFFSET OF TABLE 1 |
| A002H | BYTE OFFSET OF TABLE 2 |
| ... | ... |
| A00NH | BYTE OFFSET OF TABLE NN |
| DDDDH | DATA FOR TABLE 1 |
| ... | ... |
| DDDDH | DATA FOR TABLE NN |
| CCCCH | CHECKSUM[7] |

FIG. 19

| SIGNATURE | DESCRIPTION |
|---|---|
| AE0FH | DELAYED 0 FRAMES |
| C70CH | DELAYED 1 FRAME |
| D470H | DELAYED 2 FRAMES |
| 2D31H | DELAYED 3 FRAMES |
| 8003H | DELAYED 4 FRAMES |
| FC9DH | DELAYED 5 FRAMES |
| CEA6H | DELAYED 6 FRAMES |
| 0 | END OF LIST |

FIG. 20

| LEVEL | DESCRIPTION |
|---|---|
| -6.0 dB | DUAL-TONE AMPLITUDE TO GENERATE |
| -10.5 dB | MARGINAL TONE LEVEL MAXIMUM |

| LEVEL | DESCRIPTION |
|---|---|
| -13.5 dB | MARGINAL TONE LEVEL MINIMUM |
| -0.05 dB | MARGINAL SIGNAL/POWER RATIO MINIMUM |
| -68.7 dB | MARGINAL IDLE CHANNEL NOISE MAXIMUM |
| -79.0 dB | MARGINAL CROSSTALK MAXIMUM |
| -8.0 dB | FAILED TONE LEVEL MAXIMUM |
| -24.0 dB | FAILED TONE LEVEL MINIMUM |
| -0.8 dB | FAILED SIGNAL/POWER RATIO MINIMUM |
| -42.0 dB | FAILED IDLE CHANNEL NOISE MAXIMUM |
| -35.0 dB | FAILED CROSSTALK MAXIMUM |

FIG. 21

| LEVEL | DESCRIPTION |
|---|---|
| -6.0 dB | DUAL-TONE AMPLITUDE TO GENERATE |
| -10.0 dB | MARGINAL TONE LEVEL MAXIMUM |
| -14.0 dB | MARGINAL TONE LEVEL MINIMUM |
| -0.05 dB | MARGINAL SIGNAL/POWER RATIO MINIMUM |
| -54.0 dB | MARGINAL IDLE CHANNEL NOISE MAXIMUM |
| -55.7 dB | MARGINAL CROSSTALK MAXIMUM |
| -8.0 dB | FAILED TONE LEVEL MAXIMUM |
| -24.0 dB | FAILED TONE LEVEL MINIMUM |
| -0.8 dB | FAILED SIGNAL/POWER RATIO MINIMUM |
| -42.0 dB | FAILED IDLE CHANNEL NOISE MAXIMUM |
| -35.0 dB | FAILED CROSSTALK MAXIMUM |

FIG. 22

| LEVEL | DESCRIPTION |
|---|---|
| -6.0 dB | DUAL-TONE AMPLITUDE TO GENERATE |
| -4.25 dB | MARGINAL TONE LEVEL MAXIMUM |
| -7.75 dB | MARGINAL TONE LEVEL MINIMUM |
| -0.05 dB | MARGINAL SIGNAL/POWER RATIO MINIMUM |
| -52.3 dB | MARGINAL IDLE CHANNEL NOISE MAXIMUM |
| -58.3 dB | MARGINAL CROSSTALK MAXIMUM |
| -2.0 dB | FAILED TONE LEVEL MAXIMUM |
| -18.0 dB | FAILED TONE LEVEL MINIMUM |
| -0.8 dB | FAILED SIGNAL/POWER RATIO MINIMUM |
| -40.0 dB | FAILED IDLE CHANNEL NOISE MAXIMUM |
| -35.0 dB | FAILED CROSSTALK MAXIMUM |

FIG. 23

| LEVEL | DESCRIPTION |
|---|---|
| -23.45 dB | DUAL-TONE AMPLITUDE TO GENERATE |
| -4.25 dB | MARGINAL TONE LEVEL MAXIMUM |
| -7.75 dB | MARGINAL TONE LEVEL MINIMUM |
| -0.05 dB | MARGINAL SIGNAL/POWER RATIO MINIMUM |
| -36.95 dB | MARGINAL IDLE CHANNEL NOISE MAXIMUM |
| -57.6 dB | MARGINAL CROSSTALK MAXIMUM |
| -2.0 dB | FAILED TONE LEVEL MAXIMUM |
| -18.0 dB | FAILED TONE LEVEL MINIMUM |
| -0.8 dB | FAILED SIGNAL/POWER RATIO MINIMUM |
| -25.5 dB | FAILED IDLE CHANNEL NOISE MAXIMUM |
| -35.0 dB | FAILED CROSSTALK MAXIMUM |

FIG. 24

| LEVEL | DESCRIPTION |
|---|---|
| -8.88 dB | DUAL-TONE AMPLITUDE TO GENERATE |
| -4.25 dB | MARGINAL TONE LEVEL MAXIMUM |
| -7.75 dB | MARGINAL TONE LEVEL MINIMUM |
| -0.05 dB | MARGINAL SIGNAL/POWER RATIO MINIMUM |
| -50.1 dB | MARGINAL IDLE CHANNEL NOISE MAXIMUM |
| -57.0 dB | MARGINAL CROSSTALK MAXIMUM |
| -2.0 dB | FAILED TONE LEVEL MAXIMUM |
| -18.0 dB | FAILED TONE LEVEL MINIMUM |
| -0.8 dB | FAILED SIGNAL/POWER RATIO MINIMUM |
| -38.5 dB | FAILED IDLE CHANNEL NOISE MAXIMUM |
| -35.0 dB | FAILED CROSSTALK MAXIMUM |

FIG. 25

| LEVEL | DESCRIPTION |
|---|---|
| -6.0 dB | DUAL-TONE AMPLITUDE TO GENERATE |
| -4.25 dB | MARGINAL TONE LEVEL MAXIMUM |
| -7.75 dB | MARGINAL TONE LEVEL MINIMUM |
| -0.05 dB | MARGINAL SIGNAL/POWER RATIO MINIMUM |
| -52.4 dB | MARGINAL IDLE CHANNEL NOISE MAXIMUM |
| -58.4 dB | MARGINAL CROSSTALK MAXIMUM |
| -2.0 dB | FAILED TONE LEVEL MAXIMUM |
| -18.0 dB | FAILED TONE LEVEL MINIMUM |
| -0.8 dB | FAILED SIGNAL/POWER RATIO MINIMUM |
| -40.0 dB | FAILED IDLE CHANNEL NOISE MAXIMUM |
| -35.0 dB | FAILED CROSSTALK MAXIMUM |

FIG. 26

| LEVEL | DESCRIPTION |
|---|---|
| -6.0 dB | DUAL-TONE AMPLITUDE TO GENERATE |
| -7.2 dB | MARGINAL TONE LEVEL MAXIMUM |
| -9.8 dB | MARGINAL TONE LEVEL MINIMUM |
| -0.05 dB | MARGINAL SIGNAL/POWER RATIO MINIMUM |
| -66.2 dB | MARGINAL IDLE CHANNEL NOISE MAXIMUM |
| -69.0 dB | MARGINAL CROSSTALK MAXIMUM |
| -5.0 dB | FAILED TONE LEVEL MAXIMUM |
| -21.0 dB | FAILED TONE LEVEL MINIMUM |
| -0.8 dB | FAILED SIGNAL/POWER RATIO MINIMUM |
| -41.0 dB | FAILED IDLE CHANNEL NOISE MAXIMUM |
| -35.0 dB | FAILED CROSSTALK MAXIMUM |

FIG. 27

| LEVEL | DESCRIPTION |
|---|---|
| -5.5 dB | MARGINAL TONE LEVEL MAXIMUM |
| -12.5 dB | MARGINAL TONE LEVEL MINIMUM |
| -0.2 dB | MARGINAL SIGNAL/POWER RATIO MINIMUM |
| -54.4 dB | MARGINAL IDLE CHANNEL NOISE MAXIMUM |
| -52.9 dB | MARGINAL CROSSTALK MAXIMUM |
| -5.5 dB | FAILED TONE LEVEL MAXIMUM |
| -12.5 dB | FAILED TONE LEVEL MINIMUM |
| -0.2 dB | FAILED SIGNAL/POWER RATIO MINIMUM |
| -37.0 dB | FAILED IDLE CHANNEL NOISE MAXIMUM |
| -45.0 dB | FAILED CROSSTALK MAXIMUM |

FIG. 28

| VALVE | VARIATION FROM NOMINAL | DESCRIPTION |
|---|---|---|
| 707.3975 Hz | +1.5% | FREQUENCY 1 |
| -6.00 dB | | AMPLITUDE 1 |
| 1227.051 Hz | +1.5% | FREQUENCY 2 |
| -6.00 dB | | AMPLITUDE 2 |
| 45 mS | | ON DURATION |
| 48 mS | | OFF DURATION |

FIG. 29

| VALVE | VARIATION FROM NOMINAL | DESCRIPTION |
|---|---|---|
| 686.6455 Hz | -1.5% | FREQUENCY 1 |
| -27.0 dB | | AMPLITUDE 1 |
| 1355.957 Hz | +1.5% | FREQUENCY 2 |
| -23.0 dB | | AMPLITUDE 2 |
| VALVE | VARIATION FROM NOMINAL | DESCRIPTION |
| 45 mS | | ON DURATION |
| 48 mS | | OFF DURATION |

*Fig. 30*

| VALVE | VARIATION FROM NOMINAL | DESCRIPTION |
|---|---|---|
| 781.4941 Hz | +1.5% | FREQUENCY 1 |
| -27.0 dB | | AMPLITUDE 1 |
| 1316.040 Hz | -1.5% | FREQUENCY 2 |
| -35.0 dB | | AMPLITUDE 2 |
| 53 mS | | ON DURATION |
| 40 mS | | OFF DURATION |

*Fig. 31*

| VALVE | VARIATION FROM NOMINAL | DESCRIPTION |
|---|---|---|
| 839.2334 Hz | -1.5% | FREQUENCY 1 |
| -27.0 dB | | AMPLITUDE 1 |
| 1499.146 Hz | +1.5% | FREQUENCY 2 |
| -23.0 dB | | AMPLITUDE 2 |
| 53 mS | | ON DURATION |
| 40 mS | | OFF DURATION |

*Fig. 32*

| VALUE | | VARIATION FROM NOMINAL | DESCRIPTION |
|---|---|---|---|
| 955.0781 | Hz | +1.5% | FREQENCY 1 |
| -6.0 | dB | | AMPLITUDE 1 |
| 1316.040 | Hz | -1.5% | FREQUENCY 2 |
| -6.0 | dB | | AMPLITUDE 2 |
| 45 | mS | | ON DURATION |
| 48 | mS | | OFF DURATION |

*FIG. 33*

| VALUE | | VARIATION FROM NOMINAL | DESCRIPTION |
|---|---|---|---|
| 927.0020 | Hz | -1.5% | FREQENCY 1 |
| -27.0 | dB | | AMPLITUDE 1 |
| 1454.956 | Hz | -1.5% | FREQENCY 2 |
| -35.0 | dB | | AMPLITUDE 2 |
| 45 | mS | | ON DURATION |
| 15 | mS | | OFF DURATION |

*FIG. 34*

| VALUE | | VARIATION FROM NOMINAL | DESCRIPTION |
|---|---|---|---|
| 927.0020 | Hz | -1.5% | FREQUENCY 1 |
| -27.0 | dB | | AMPLITUDE 1 |
| 1454.956 | Hz | -1.5% | FREQENCY 2 |
| -35 | dB | | AMPLITUDE 2 |
| 53 | mS | | ON DURATION |
| VALUE | | VARIATION FROM NOMINAL | DESCRIPTION |
| 40 | mS | | OFF DURATION |

*FIG. 35*

| VALUE | VARIATION FROM NOMINAL | DESCRIPTION |
|---|---|---|
| 881.8359 Hz | +3.5 | FREQUENCY 1 |
| -6.0 dB | | AMPLITUDE 1 |
| 1528.809 Hz | +3.5 | FREQENCY 2 |
| -6.0 dB | | AMPLITUDE 2 |
| 50 mS | | ON DURATION |
| 50 mS | | OFF DURATION |

FIG. 36

| VALUE | VARIATION FROM NOMINAL | DESCRIPTION |
|---|---|---|
| 743.0420 Hz | -3.5 % | FREQUENCY 1 |
| -6.0 dB | | AMPLITUDE 1 |
| 1289.185 Hz | -3.5 % | FREQUENCY 2 |
| -6.0 dB | | AMPLITUDE 2 |
| 50 mS | | ON DURATION |
| 50 mS | | OFF DURATION |

FIG. 37

| VALUE | VARIATION FROM NOMINAL | DESCRIPTION |
|---|---|---|
| 721.4355 Hz | +3.5 | FREQUENCY 1 |
| -6.0 dB | | AMPLITUDE 1 |
| 1166.626 Hz | -3.5 | FREQUENCY 2 |
| -6.0 dB | | AMPLITUDE 2 |
| 50 mS | | ON DURATION |
| 50 mS | | OFF DURATION |

FIG. 38

| VALUE | VARIATION FROM NOMINAL | DESCRIPTION |
|---|---|---|
| 941.0400 Hz | | FREQUENCY 1 |
| -6.0 dB | | AMPLITUDE 1 |
| 1633.057 Hz | | FREQUENCY 2 |
| -6.0 dB | | AMPLITUDE 2 |
| 20 mS | | ON DURATION |
| 50 mS | | OFF DURATION |

FIG. 39

| VALUE | DESCRIPTION |
|---|---|
| FF00H | IGNORE FIRST DATA WORD |
| FF04H | NEXT TWO - FOUR TIMES (DIGIT 5) |
| 480 | 60mS ON HOOK (1-4 ON) |
| 320 | 40mS OFF HOOK (1-4 OFF) |
| 480 | 60mS ON HOOK (5 ON) |
| FF0FH | 840mS OFF HOOK (5 OFF/IDT) |
| FF09H | NEXT TWO - NINE TIMES (DIGIT 0) |
| 480 | 60mS ON HOOK (1-9 ON) |
| 320 | 40mS OFF HOOK (1-9 OFF) |
| 480 | 60mS ON HOOK (10 ON) |
| 4000H | 840mS OFF HOOK (10 OFF/IDT/TIME OUT) |
| 0 | END OF LIST |

FIG. 40

| VALUE | DESCRIPTION |
|---|---|
| 2368 | A: ON HOOK (HANG UP -1) (DIGIT 5) |
| 2049 | OFF HOOK (I/D -1) |
| C5FCH | LOOP TO A, 5 TIMES (4000H =LOOP FLAG) |
| 3 | OFF HOOK (I/D TIME) |
| 17 | B: ON HOOK (MAX GLITCH) (DIGIT 0) |
| 20 | OFF HOOK |
| 18 | ON HOOK (MIN PULSE) |
| 17 | OFF HOOK (MAX GLITCH) |
| 20 | ON HOOK |
| 18 | OFF HOOK (MIN I/P) |
| 17 | ON HOOK (MAX GLITCH) |
| 20 | OFF HOOK (FINISH OFF HOOK) |
| CAF0H | LOOP TO B, 10 TIMES (4000H = LOOP FLAG) |

| VALUE | DESCRIPTION |
|---|---|
| 2011 | OFF HOOK (MIN I/D -41) |
| 2373 | ON HOOK (HANG UP) |
| 20 | OFF HOOK (END) |
| 800H | END OF LIST |

FIG. 41

| VALUE | DESCRIPTION |
|---|---|
| -6400 | CROSSTALK MAXIMUM LEVEL, -50.0 dB |
| 3E27H | SIGNATURE FOR 0 dB GAIN |
| E9CFH | SIGNATURE FOR -3 dB GAIN |
| 31C6H | SIGNATURE FOR -6 dB GAIN |
| C745H | SIGNATURE FOR -12 dB GAIN |
| 11EEH | SIGNATURE FOR -3 dB GAIN AGAIN |

FIG. 42

| VALUE | VARIATION FROM NOMINAL | DESCRIPTION |
|---|---|---|
| 927.0020 Hz | -1.5% | FREQUENCY 1 |
| -6.00 dB | | AMPLITUDE 1 |
| 1190.918 Hz | -1.5% | FREQUENCY 2 |
| -6.00 dB | | AMPLITUDE 2 |
| 90 mS | | ON DURATION |
| 30 mS | | OFF DURATION |

*Fig. 43A*

| VALUE | VARIATION FROM NOMINAL | DESCRIPTION |
|---|---|---|
| 927.0020 Hz | -1.5% | FREQUENCY 1 |
| -6.00 dB | | AMPLITUDE 1 |
| 1227.051 Hz | +1.5% | FREQUENCY 2 |
| -6.00 dB | | AMPLITUDE 2 |
| 90 mS | | ON DURATION |
| 30 mS | | OFF DURATION |

*Fig. 43B*

| VALUE | VARIATION FROM NOMINAL | DESCRIPTION |
|---|---|---|
| 955.0781 Hz | +1.5 % | FREQUENCY 1 |
| -6.00 dB | | AMPLITUDE 1 |

| VALUE | VARIATION FROM NOMINAL | DESCRIPTION |
|---|---|---|
| 1190.918 Hz | -1.5 % | FREQUENCY 2 |
| -6.00 dB | | AMPLITUDE 2 |
| 90 mS | | ON DURATION |
| 30 mS | | OFF DURATION |

| VALUE | VARIATION FROM NOMINAL | DESCRIPTION |
|---|---|---|
| 955.0781 Hz | +1.5 % | FREQUENCY 1 |
| -6.00 dB | | AMPLITUDE 1 |
| 1227.051 Hz | +1.5 % | FREQENCY 2 |
| -6.00 dB | | AMPLITUDE 2 |
| 90 mS | | ON DURATION |
| 30 mS | | OFF DURATION |

FIG. 43C

| VALUE | DESCRIPTION |
|---|---|
| 696.5333 Hz | FREQUENCY 1 |
| 1208.496 Hz | FREQUENCY 2 |
| -6.8 dB | AMPLITUDE 1 MINIMUM |
| -4.8 dB | AMPLITUDE 2 MINIMUM |
| -2.45 dB | TOTAL POWER MAXIMUM |

FIG. 44

| VALUE | DESCRIPTION |
|---|---|
| 696.5333 Hz | FREQUENCY 1 |
| 1335.938 Hz | FREQUENCY 2 |
| −6.8 dB | AMPLITUDE 1 MINIMUM |
| −4.8 dB | AMPLITUDE 2 MINIMUM |
| −2.45 dB | TOTAL POWER MAXIMUM |

*Fig. 45*

| VALUE | DESCRIPTION |
|---|---|
| 769.0430 Hz | FREQUENCY 1 |
| 1335.938 Hz | FREQUENCY 2 |
| −6.8 dB | AMPLITUDE 1 MINIMUM |
| −4.8 dB | AMPLITUDE 2 MINIMUM |
| −2.45 dB | TOTAL POWER MAXIMUM |

*Fig. 46*

| VALUE | DESCRIPTION |
|---|---|
| 852.5391 Hz | FREQUENCY 1 |
| 1476.563 Hz | FREQUENCY 2 |
| −6.8 dB | AMPLITUDE 1 MINIMUM |
| −4.8 dB | AMPLITUDE 2 MINIMUM |
| −2.45 dB | TOTAL POWER MAXIMUM |

*Fig. 47*

| VALUE | DESCRIPTION |
|---|---|
| 940.4298 Hz | FREQUENCY 1 |
| 1335.938 Hz | FREQUENCY 2 |
| -6.8 dB | AMPLITUDE 1 MINIMUM |
| -4.8 dB | AMPLITUDE 2 MINIMUM |
| -2.45 dB | TOTAL POWER MAXIMUM |

FIG. 48

| VALUE | DESCRIPTION |
|---|---|
| 940.4298 Hz | FREQUENCY 1 |
| VALUE | DESCRIPTION |
| 1476.563 Hz | FREQUENCY 2 |
| -6.8 dB | AMPLITUDE 1 MINIMUM |
| -4.8 dB | AMPLITUDE 2 MINIMUM |
| -2.45 dB | TOTAL POWER MAXIMUM |

FIG. 49

| VALUE | DESCRIPTION |
|---|---|
| 525.1465 Hz | FREQUENCY 1 |
| 659.1797 Hz | FREQUENCY 2 |
| -19.1 dB | AMPLITUDE 1 MINIMUM |
| -19.1 dB | AMPLITUDE 2 MINIMUM |
| -15.85 dB | TOTAL POWER MAXIMUM |

FIG. 50

| VALUE | | DESCRIPTION |
|---|---|---|
| 1004.150 | Hz | FREQUENCY 1 |
| 1004.150 | Hz | FREQUENCY 2 |
| -3.1 | dB | AMPLITUDE 1 MINIMUM |
| -3.1 | dB | AMPLITUDE 2 MINIMUM |
| -2.9 | dB | TOTAL POWER MAXIMUM |

FIG. 51

| VALUE | | DESCRIPTION |
|---|---|---|
| 0.0 | Hz | FREQUENCY 1 |
| 0.0 | Hz | FREQUENCY 2 |

| VALUE | | DESCRIPTION |
|---|---|---|
| -250.0 | dB | AMPLITUDE 1 MINIMUM |
| -250.0 | dB | AMPLITUDE 2 MINIMUM |
| -90.0 | dB | TOTAL POWER MAXIMUM |

FIG. 52

```
% DIAG
ENTERED DIAGNOSTIC MODE
% TEST ROTR 072408 1
%

*** INITIATING ROTR ANALYSIS
--- START TEST ROTR (ROTR) 03/072408

%
*   DONE TEST ROTR (ROTR) 03/072408 FAILED
--- START TEST EXP (EXP) 03/070401

%
*   DONE TEST EXP(EXP) 03/070401 PASSED
--- START TEST CARDID (ROTR) 03/072408
*   DONE TEST CARDID(ROTR) 03/072408 PASSED
--- START TEST ADC (ADC) 03/0927

%
*   DONE TEST ADC (ADC) 03/0927  PASSED
*** ANALYSIS COMPLETE:
           REPLACE FALING CARD.

%
```

% LIST ERRH : T ROTR

| TARGET | SOURCE | SYSTEM ID | RELEASE | BIND DATE | CURRENT DATE/TIME |
|--------|--------|-----------|---------|-----------|-------------------|
| 3/A(B) | 3/A(B) | ROLM | 9004.3.40 | 16/SEP/87 | 9/25/1987 16:19:55 |

DETAILED TELEPHONY ERRORS

LAST COMPLETELY CLEARED   10:54:30   09/25/1987

|   |   |   |
|---|---|---|
| ERROR PRIORITY: | 251 | CARD: ROTR |
| ERROR SEVERITY: | EXCEPTION | LOCATION: 03/072408 |
| DETECTED BY: | TEST ROTR | |

CURRENT STATUS:  INTERMITTENT

|   | FIRST TIME: | LAST TIME: | RESULTS ON |
|---|---|---|---|
|   |   |   | CPU 1   CPU 2 |
| FAILED/MARGINAL: | 16:18  09/25 | 16:18  09/25 | F |
| PASSED: | 00:00  00/00 | 00:00  00/00 | |

LAST 16 RESULTS: F////////////

SUGGESTED ACTION:
  REPLACE FAILING CARD.
  * LAST FAILING TEST WAS THE ROTR TEST

FIG. 55

* REPLACE CARD.
* REPLACE CODEC.
* REPLACE INTERFACE CARD.
* REPLACE RLC-1.
* REPLACE ROLMPHONE.
    - REPLACE ROLMPHONE.
    - VERIFY PHONE IS PLUGGED IN
    - VERIFY THAT THE CABLE IS OK
    - REPLACE RLC-2.
    - REPLACE RLC-1.

* REPLACE DCM.
    - VERIFY ROLMPHONE IS PLUGGED IN
    - VERIFY DCM POWER IS PLUGGED IN
    - VERIFY THAT THE CABLE IS OK
    - REPLACE RLC-2
    - REPLACE RLC-1

* REPLACE CYPRESS
    - VERIFY PHONE IS PLUGGED IN
    - REPLACE RLC-2
    - REPLACE RLC-1

* REPLACE MESSAGE WAITING PHONE.
    - VERIFY PHONE IS PLUGGED IN
    - VERIFY CABLE IS OK
    - REPLACE INTERFACE CARD.

* REPLACE DTI.
    - VERIFY DTI IS PLUGGED IN
    - VERIFY CABLE IS OK.

Fig. 56

REPLACE DTI.

VERIFY DTI (OR ICPI) IS PLUGGED IN AND CABLE IS OK.

REPLACE DLI.

ROLL TRUNK CHANNELS. RUN TEST TK SZ ON BOTH CHANNELS USED. IF THIS CHANNEL STILL FAILS, REPLACE THE INTERFACE CARD. IF FAILURE MOVED TO THE OTHER CHANNEL USED, CHECK THE EXTERNAL TRUNK LINE.

CHANNEL TAKEN OUT OF SERVICE DUE TO BAD EXPANDER ON SHELF.

CHANNEL TAKEN OUT OF SERVICE BECAUSE WRONG CARD(S) WAS INSTALLED IN THIS DISTRICT. RUN LIST CARDID TO DETERMINE CARD(S) TO REPLACE.

FIG. 57

TEST NODES WILL APPEAR AS:

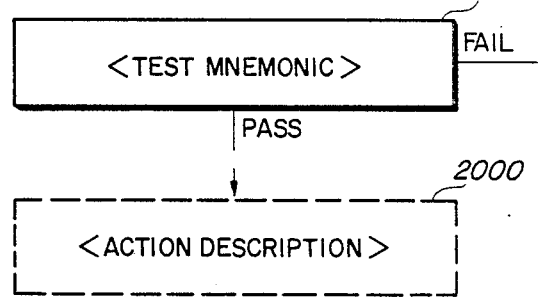

ACTION NODES WILL APPEAR AS:

CONCLUSION NODES WILL APPEAR AS:

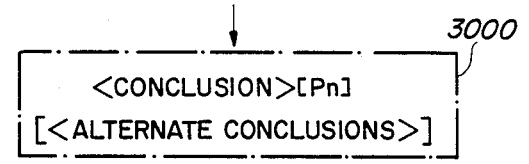

FIG. 58

GENERIC ANALYSIS

RLC VOICE ANALYSIS

CYPRESS ANALYSIS

DCM ANALYSIS
APPLIES TO BOTH ROLMPHONE DCM & CYPRESS DATA

DLI ANALYSIS

MODIFIED CARD ANALYSIS

NEW TIE TRUNK ANALYSIS

MESSAGE WAITING ANALYSIS (FOR MESSAGE WAITING PHONE CHANNELS ONLY)

ATI ANALYSIS

```
        STRUCT   FR_INFO (                2000       2010
           STRUCT   SI_LTID   FR_LTID;
           INT      FR_CR_TYPE,              2020
                    FR_TRK_OR_DATA_GRP; 2030

NIB      FR_LAST_UPDATE_BY, 2040

FR_RECORD_STATUS, 2050

FR_CHANNEL_STATE; 2060

BIT      FR_VOICE_OR_DATA, 2070

FR_ASSOC_ERRH; 2080

FR_ASSOC_OTHER, 2090

FR_RR_NEEDED; 2100

INT      FR_NEXT_IDX ); 2110
```

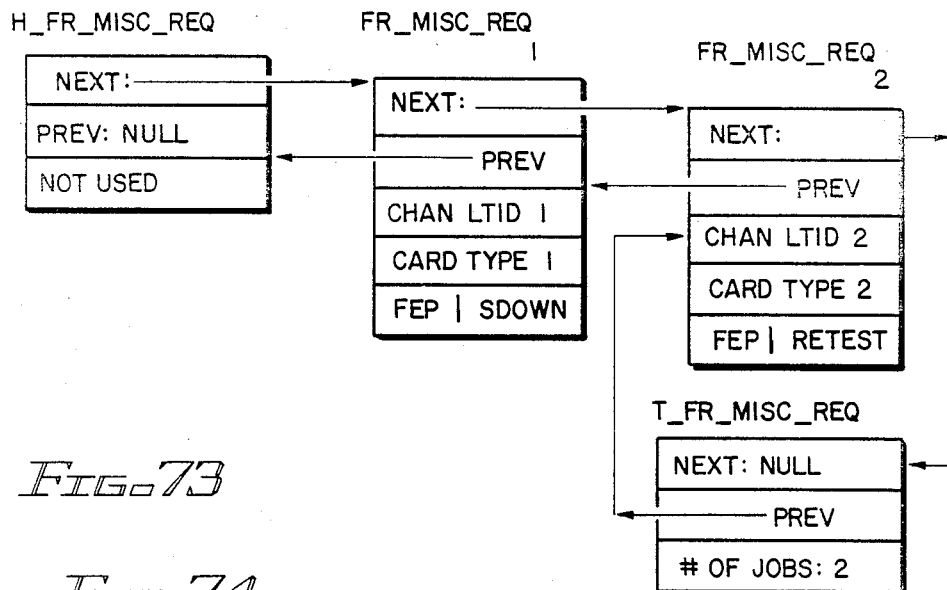

```
ERROR PRIORITY :                    CARD: ROTR
ERROR SEVERITY: MAJOR               LOCATION:
DETECTED BY    : MONITOR

CURRENT STATUS : FAILED
                                          RESULTS ON
                    FIRST TIME   LAST TIME   SIDE 1   SIDE 2
FAILED/MARGINAL:  07:48 09/04  08:27 09/04    F
PASSED          : 07:53 09/04  08:26 09/04             P

LAST 16 RESULTS: FPPF///////////

TESTING INFO: 56% OF ROTR CHANNELS HAVE FAILED IN THE NODE
```

FIG. 75

```
ERROR PRIORITY: 150                 CARD: DIR
ERROR SEVERITY: MAJOR               LOCATION:
DETECTED BY    : MONITOR

CURRENT STATUS: FAILED
                                          RESULTS ON
                    FIRST TIME   LAST TIME   SIDE 1   SIDE 2
FAILED/MARGINAL: 07:48 09/04  08:27 09/04     F
PASSED          : 07:53 09/04  08:26 09/04             P

LAST 16 RESULTS: FPPF///////////

TESTING INFO: 53% OF TR CHANNELS IN TRUNK GROUP C01 HAVE
              FAILED IN THE SYSTEM
```

THRESHOLD ALARMS FOR PROCESSING ERRORS IN A MULTIPLEX COMMUNICATIONS SYSTEM

CROSS REFERENCE TO RELATED APPLICATIONS

This application is related in subject matter to the following applications filed concurrently herewith and assigned to a common assignee:

Application Ser. No. 07/105,771 filed by Wendy W. Breu for Failing Resource Manager In A Multiplex Communications System.

Application Ser. No. 07/105,772 filed by Mark E. Clark, Richard G. Greever, Larry J. Schmier and Jerome Dale Wong for Expert System for Processing Errors in A Multiplex Communications System.

The disclosures of the foregoing copending applications are incorporated herein by reference.

BACKGROUND OF THE INVENTION

1. Field of the Invention

This invention generally relates to improvements in error management in a multiplex communication system and, more particularly, to the usage of an expert system comprising techniques to identify a failing unit of a communications resource, traverse a decision tree to detect functioning members of the switch, identify each field replaceable unit (FRU) which is faulty, and circumvent the problem.

2. Description Of The Prior Art

The past several years have seen significant expansion in the use of communications multiplexers in response to the demands for increased flexibility in data communications. As these systems increased in complexity and were more tightly integrated into daily operations, outages in the communications system became less tolerable, increasing the importance of the error analysis function.

The error analysis function was done by a technician scanning through a hardware error table and sorting out the important information from the large amount of unorganized data in the error table. Often it would be necessary to manually invoke additional tests to further isolate the problem. The effectiveness of this approach depended on the degree of training and experience acquired by the technician. This approach was effective as a temporary measure; however, it was too indefinite for a permanent solution.

Another approach to improve availability of the communications system employed redundant processors. The redundant processors provided a quick recovery from a fault in one of the processors by a switchover to the other processor. One of the problems with this approach entailed the brief interval between the failure and the recovery of the second processor. During this period, a data glitch occurred. Although this was only an inconvenience during a telephone conversation, during a data communication, it frequently terminated the communication transfer. This termination necessitated the reestablishment of the communications link and the retransmittal of the data. For many applications, such as banking applications, such degradation of service is intolerable as the delivery of every message without error is essential.

The use of expert systems to diagnose patients in a medical environment is quite common today. However, these systems require the user to enter large quantities of information describing the patient as opposed to acquiring the information automatically. The user is also required to be trained as a doctor to use the system. The average technician would not be able to make effective use of the system. A more in depth discussion may be had by referring to the book edited by M. J. Coombs entitled *Developments in Expert Systems*, published by Academic Press (1984), and in particular to the chapter entitled "Strategic Explanations For A Diagnostic Consultation System", by Diane Hasling et al., Heuristic Programming Project, Computer Science Department, Stanford University.

An example of testing systems can be found in U.S. Pat. No. 4,601,032 to Robinson, issued July 15, 1986 and U.S. Pat. No. 4,649,515, to Thompson et al., issued Mar. 10, 1987. These patents discuss techniques for simulating faults and testing digital circuitry and process control, sensor systems. The latter employs a set of rules which respond to stimulus from outboard sensors to search a knowledge database to determine how to respond to a problem and displaying information that should guide a user to correct the problem.

Additional examples of expert systems for decision making based on a knowledge data base are disclosed in U.S. Pat. No. 4,595,982 to Burt, issued Jul. 17, 1986 and U.S. Pat. No. 4,648,044, Mar. 3, 1987. The programs described in these patents interact with a user in dialogue fashion to guide them to an answer to their problems. The tool includes question generation, legal response checking, explanation of responses and the ability to debug the knowledge data base.

While these patents describe various expert systems, they lack the capability of employing expert system techniques to identify a failing units of a communications multiplexer, traversing a decision tree to detect functioning members of the switch, identifying each unit which is faulty, and circumventing the problem.

SUMMARY OF THE INVENTION

It is therefore an object of this invention to provide a technique which perceives problems in a communications multiplexing system.

It is a further object of the invention to isolate the failing component of the communications multiplexing system using an expert system.

It is another object of the invention to employ decision trees in an expert system to further refine the identification of the failing component, eliminate any functioning units of the component, isolate the specific failing field replaceable unit and perform additional diagnostics to assure that no extraneous errors from other aspects of the system are causing the failure and present a detailed, take the resource out of operation, retest the resource to determine if it is now operable, return it to operation if it is operable and display a natural language message for the operator.

It is yet another object of the invention to provide a suggested action to the operator to remedy the fault if the system cannot.

It is yet another object of the invention to provide a user selectable threshold of system resource that is allowable for each resource in the system.

It is yet another object of the invention to allow the user to dynamically change the selectable threshold of system resource as the needs of the system change.

It is yet another object of the invention to allow one of the thresholds to be the number of field replaceable units that have been removed.

It is yet another object of the invention to allow one of the thresholds to be the percentage of a particular resource that is available for use.

According to the invention, these objects are accomplished by intermittently testing the various functional units of a multiplex communications system to identify any failing units. Once a failing unit is detected, a decision tree logic processing system is invoked based on the type of failing unit. The decision tree processing attempts to isolate the problem to a single field replaceable unit. Then, the percentage and physical number of available resources that rely on the field replaceble unit are checked to determine if they have exceeded their system thresholds. If the threshold has not been exceed, the replaceable unit is taken out of operation. Retesting is performed to determine if the failing unit can be returned to a functioning state, and if it can it is returned to service. Additionally, a message is displayed to indicate to the operator what has transpired. If the problem cannot be circumvented, then a message is displayed which indicates to the operator a suggested action to alleviate the problem.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 1 is an illustration of the hardware environment of a prior art central branch exchange (CBX);

FIG. 2 is a hardware block diagram of the advanced diagnostics card;

FIG. 3 is a table describing the P2 connector pins of the Advanced Diagnostics Card;

FIG. 4 is a table describing additional P2 connector pins of the Advanced Diagnostics Card;

FIG. 5 is a table describing additional P2 connector pins of the Advanced Diagnostics Card;

FIG. 6 is a table describing the P3 connector pins of the Advanced Diagnostics Card;

FIG. 7 is a table containing the transmit commands of Advanced Diagnostics Card;

FIG. 8 is a table describing additional transmit commands of the Advanced Diagnostics Card;

FIG. 9 is a bit map of the mu-law binary pattern of the Advanced Diagnostics Card;

FIG. 10 is a bit map of the status command of the Advanced Diagnostics Card;

FIG. 11 is a table describing the Receive commands of the Advanced Diagnostics Card;

FIG. 12 is an additional table describing the Receive commands of the advanced Diagnostics Card;

FIG. 13 is a bit map of the data format for the Transmit and Receive data command of the Advanced Diagnostics Card;

FIG. 14 is a table describing the Transmit or Receive mu-law data for the Advanced Diagnostics Card;

FIG. 15 is a table describing the Transmit or Receive 12-Bit linear data commands of the Advanced Diagnostics Card;

FIG. 16 is a table describing the tests that are supported by the Advanced Diagnostics Card;

FIG. 17 is a table displaying test data and a description of the tests that the data is correlated with on the Advanced Diagnostics Card;

FIG. 18 is an additional table displaying the test data and a description of the tests that the data is correlated with on the Advanced Diagnostics Card;

FIG. 19 is a table displaying the test table entries and a description of the tests that the entries are correlated with on the Advanced Diagnostics Card;

FIG. 20 is a table displaying the signatures and a description of the tests that the signatures are correlated with on the Advanced Diagnostics Card;

FIG. 21 is a table displaying the 8-Channel Analog Telephone Interface test parameters on the Advanced Diagnostics Card;

FIG. 22 is a table displaying the 8-Channel MWL line interface test parameters of the Advanced Diagnostics Card;

FIG. 23 is a table displaying the 4-Channel Direct Trunk Interface test parameters of the Advanced Diagnostics Card;

FIG. 24 is a table displaying the 8-Channel DID Trunk interface test parameters of the Advanced Diagnostics Card;

FIG. 25 is a table displaying the Public Network 8-Channel Tie Trunk Interface test parameters of the Advanced Diagnostics Card;

FIG. 26 is a table displaying the 8-Channel OPS Line Interface test parameters of the Advanced Diagnostics Card;

FIG. 27 is a table displaying the 4-Wire Tie Trunk Interface of the Advanced Diagnostics Card;

FIG. 28 is a table displaying the QDTMF Register (Analog Loopback) test parameters of the Advanced Diagnostics Card;

FIG. 29 is a table displaying the QDTMF Register—"1" Key test parameters of the Advanced Diagnostics Card;

FIG. 30 is a table displaying the QDTMF Register—"2" Key test parameters of the Advanced Diagnostics Card;

FIG. 31 is a table displaying the QDTMF Register—"5" Key test parameters of the Advanced Diagnostics Card;

FIG. 32 is a table displaying the QDTMF Register—"9" Key test parameters of the Advanced Diagnostics Card;

FIG. 33 is a table displaying the QDTMF Register—"0" Key test parameters of the Advanced Diagnostics Card;

FIG. 34 is a table displaying the first part of the QDTMF Register—"#" Key test parameters of the Advanced Diagnostics Card;

FIG. 35 is a table displaying the second part of the QDTMF Register—"2" Key test parameters of the Advanced Diagnostics Card;

FIG. 36 is a table displaying the QDTMF Register—"9" Key test parameters of the Advanced Diagnostics Card;

FIG. 37 is a table displaying the QDTMF Register—"5" Key test parameters of the Advanced Diagnostics Card;

FIG. 38 is a table displaying the QDTMF Register—"1" Key test parameters of the Advanced Diagnostics Card;

FIG. 39 is a table displaying the QDTMF Register—"D" Key test parameters of the Advanced Diagnostics Card;

FIG. 40 is a table displaying the Rotary Sender test parameters of the Advanced Diagnostics Card;

FIG. 41 is a table displaying the Rotary Register test parameters of the Advanced Diagnostics Card;

FIG. 42 is a table displaying the Conference Bridge test parameters of the Advanced Diagnostics Card;

FIG. 43a is a table displaying the first part of the QDTMF Register—"*" Key test parameters of the Advanced Diagnostics Card;

FIG. 43b is a table displaying the second part of the QDTMF Register—"*" Key test parameters of the Advanced Diagnostics Card;

FIG. 43c is a table displaying the third part of the QDTMF Register—"*" Key test parameters of the Advanced Diagnostics Card;

FIG. 44 is a table displaying the Tone Sender—"1" Key test parameters of the Advanced Diagnostics Card;

FIG. 45 is a table displaying the Tone Sender—"2" Key test parameters of the Advanced Diagnostics Card;

FIG. 46 is a table displaying the Tone Sender—"5" Key test parameters of the Advanced Diagnostics Card;

FIG. 47 is a table displaying the Tone Sender—"9" Key of the Advanced Diagnostics Card;

FIG. 48 is a table displaying the Tone Sender—"0" Key test parameters of the Advanced Diagnostics Card;

FIG. 49 is a table displaying the Tone Sender—"#" Key test parameters of the Advanced Diagnostics Card;

FIG. 50 is a table displaying the Tone Sender-internal dial tone test parameters of the Advanced Diagnostics Card;

FIG. 51 is a table display ing the Tone Sender-test tone (dual) test parameters of the Advanced Diagnostics Card;

FIG. 52 is a table displaying the Tone Sender-Silence test parameters of the Advanced Diagnostics Card;

FIG. 55 is an example of an error analysis report;

FIG. 56 is an example of error analysis messages for field replaceable units (FRU);

FIG. 57 is a list of suggested actions and comments that are typical of error analysis processing;

FIG. 58 is is an explanation of the decision tree schematic, logic diagrams;

FIG. 73 is an illustration of a Failing Resource linking structure;

FIG. 74 is a Hardware Error Table display for the previous rotary register;

FIG. 75 is a Hardware Error Table display for the previous CO trunk;

DESCRIPTION OF THE PREFERRED EMBODIDIMENT OF THE INVENTION

Table Of Contents

Figure 1A:
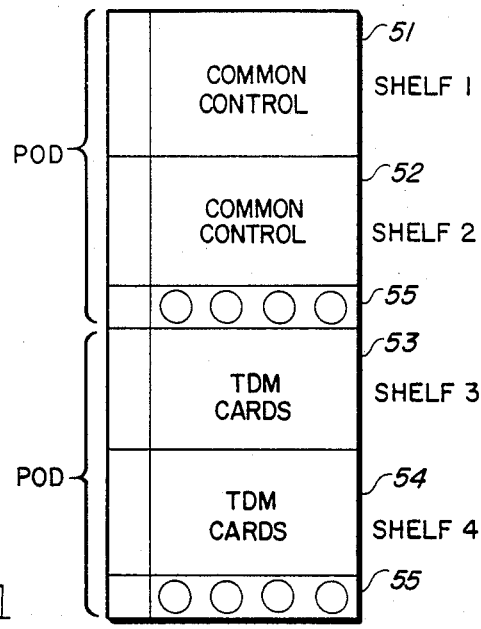
FIG. 1a is an illustration of the hardware environment of the best mode of the invention.

Introduction
  Hardware Environment
  Hardware Description
    SINGLE-NODE COMMUNICATION
    Time Division Multiplexing
    Pulse Code Modulation
    TDM SWITCHING NETWORK: BUS
    TDM Network
    Intrashelf Bus 84
    Intershelf Bus 85
    Expander Cards
    TDM Controller Card
    TDM Controller Card
    Turnaround Card
    System Clock
    Bus Capacity
    COMPUTER COMMON CONTROL
    Processor
    Memory
    Enhanced Communications Processor
    DISK SYSTEMS
    DIAGNOSTIC CARDS
    System Monitor Card
    Redundant Shelf Monitor
    Local Shelf Monitor
    I/S PORTS
    Service Maintenance Port
    Quad Serial I/O Port
    CABINETRY AND POWER SYSTEM
    ADC Architecture
      Operation
      TDM Buffer
      Z80 Controller
      Signal Processing Section Switches and LEDs
Connector Pinouts
Transmit Commands
  (0 010 0.00 000) X0ADC—Transmit Stimulus 1
  (0 010 0.00 010) X1ADC— Transmit Stimulus 1
  (0 010 0.00 100) X2ADC—Transmit Stimulus 2
  (0 010 0.00 110) X3ADC—Transmit Stimulus 2 mu-law
  (0 010 0.00 111) TDMW—Transmit Digital Milliwatt
  (0. 010 0.01 000) X4ADC—Transmit FIR Output
  (0 010 0.01 010) X5ADC—Transmit FIR Output mu-law
  (0 010 0.01 011) TZSC—Tmt Z80 Status and Clear
  (0 010 0.01 100) TZS—Transmit Z80 Status
  (0 010 0.01 101) TZD—Transmit Z80 Data
  (0 010 0.01 110) TZDP—Transmit Z80 Data Permanent
  (0 010 0.01 111) TZDCO—Transmit Z80 Data Count
  (0 010 0.10 001) TZDCI—Transm it Z80 Data Count In
  (0 010 0.11 000) TSPED0—Transmit Speek Data
  (0 010 0.11 001) TREJCMD—Transmit Rejected Cmd
  (0 010 0.11 010) TSPED1—Transmit Speek Data 1
  (0 010 0.11 100) TSPED2—Transmit Speek Data
  (0 010 0.11 101) TPD—Transmit Peek Data
  (0 010 0.11 110) TSPED3—Transmit Speek Data
  (1 111 1.XX XXX) TCID— Transmit Card ID
Receive Commands
  (0 000 0.00 000) R0ADC—Rcv. Sample Input Word 1
  (0 000 1.XX XXX) DOWN—Cold Reset to Card
  (0 000 0.00 010) R1ADC—Rcv. Sample Input Word 2
  (0 001 1.XX XXX) UP—Return Card to TDM Data Bus
  (0 000 0.01 101) RZD—Receive Z80 Data
  (0 000 0.01 110) RZDP—Receive Z80 Data Permanent
  (0 000 0.01 111) RTESTN—Receive Test Number
  (0 000 10 001) WRST—Warm Reset
  (0 000 0.10 010) RSTR—Receive SPI Start
  (0 000 0.10 011) RSTOPT—Receive Stop Test
  (0 000 0.10 100) RSPEA0—Receive Speek Address 0
  (0 000 0.10 101) LOADTBL—Load Test Table
  (0 000 0.11 000) RSPOA0—Receive Spoke Address 0
  (0 000 0.11 001) RUSA—Receive User Subr. Addr.
  (0 000 0.11 010) RSPOD1—Receive Spoke Data 1
  (0 000 0.11 011) RPD—Receive Poke Data
  (0 000 0.11 100) RSPOD2—Receive Spoke Data 2
  (0 000 0.11 101) RPA—Receive Peek/Poke Address
Data Formats (Transmit and Receive Data)
Test Descriptions
  Test 1 Load Table Data:
  Test 2 Analog Loop Back/Channel Test:
  Test 3 Digital Loop Back Test (8-bit)
  Test 5 DTMF Register Test
  Test 6 Rotary Sender Test
  Test 7 Rotary Register Test
  Test 8 Conference Bridge
  Test 10 Frequency Test
  Test 11 Send Test Tone and Measure Frequency
  Test 12 Self Test:
  Test 13 Sine Wave Test
  Test 14 Sine Wave Test (Continuous):
  TEST 15 DIGTIAL LOOP BACK TEST (16-BIT)
Test Table Definition
Test Table Format
Recommended Test Values
Analog Cards
  ADC Driver
    ADC Driver States
    ADC DRIVER DESIGN
    ADC_DRIVER_IN( )
    SPG INIT
  Error Analysis Hardware Environment
Error Analysis Phases
  Test Generic
  Detailed analysis
  Test analysis
Test Generic
Detailcd Analysis
  Generic analysis
  RLI voice analysis
  Cypress analysis
  DCM analysis
  DLI analysis
  Modified card analysis
  Message waiting analysis
  ATI card analysis
  TIE trunk analysis
  Decision Tree Attributes
Test analysis
Intermediate Test Results
Error Analysis For Remote Nodes
Internal Scheduler
Suggested Action for Passing Channels
  Analysis Unable To Complete
Error Record Priorities
  Channel Errors
  Card Errors
  Marginal Errors
  Passing Errors
Inconsistent Results
User Interface
Listing Hardware Errors
Error Analysis Architecture
  Error Analysis Initialization
  Test Generic
  Detailed Analysis
  Test analysis
  Processing the Decision Trees
Detailed Architecture PROCEED
  GET_EXT_ENTRY
  GET_NEXT_NODE
ADC Management
Multinode Considerations
Decision Tree Nodes
  Test
  Initiate analysis
  Test Existing Results
  Conclusion
  Test Expander
  Test CME
  Card ID
  Kickoff
  Abort
  Dummy
  Exit
Decision Tree Data Base
  Initial Index
  Tree Structure
  Node Descriptors
Data Base Internals
  Error Data Base Indices
    Monitor error
    Card Type Index (Remote & Local)
    Monitor Type Index (Remote & Local)
    Tree Structure
    Node structures:
    Literals For Type Nodes
    Node Descriptors
    Detailed Data Structures
      STATIC STRUCT EA_DT_NODE MON_TREE_RLC[3]
      STATIC STRUCT EA_DT_NODE RLI_analysis[16]
    Conclusion Data Structure
Task Design
  EA_TEST_GENERIC
  EA_GET_RECORD
  CHECK_ISB_ERRORS
  CHECK_ISB_ERRORS( );
  ISB_FINISHED_SCAN
  ISB_FINISHED_SCAN( );
  ISB_ERROR_TIME_STAMP
  ISB_FINISHED_SCAN( );
  PROCESS_TREE
  PROCESS_TREE(POINTER STRUCT EA_DB_ENTRY PREC);
    PROCESS_TEST_NODE
    PROCESS_INITIATE_analysis_NODE
  PROCESS_CONCLUSION_NODE
  PROCESS_TEST_EXPANDER_NODE
  PROCESS_TEST_CME_NODE
  PROCESS_CARDID_NODE
  PROCESS_KICKOFF_NODE
  PROCESS_ABORT_NODE
  SI_PROCESS _SERVER
Failing Resource Manager
  Functional Description
    Detailed Operation
    Introduction
      Management of Failed Resources
        Multiple Failing Channels on an Interface Card
        Deleting a Failing Resource Entry
      Interfacing with Error Analysis
  Failing Resource Database
    STRUCT FR DB
    FR INFO Structure
    Card Error Database
    General Purpose Request Queue
    Global Data for Restart
    Recovery for Failing Resources
    Modification of the Error Parameter Databases
  Program Design
    RE RETEST CHECK( )
    FR MANAGEMENT( )
    FR CHANGE CHANNEL STATE( )
    SCH ERR ANALYSIS( )
    FR PROCESS MISC REQ( )
    FR SEND CR RESET PACKET( )
    FR CR ERR CLEAR( )
    CHANNEL RANGE FOR CARD( )
    PHONEMAIL CHANNEL EXISTS( )
    FR RESTART RECOVERY
    LU FR RECORD SLAVE( )
    PICK FR RECORD( )
    PRINT SDOWN RECORD( )
  FR Database Access Functions
    FR RECORD CREATE( )
    FR RECORD FIND( )
    FR RECORD CLEAR( )
    FR RECORD UPDATE( )
    FR RECORD FIND FIRST( )
    FR RECORD FIND NEXT( )
Threshold Alarms
  INTRODUCTION
  Functional Overview
    Failed Channel Thresholds
      Out of Service Threshold
      Nodal Threshold Values
    Global Threshold Values
      Error Displays
    Pending Soft Down (PSD)
  Design Overview
    Fake Card Types
    Card Groups
  PROGRAM DESIGN
    THRESHOLD ALARMS CHECK
    CHECK OOSTHRESH( )
    FIND NUM CH( )
    DX NUM DATA LINES( )
    FIND NUM FAIL OOS CH( )
    GET MJ MN OOS THRESH( )
    FIND REMOTE TOT FAIL OOS( )
    CHECK THRESHOLD ALARMS( )
    CHECK THRESHOLDS( )
    SI REPORT THRESH ALARMS( )
    TA UPDATE FR TABLE( )
    FRM FIND TA CRD TO UPDATE( )
    TA UPDATE FR RECORD( )
    FRM TA FIND FR UPDATE COUNT( )
    FRM TA IS CH FAIL OOS( )
    FIND FIRST CRD IN GRP( )
    FIND NEXT CRD IN GRP( )
    FIND GRP( )
    GET CGRP( )
    GET CGRP THRESHS( )
    GET CGRP GLOBORNOD( )
    GET CGRP PERCENT( )
    CARD GROUP DATA STRUCTURES
      Card Type to Card Group
      Card Group to Thresholds

Introduction

The following disclosure describes a method and hardware environment for using an expert system to provide error analysis and rectification in a communications multiplexing system that provides higher availability and increased data throughput.

The invention runs a set of tests on each channel to ensure that each is operating properly, isolates the source of hardware failures and gives appropriate, corrective actions. The set of tests depends on the resource type. If one of the prescribed tests for a resource under test fails, error analysis attempts to isolate the cause of the failure to a specific FRU. This is accomplished by running additional tests.

Error analysis also ensures that the results of each test are correct and repeatable. Each time a test fails, a number of tests are performed to ensure that the channel is the sole cause of the failure.

In order to ensure that all information about failures are checked by error analysis, all errors reported by systems integrity are processed by error analysis before being entered into the hardware error table.

Each error logged by error analysis in the hardware error table contains a field for suggested actions. The suggested action is displayed when detailed error information is requested by a user.

Hardware Environment

The preferred embodiment of this invention is described in a CBX digital, multiplex communication environment. An example of a prior art hardware environment, similar to the preferred embodiment, is provided in FIG. 1, which illustrates the computer control equipment associated with the prior art ROLM CBX II 9000. Thehardware consists of redundant memory 10, a shared, switched I/O bus (ISB) 20, various interface cards 30, optional disk 40, and redundant processors 50. A remote node attachment is also provided via the Inter Node Link (INL). A more complete discussion of the hardware environment is provided in the *ROLM CBX II 9000 Business Communications System,* published by ROLM Corporation (1986).

The best mode of hardware for practicing the subject invention is shown in FIGS. 1A, 1B, 1C and 1D. FIG. 1A illustrates the hardware shelf layout of the invention. Shelf one 51 is a common control shelf in a redundant system cabinet or another Time Division Multiplex (TDM) card shelf in a nonredundant system cabinet. Shelf two 52 is always a common control shelf. Shelves three 53 and four 54 are always TDM card shelves. Air cooling systems and redundant power systems are provided at 55 to dissipate heat and provide system power.

Figure 1B:
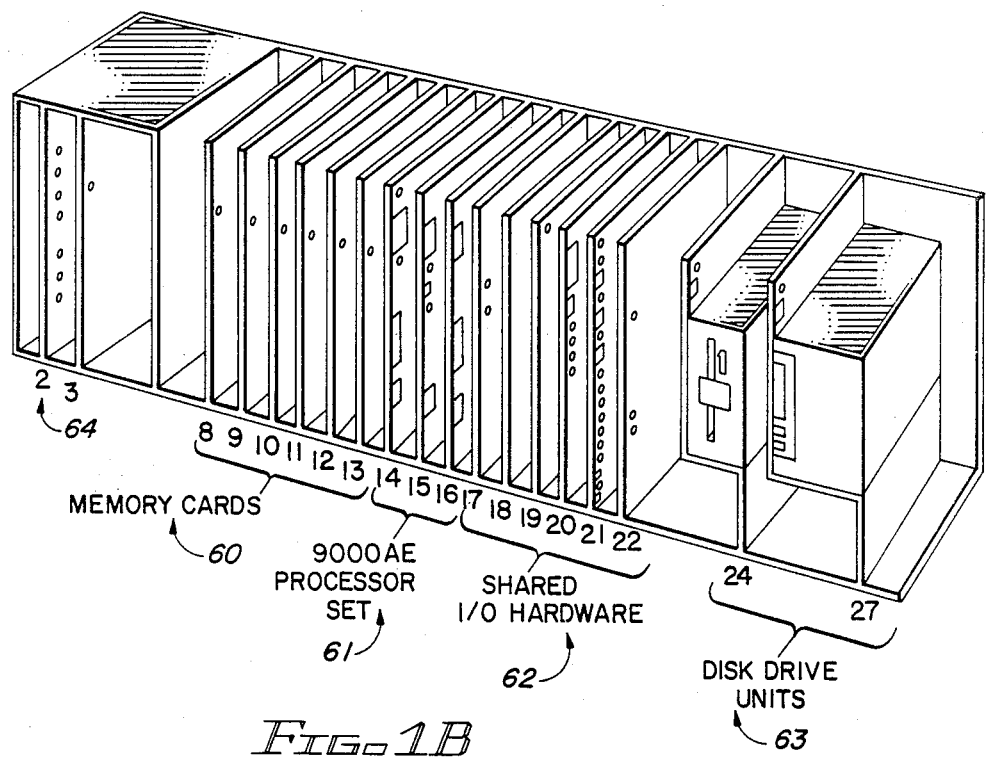
FIG. 1b is an illustration of the CPU shelf slots of the common control shelf of the best mode of the invention.

FIG. 1B illustrates the CPU shelf slots of the common control slot 52. As shown, there are memory cards 60, processor set 61, shared input/output (I/O) hardware 62, and disk drive units 63. The processor cards contain the microprocessors that the error analysis software execute on. Additionally, there is a common control motherboard 64 that joins the memory cards 60, the processor set 61 and the shared I/O hardware 62 to the system bus. The common control motherboard 64 is used to join the other common control motherboard from the redundant common control shelf 51 and the TDM shelves 53 and 54.

Figure 1C:
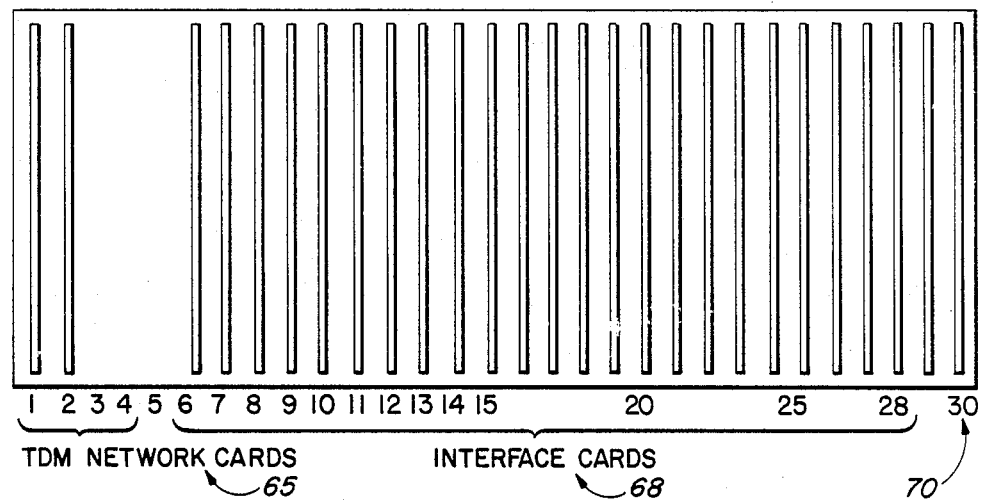
FIG. 1c is an illustration of the TDM shelf slots. of the best mode of the invention.

FIG. 1C shows the TDM shelf cards. The extended length cards fit into the slots shown at 65. The other TDM cards occupy the slots at 68. Slot 70 is reserved for Line Shelf Monitor LSM which monitors the power supply and contains the fuses. If LSM detects a power supply failures or fuse failures, it is reported to error analysis by a scanner reporting a monitor error. Error analysis then parses specific decision trees to generate suggested actions.

Hardware Description

Figure 1D:
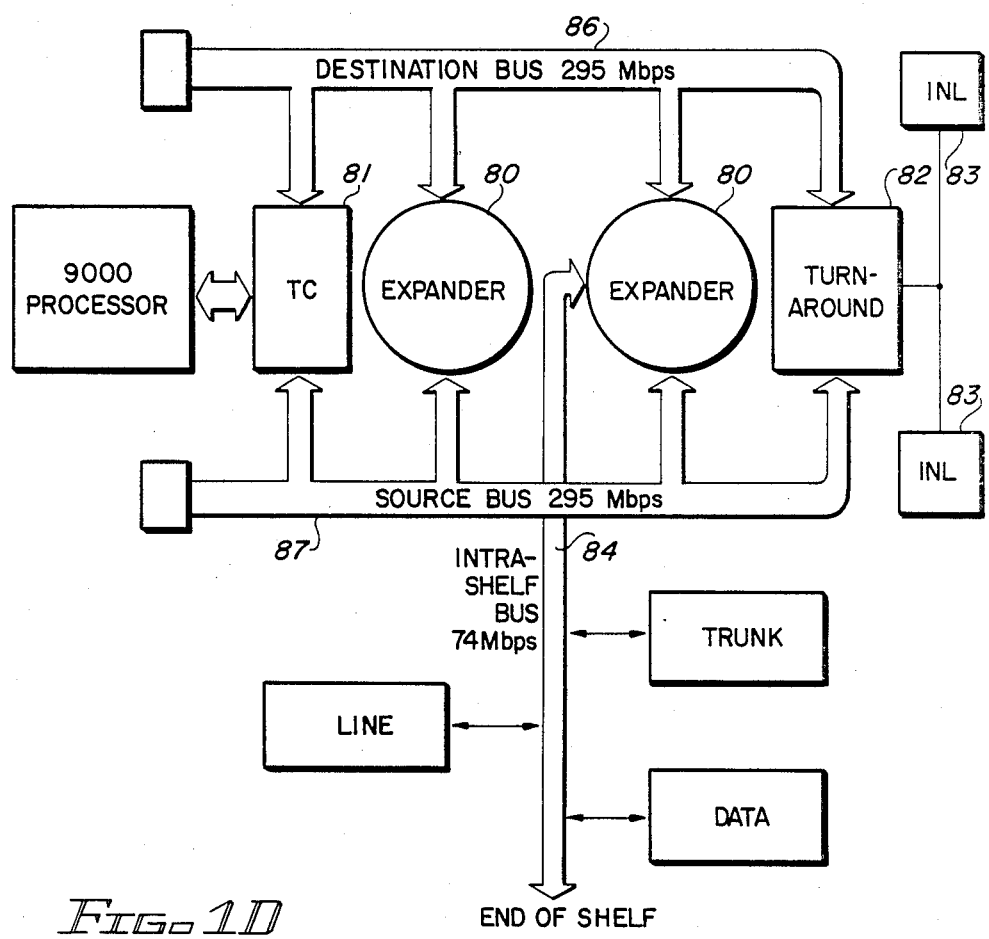
FIG. 1d is a block diagram of the hardware environment of the central branch exchange in accordance with the invention.

The following hardware description discusses FIG. 1D. The hardware is a functional representation of the preferred embodiment.

SINGLE-NODE COMMUNICATION

Nodes are the modular building blocks of the CBX system. Each node can function as a stand-alone telecommunications system consisting of the time division multiplexing (TDM) switching network, processors, cabinet and power system, and interface cards. A single-node system can expand from one to five equipment cabinets to accommodate up to 2,000 lines.

The CBX is a digital switching system using TDM and pulse code modulation (PCM) to upport a wide range, of voice, data, and specialty applications. A 32-bit processor and Random Access Memory (RAM) provide control intelligence within each node.

Time Division Multiplexing

Multiplexing is a method of using a single communications channel to carry multiple speech and/or data transmissions simultaneously. Through TDM channel use is alternated between users or between system functions, each receiving a small portion of channel time (a time slot) in rotation. The channel seems to be reserved for each individual transmission, but because of the high-speed channel, it carries many transmissions simultaneously.

Pulse Code Modulation

When the first CBX was shipped in 1975, ROLM was the first vendor in the industry to use PCM technology. PCM is the process which analog sound waves of voice conversations are sampled, translated into digital signals, transported over the TDM network, and reconstructed into analog signals. The CBX samples voice signals at 8,000 times per second. The samples are converted into 8-bit binary words, which are transmitted over the data bus.

This chapter describes the four major components of a single-node communications system. They are presented in the following order:

TDM switching network
 Computer common control
 Cabinetry and power system
 TDM interfaces to voice, data, trunk, and other resources

TDM SWITCHING NETWORK: BUS

Broadly defined, Bus is the entire TDM switching network. It maintains the connections established by the processor and passes information between the common control electronics and the telephones, terminals, and trunks. Bus is the vehicle for intranode communication.

Bus is a 16-bit, parallel, unidirectional bus that has a capacity of 5 megabits per second (Mbps). It provides 1,152 two-way or full-duplex communications channels, of which 928 are available for voice/data traffic. The system uses the remaining channels for various control functions, such as setting up phone displays.

TDM Network

The major components of intranode communication are the TDM Network Control Group. This group consists of the:
Intrashelf Bus 84
Intershelf bus 85
Expander 80 cards
TDM controller cards

Intrashelf Bus 84

On the back of each TDM shelf is an Intrashelf Bus 84 implemented on the TDM backplane. The Intrashelf Bus 84 permits communication within a shelf. On each TDM shelf, one Expander 80 card plugs into each Intrashelf Bus 84. Expander 80 cards provide the interface between the Intrashelf Bus 84 and the intershelf bus (ISB).

The total bandwidth available on the Intrashelf Bus 84 is 74 Mbps. Each Intrashelf Bus 84 includes a 16-bit bidirectional data bus, a 10-bit address bus, and an "enable" line to each card. The enable line eliminates the need for configuring each card with a particular shelf address, so that interface cards can occupy any slot on the shelf. In addition, the enable line simplifies address decoding, which increases reliability.

Intershelf Bus 85

The ISB, an integral part of the proprietary Bus structure, handless communication among shelves through a flat, ribbon cable attached to the TDM controller (TC 81) card and the Expander 80 cards on each shelf.

The ISB supports a data rate of 295 Mbps over two unidirectional buses: the source bus 87 and the Destination bus 86.

Expander Cards

If a system has redundant processors, the Expander 80 cards are also redundant. When one common control side of the cabinet is active, one of the Expander 80 cards is in use, while the redundant (inactive) common control side and other Expander 80 card will wait to become active.

Each Expander 80 card contains a connection table for all voice and data connections affecting its shelf. This frees intrashelf bandwidth for call data, instead of consuming bandwidth for the address information needed to make connections.

The Expander 80 cards, TC 81 card, and Turnaround 82 card use the Bus ISB clock (located on the Turnaround 82 card) for timing the Bus traffic. This maintains the correct timing relationship between the data, which travels along the bus, and the clock pulses. The runaround card also sends out a pulse at the beginning of each sampling interval The pulse tells the Expander 80 card to start again with the first entry in the connection table.

TDM Controller Card

The Bus TC 81 card, maintains supervision of the processor-ISB-interface communication. TC 81 cards reside on the common control shelves in cabinet 1 of a CBX node. The TC 81 card is responsible for the following three activities: loading and verifying the connection table on each Expander 80; configuring the runaround card and InterNode Link (INL 83) hardware; and communicating with the various line card groups. The TC 81 card handles up to 12 Mbps of control information.

The TC 81 card signals its activities by using a bus control field. Control packets contain addressing, control, and data information for loading the Expander 80 connection tables and reading the status of line cards.

The TC 81 cards maintain a communications path between the two ends of a voice or data call. The processor, through the TC 81 card, switches digitized signals by assigning them to unique time slots on the ISB. The Bus ISB uses TDM techniques, which enable the ISB to carry a large amount of simultaneous voice and data transmission.

TDM Controller Card

The Bus TC 81 card, maintains supervision of the processor—ISB-interface communication. TC 81 cards reside on the common control shelves in cabinet 1 of a CBX node.

The TC 81 card us responsible for the following three activities: loading and verifying the connection table on each Expander 80; configuring the Turnaround 82 card and InterNode Link(INL 83) hardware; and communicating with the various line card groups. The TC 81 card handles up to 12 Mbps of control information.

The TC 81 card signals it activities by using a bus control field. Control packets contain addressing, control, and data information for loading the expander connection tables and reading the status of line cards.

The TC 81 card maintain a communications path between the two ends of a voice or data call. The processor, through the TC 81 card, switches digitized signals by assigning them to unique time slots on the ISB. The bus uses TDM techniques, which enable the ISB to carry a large amount of simultaneous voice and data transmission.

Turnaround Card

As its name implies, the Turnaround 82 card turns the data around of bus. The Expander 80 card on the transmitting card's shelf places a data word on the source bus 87 the data word travels to the right until it encounters the Turnaround 82 card, which receives the word and retransmits it ("turns it around") to the Destination bus 86. Then the Expander 80 on the destination shelf captures the word and sends it on to the proper card.

The advantage of using the runaround card is that information retransmitted in an individual time slot to the Destination bus 86 and the receiving card can be completely different from information received in that time slot from the source bus 87 and the transmitting card. This doubles the traffic capacity of the switch by allowing two internode conversations to take place in a single time slot on the bus.

To further understand how this occurs, imagine that a conversations is taking place on telephones with connections in node A. The system transmits a voice sample on the node-A source bus 87, and the sample encounters the Turnaround 82 card, which places this sample on the destination part of the same bus. The time slot on the destination part of the node-A bus has now become free.

The Turnaround 82 card can fill this empty slot with a voice sample from the other end of the conversation. In this way, the signals from both ends of the conversation can occupy the same time slot simultaneously.

System Clock

In each node of a multinode CBX system, the system clock provides timing for the TDM network via the Turnaround 82 card. It also synchronizes INL 83 operation between nodes. The source of this clock can be its own internal system, or it can synchronize from an external T1 interface trunk. The system clock conforms to Stratum 4 of the Bell Network Synchronization Plan.

Bus Capacity

The new Bus provides the CBX with 2,304 timeslots per node. Bandwidth is the measure of voice and data traffic capacity in the CBX. The clock speed of the Bus 16-bit parallels backplane is 18,432 MHz. The total bandwidth of the system is, therefore, 18,432 megahertz/second $\times$ 16 bits/cycle = 294.912 Mbps.

To restate this in terms of communications channels: since the CBX sampling frequency is 8 kHz, the bandwidth in each direction of a communications channel of the 16-bit backplane is 8,000 samples/second $\times$ 16 bits/sample = 128,000 bps (128 Kbps).

Therefore, the total bandwidth in a node with Bus is 1,152 channels $\times$ 128 Kbps $\times$ 2 connections/fill-duplex channel = 4,912 Mbps in each node. Thus, the total bandwidth for a 15-node system with bus is 15 nodes $\times$ 5 Mbps/node = 4.425 Gbps (or 4,425,000,000 bps).

COMPUTER COMMON CONTROL

The CBX offers the advantage of computer common control. With the stored programs of computer common control, it is easy to update features as business needs change. This provides greater flexibility and reduces the cost of feature additions and other changes that may be made in the future.

The computer common control group directs all activities within the CBX system. A single-node CBX supports 1 or 2 common control shelve. Shelf 2 of cabinet 1 always houses a computer common control group. To increase reliability in critical applications or larger systems, shelf 1 can accommodate a second, or redundant, common control group. These groups consist of:
  Processor
  Memory
  TDM control card
  Floppy disk drives
  A hard disk drive (shelf only)
  Peripheral device controller
  I/O cards
  Diagnostic cards
  Control Packet Network Interface (multinode only)

Processor

The 9000 is a 32-bit processor employed by the CBX. It is a ROLM-proprietary design using powerful, high-speed, bit-slice technology, with a ROLM proprietary instruction set. A single node configuration supports form 7,500 to 11,000 Busy Hour Call Attempts (BHCA); that is, the total number of call setups attempted during the hour when the CBX carries the most traffic. In a redundant system, the processor controlling the system is the active processor; the other one is the standby processor. Either processor can provide standby common control to prevent a failure in the active common control from halting system operation. The active processor continually transfers new information, such as moves and changes, Station Speed Calling information, as well as calls-in-progress information to the standby computer. Therefore, in the event of a switchover from the active computer, the standby computer always contains current information regarding the state of the system.

Every 24 hours, there is a systematic switchover from the active processor to the inactive processor (usually late at night) to ensure operational readiness of the standby processor. This redundancy results in virtually uninterruptable system operation.

Memory

The CBX uses RAM to store all system software. Stored in memory are the system operating software, system-specific configuration parameters, and operating data. Each processor can access up to four memory cards. Each memory card accommodates 1 million words of memory, with each word composed of 16 bits plus 6 Error Correcting Code (ECC) bits. A computer industry technique, ECC improves the accuracy with which the system memory retains information. By automatically detecting and correcting all memory single-bit errors and detecting most multiple-bit errors, ECC minimizes the likelihood of a system failure due to a malfunctioning memory component. Systems with redundant processors are capable of detecting multiple-bit errors and automatically switching to the redundant computer. In addition, a hardware register on the memory card enters errors into a table to aid servicing.

The major advantage of ECC is the elimination of "soft errors" that can generate numerous service calls. Soft errors are intermittent malfunctions, usually of short duration and low frequency, that might result from the execution of specific data patterns, the temperature of the room or static electricity. Soft errors can cause erratic system behavior, forcing service personnel to spend hours troubleshooting a fault that may not exist. The error detection and correction capability improves the reliability of the CBX system and eliminates needless hours of "trial and error" troubleshooting.

Enhanced Communications Processor

The enhanced Communications Processor (ECP) is a two-card processor that provides faster data call setup, a foundation for future data products and applications, and more efficient use of the CBX processors. The ECP off-loads the data call setup messages from the CBX processor. It also allows call setup to occur at the baud rate of the calling device. This facilitates the use of popular PC-based communications packages that permit automatic data call setup. Supporting the ECP are the Data Front End (DFE) cards which reside on TDM shelves.

DISK SYSTEMS

Peripherals housed on shelf 2 consist of two 3.5-inch, 1.44M floppy disks and one 5.25-inch, 40M hard disk, and a peripheral device controller (PDC) card. The right-hand end of the shelf contains the disk assemblies. IBM provides the CBX System Software, Release 9004.3, and diagnostic programs on floppy disks. The floppy disk system stores Initial Program Load (IPL)

software, a back-up copy of the current site data base, and software updates (new software releases).

IPL is a "cold start" that loads information from a floppy disk into the system's main memory and is then written onto the 40M hard disk assembly. IBM technicians perform IPL at a customer's site when they install a system. The hard disk system contains disk storage media that are sealed form the environment to provide a high degree of reliability. The hard disk contains the operating system program It also has sufficient storage for certain voice and data applications to store information on a real-time basis. For example, the hard disk stores configuration tables, Moves, Adds, and Changes (MAC), and Forced Authorization Codes (FAC). Use of a hard disk provides faster access for configuration and move-and-change support that available from floppy disks.

Automatic Program Load (APL) software monitors the operating system program. After a power outage exceeding 20 minutes on ac systems (the maximum time the emergency battery will maintain memory until power is restored), APL reloads the system program automatically from the hard disk. Prior to that, memory is stored in RAM. APL for dc systems is necessary only if the system loses operational battery power (a rare occurrence).

DIAGNOSTIC CARDS

Diagnostic cards (the System Monitor Card [SMC] and Redundant Shelf Monitor [RSM] are housed on the common control shelves.

System Monitor Card

The SMC provides fuse/circuit alarm detection, software alarm detection, temperature alarm detection, power-failure detection, and dc voltage monitoring. This printed circuit card resides in one slot of the common control shelf (shelf 2) in both redundant and nonredundant configurations.

Power-failure indicator LED's located on the SMC, light when voltage drops. LED's also provide a high-temperature warning. Fuse-alarm circuitry generates both visual and audible alarms should a fuse malfunction. External systems, such as a Network Control Center (NCC), can monitor electrical interfaces on the SMC. These interfaces notify NCC personnel that a node has had a specific problem.

Redundant Shelf Monitor

The RSM provides redundant common control shelf status for SMC. One RSM resides on the redundant processor shelf (shelf 1) in Models 50 and 70.

Local Shelf Monitor

One Local SHelf Monitor (LSM) resides on each TDM or INL 83 shelf. LSM's monitor TDM shelf power and temperature status and notify the SMC of problems.

I/S PORTS

Two I/O prot cars, the Service Maintenance Port (SMP) and the Quad Serial I/O port, provide I/O interface.

Service Maintenance Port

The SMP is a 4-channel maintenance interface that resides on common control shelf 2. Two of the four ports on the SMP are permanently assigned to the system terminal and the system modem.

The two available ports can support:
Automatic Call Distribution terminals
System administration data link
Call Detail Recording list device

Quad Serial I/O Port

Located on shelf 2 in the switched I/O bus, the Quad Serial I/O card is an optional card used to increase the number of devices a system can support. The Quad Serial I/O card supports up to four devices used for features such as Expanded Traffic Reports, Automatic Call Distribution (ACD) statistics, and MAX. The Quad Serial I/O card supports the following RS-232-C ASCII devices, which run at data rates of up to 9.6 Kbps:
Modems
Printers or output-only devices
"Smart" and "nonintelligent" terminals
Automatic Call Distribution terminals
Interface to the PhoneMail Application Processor

CABINETRY AND POWER SYSTEM

A node consists of one to five connected equipment cabinets. The maximum single-node configuration has 5 cabinets and a total of 20 shelves. When viewed from the front, cabinet 1 is on the left with shelves 1 to 4. Cabinet 2 is next with shelves 5 to 8, while cabinet 5 is on the far right with shelves 17 to 20.

Shelves contain three categories of equipment: computer common control; TDM interface cards for line, data, or trunk interface; and INL 83 for internode communication of voice and data information.

A more detailed discussion of the preferred mode of operation is provided in the ROLM System Service Manual, ROLM Corporation, October 1987.

One of the cards that occupies a TDM slot 68 of the above described TDM shelf in FIG. 1C is the new Advanced Diagnostics card. FIG. 2 illustrates a block diagram of the card. A Z80 microprocessor 100 is used to control the Advanced Diagnostics card (ADC) and process the logic. The tasks which implement the logic that enable the error analysis execute commands on the Advanced Diagnostic Card (ADC). Many of the tests that are described in the Dctailed analysis decision tree processing use the ADC. The supervisory task logic executes on one of the processors in the CBX. The time division multiplexer TDM buffer 110 is the interface between the ADC and the TDM data bus 140. Two types of data exchanges occur: test and control. The state control 120 and the Signal Processing Interfaces (SPI) 130 filter incoming signals, perform correlation of the signals and perform signature analysis of the various cards in the CBX. The ADC also generates multiple functions and can produce sine waves, square waves, triangular waves, piecewise linear functions, noise, digital signatures and combinations of the above.

ADC Architecture

The Advanced Diagnostic Card (ADC) is used to generate and process test data. The card is a multiple function generator which can produce sine waves, square waves, triangular waves, piece-wise linear functions, noise and combinations of the above, as well as digital test patterns suitable for signature analysis.

The card is also a flexible analysis device. It can filter incoming signals, do RMS estimates, perform correlation, and do signature analysis. Thus it can be used as a generator to test register-type cards, as a receiver to test sender-type cards, and as both a sender and receiver to test cards with whom a full duplex connection can be made.

Operation

A block diagram of the card is shown in FIG. 2. It consists of three major areas: the Time Division Multiplexer (TDM) buffer, the Z80 controller, and the signal processing section.

TDM Buffer

The TDM buffer is the interface between the ADC and the TDM data bus. Data from the bus is written to the buffer, and read by the ADC. Data from the ADC is written into the buffer and read by the TDM.

Two types of data exchange can occur: test and control. Test signals constitute signals to or from the ADC used to test another card. For example, we would send a DTMF digit from the ADC when testing a DTMF register. Control involves commands from and responses to the on-line software. For example, Run DTMF register Test would be a typical command; Test Complete a typical response. Test data are exchanged in the continuous field of the connection table, while commands and responses occur in the immediate field.

Z80 Controller

The Z80 microprocessor is used to control the ADC. It accepts commands from the software, sets up the signal processors to perform the actions commanded, and reports the results of the tests to the software. The Z80 is interrupted by immediate field cmmands from the software, and is unaffected by continuous field connections.

Signal Processing Section Most of the actual signal processing is done by the three NEC DP7720 Signal Processing Interface (SPI) chips. These chips are specifically designed for signal processing applications. One of the SPIs is dedicated to signal generation, one to signal detection and one to control.

Data is moved between the SPI chips and port 1 of the TDM buffer by the SPI Controller. Port 1 gives the SPI Controller the next-highest priority behind a transmit to the TDM bus. The SPI Controller is a ROM-controlled state machine. It can address 256 words in the TDM buffer RAM. It can also control the individual RESET and INTERRUPT lines on each SPI chip. It can do both conditional and unconditional jumps, has a 1-microsecond instruction cycle, and is driven by a 16 MHz clock, which is also used to drive the 8 MHz clocks for the SPI chips and the Control Processor.

Switches and LEDs

There is one red LED on the ADC. When lit, it indicates that the card has been DOWNed by system software. The LED is also lit when the umbilical cord is attached to the card. There are no switches on the card.

Connector Pinouts

The ADC uses the P2 connector to communicate to the TDM bus. The card also draws power from the +5 V and +15 V pins of the P2 connector. The P3 connector is used by the umbilical cord. The P1, P4, or P5 connectors are not used.

Connectors

FIGS. 3, 4 and 5 illustrate the pin numbers, signal names, sources, destinations, and functions of the P2 connector. A similar illustration for the P3 connector is provided in FIG. 6.

Transmit Commands

Figures 6, 8, 9, 10:
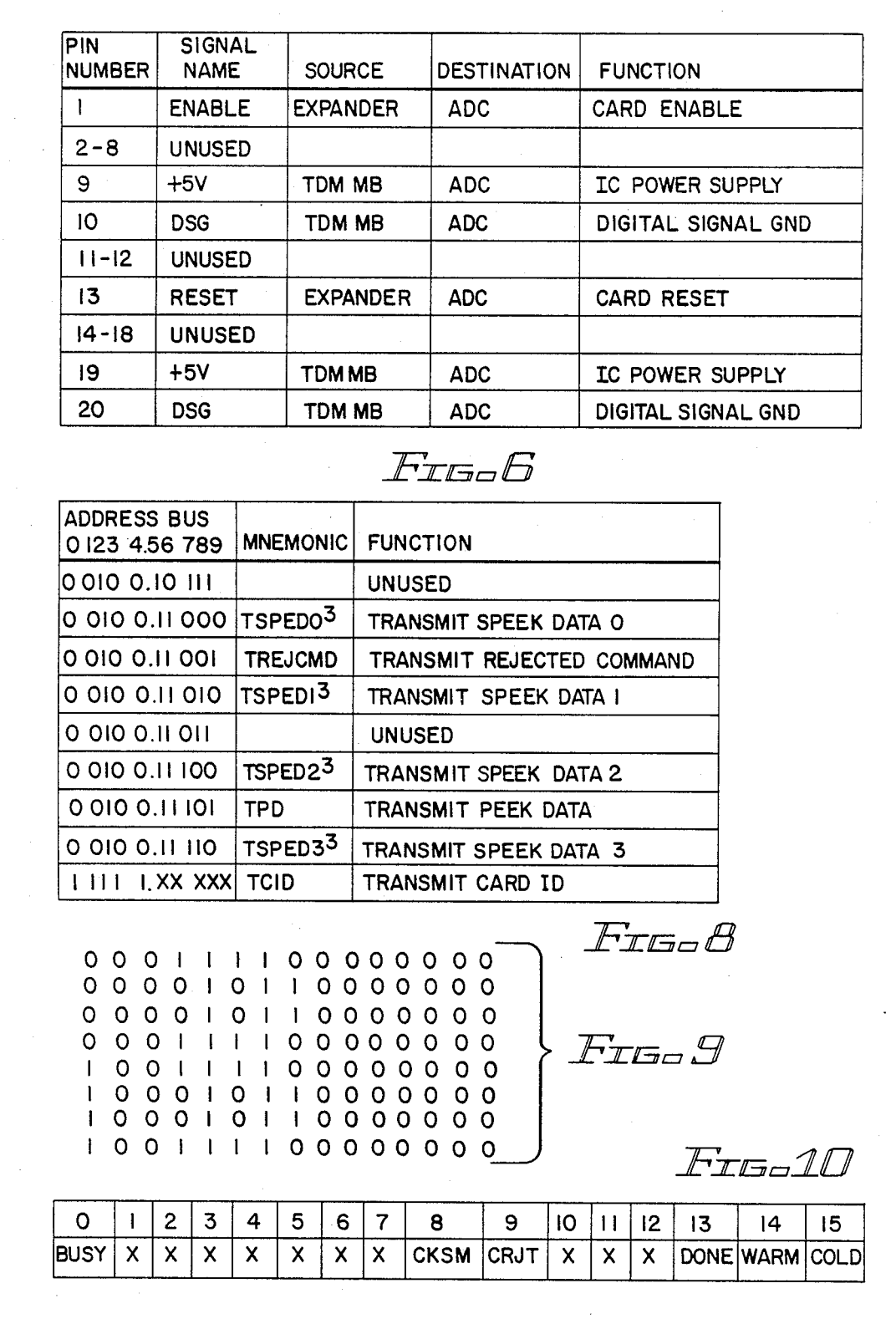

The transmit commands bit configurations, Mnemonics and functions are presented in FIGS. 7 and 8. A discussion of the individual commands follows.

(0 010 0.00 000) X0ADC—Transmit Stimulus 1

The Transmit 0 command (X0ADC) causes the ADC to continuously generate a stimulus. The stimulus can be the sum of any of seven different inputs (sinewave, noise, etc.) depending on the test. See X1ADC for mu-law equivalent output.

(0 010 0.00 010) X1ADC—Transmit Stimulus 1

The Transmit 1 command (X1ADC) causes the ADC to continuously generate a mu-law stimulus. The stimulus can be the sum of any of seven different inputs (sinewave, noise, etc.) depending on the test. See X0ADC for linear equivalent output.

(0 010 0.00 100) X2ADC—Transmit Stimulus 2

The Transmit 2 command (X2ADC) causes the ADC to continuously generate a stimulus. The stimulus can be the sum of any of seven different inputs (sinewave, noise, etc.) depending on the test. The X2ADC is a second sum, similar to X0ADC, allowing a second stimulus to be generated. See X3ADC for mulaw equivalent output.

(0 010 0.00 110) X3ADC—Transmit Stimulus 2 mu-law

The Transmit 3 command (X3ADC) causes the ADC to continuously generate a mu-law stimulus. The stimulus can be the sum of any of seven different inputs (sinewave, noise, etc.) depending on the test. The X3ADC is a second mu-law sum, similar to X1ADC, allowing a second stimulus to be generated. See X2ADC for linear equivalent output.

(0 010 0.00 111) TDMW—Transmit Digital Milliwatt

The Transmit Digital Milliwatt command (TDMW) causes the ADC to continuously generate the digital milliwatt pattern. The mu-law binary pattern for this test is illustrated in FIG. 9.

(0 010 0.01 000) X4ADC—Transmit FIR Output

The Transmit 4 command (X4ADC) places the output of the FIR stage onto the TDM bus. This signal is mainly for diagnostic use (to check the FIR frequency response). However, it does enable the ADC to be used as a digital filter stage. See X5ADC for mu-law equivalent output.

(0 010 0.01 010) X5ADC—Transmit FIR Output mu-law

The Transmit 5 command (X5ADC) places the mu-law output of the FIR stage onto the TDM bus. This signal is mainly for diagnostic use (to check the FIR frequency response). However, it does enable the ADC to be used as a digital filter. See X4ADC for linear equivalent output.

(0 010 0.01 011) TZSC—Tmt Z80 Status and Clear

The Transmit Z80 Status and Clear command (TZSC) reads the Z80 status register and then clears the register to all zeros. Referring to FIG. 10, the Most Significant Bit (MSB) is set to one when the Z80 is busy. The CKSM bit is set to a 1 if the test table in RAM contains a checksum error. The Z80 continuously verifies the test table by performing a checksum to ensure that the table has not been corrupted. The CRJT bit is set to a 1 to indicate that a RTESTN command has been rejected. The rejected command can be read back using the TREJCMD command. A command will be rejected for the following reasons:

(1) A non-implemented test number was requested. (2) The Z80 is already busy running another test. (3) A test table of zero was specified for a test that requires a test table. A test table other than zero was specified and the test table is not loaded or the test table has a checksum error.

The DONE bit is set to a 1 when a test completes. It will be cleared to a zero when the next test starts. The WARM bit is set to a one when the Z80 performs a warm reset (initiated by the WRST software command). The COLD bit is set to a 1 when the Z80 performs a cold reset (initiated by a DOWN command, system normalize or umbilical cord). It is important to note that while a test is running, only the TZS command should be used to poll the BUSY bit. The TZSC command causes an interrupt to the Z80 and if too many interrupts are received, the test results may become invalid.

(0 010 0.01 100) TZS—Transmit Z80 Status

The Transmit Z80 Status command (TZS) reads the Z80 status register without clearing the register. Referring again to FIG. 10, the BUSY bit is set to a 1 when the Z80 is busy running a test. The CKSM bit is set to a 1 if the test table in RAM contains a checksum error. The Z80 continuously verifies the test table by performing a checksum to ensure that the table has not been corrupted. The CRJT bit is set to a 1 to indicate that a RTESTN command has been rejected. The rejected command can be read back using the TREJCMD command. A command will be rejected for the following reasons:

(1) A non-implemented test number was requested. (2) The Z80 is already busy running another test. (3) A test table of 0 was specified for a test that requires a test table. A test table other that 0 was specified and the test table is not loaded or the test table has a checksum error. The DONE bit is set to a one when a test completes. It will be cleared to a zero when the next test starts. The reset (initiated by the WRST software command). The COLD bit is set to a 1 when the Z80 performs a cold reset (initiated by a DOWN command, system normalize or umbilical cord).

(0 010 0.01 101) TZD—Transmit Z80 Data

The Transmit Z80 Data command (TZD) sends the data results from the tests to the TDM Bus. See individual tests for information on the data. Transmit Z80 Data Count Out (TZDCO) has a count of the number of data words waiting to be output. Starting a new test flushes all the remaining data words.

(0 010 0.01 110) TZDP—Transmit Z80 Data Permanent

The Transmit Z80 Data Permanent command (TZDP) sends the Z80 output data to the TDM Bus. This command should be used when making a permanent field connection.

(0 010 0.01 111) TZDCO—Transmit Z80 Data Count

The Transmit Z80 Data Count Out command (TZDCO) sends the count of words ready to output to the TDM Bus. When a test finishes, the data is readied to output via TZD and the count of data words to output is loaded here, each time a TZD is executed the count is decremented by one until it reaches zero.

(0 010 0.10 001) TZDCI—Transmit Z80 Data Count In

The Transmit Z80 Data Count In command (TZDCI) sends the count of words left to be received from the TDM bus. When a test starts it sets the count required and when the count reaches zero the test starts.

(0 010 0.11 000) TSPED0—Transmit Speek Data 0

The Transmit Speek Data 0 command (TSPED0) is part of the SPI monitor. Used with the RSPEA0 command, any location in the SPI RAM can be transmitted out to the TDM bus. The RSPEA0 command should have loaded the address of the location prior to TSPED0 reading the data. It is important to note that this command is intended for off-line use.

(0 010 0.11 001) TREJCMD—Transmit Rejected Cmd

The Transmit Rejected Command (TREJCMD) sends the last test number, specified with RTESTN, that was rejected by the ADC. When the RTESTN command is rejected, the command reject (CRJT) bit is set in the TZSC/TZS register.

(0 010 0.11 010) TSPED1—Transmit Speek Data 1

The Transmit Speek Data 1 command (TSPED1) is part of the SPI monitor. Used with a preset address (spoked address), any location in the control SPI's RAM can be transmitted out to the TDM bus. It is important to note that this command is intended for off-line use.

(0 010 0.11 100) TSPED2—Transmit Speek Data 2

The Transmit Speek Data 2 command (TSPED2) is part of the SPI monitor. Used with a preset address (spoked address), any location in the generation SPI's RAM can be transmitted out to the TDM bus. It is important to note that this command is intended for off-line use.

(0 010 0.11 101) TPD—Transmit Peek Data

The Transmit Peek Data command (TPD) is used to transmit any location in the Z80 RAM out to the TDM bus. The RPA command is used to set the address of the desired RAM location.

(0 010 0.11 110) TSPED3—Transmit Speek Data 3

The Transmit Speek Data command (TSPED3) is part of the SPI monitor. Used with a preset address (spoked address), any location in the detection SPI's RAM can be transmitted out to the TDM bus. It is important to note that this command is intended for off-line use.

(1 111 1.XX XXX) TCID—Transmit Card ID

The Transmit Card IDentification command (TCID) allows the on-line software to verify the card type and revision number of the ADC. The command returns the following information:
(a) Card ID Field: A value of 00011010 (hex 1A) signifies an ADC card.
(b) Card Revision Number: This field displays the card revision number.

Receive Commands

The receive commands address bus addresses, mnemonics and functions are illustrated in FIGS. 11 and 12. A description of each command and its function is provided below.

(0 000 0.00 000) R0ADC—Rcv. Sample Input Word 1

The Receive 0 command (R0ADC) sets up a continuous TDM connection to the ADC for receiving data (FIR input, signature by sample input) for analysis.

(0 000 1.XX XXX) DOWN—Cold Reset to Card

The DOWN command is the software equivalent of System Normalize (SYN) except it disables data transmission onto the TDM data bus and lights the down LED.

(0 000 0.00 010) R1ADC—Rcv. Sample Input Word 2

The Receive 1 command (R1ADC) is another input for receiving data. See R0ADC for more details.

(0 001 1.XX XXX) UP—Return Card to TDM Data Bus

The UP command enables data transmission onto the TDM data bus and extinguishes the DOWN LED.

(000 0.01 101) RZD—Receive Z80 Data

The Receive Z80 Data (RZD) is used to receive data transferred to the ADC one word at a time. It is important to note that the RZD command causes an interrupt to the Z80. Data may be lost if it is used in the same frame as another command that interrupts the Z80 (e.g. The TDMW command).

(000 0.01 110) RZDP—Receive Z80 Data Permanent

The Receive Z80 Data Permanent (RZDP) is used to receive data transferred to the ADC one word at a time in the permanent field. It is important to note that the RZDP command does not cause an interrupt to the Z80.

(0 000 0.01 111) RTESTN—Receive Test Number

The Receive Test Number command (RTESTN) is used to pass a test number and a table number to the Z80.

(0 000 0.10 001) WRST—Warm Reset

The Warm Reset command (WRST) causes the Z80 to initialize as if a System Normalize (SYN) had been received. The only difference between Cold Reset and Warm Reset is that a Warm Reset is initiated by software and a Cold Reset is initiated by hardware (i.e. SYN).

(0 000 0.10 010) RSTR—Receive SPI Start

The Receive SPI Start command (RSTR) and any non-zero data starts the next SPI task in the task queue. It is important to note that this command is intended for off-line use.

(0 000 0.10 011) RSTOPT—Receive Stop Test

The receive stop test stops a running test. It must be used to stop the continuous sine test. It may be used to abort any other test. It is important to note that no results will be returned by a test that has been aborted.

(0 000 0.10 100) RSPEA0—Receive Speek Address 0

The Receive Speek Address 0 command (RSPEA0) loads the Speek address into SPI memory. The addressed data may be read via the TSPED0 command. It is important to note that this command is intended for off-line use. It must be sent in two consecutive immediate fields and one frame must pass before any data is read.

(0 000 0.10 101) LOADTBL—Load Test Table

The Load Test Table command (LOADTBL) copies the ROM test table into RAM as if it had been downloaded from on-line software. The test table in ROM may not be as up-to-date as the one downloaded by on-line software. This command should only be used for debugging and not as a substitute for downloading. This command is intended for off-line use.

(0 000 0.10 110) RSPOD0—Receive Spoke Data 0

The Receive Spoke Data 0 command (RSPOD0) is part of the SPI monitor. This and the RSPOA0 command allow us to write any location in SPI RAM from TDM control. RSPOD0 gives the ADC the data to be spoke'd (SPI poked). RSPOA0 should have been loaded with the address prior to the RSPOD0 loading the data. This command is intended for off-line use.

(0 000 0.11 000) RSPOA0—Receive Spoke Address 0

The Receive Spoke Address 0 command (RSPOA0) loads the Spoke address into SPI memory for the RSPOD0 data to be poked into. This command is intended for off-line use. It must be sent in two consecutive immediate fields and one frame must pass before any data is read.

(0 000 0.11 001) RUSA—Receive User Subr. Addr.

The Receive User Subroutine Address command (RUSA) allows a user subroutine to be invoked with a TDM command. The data passed is loaded into the task counter and therefore becomes the subroutine address. The user subroutine is terminated by a RET (Return from Subroutine) in the Z80 code.

(0 000 0.11 010) RSPOD1—Receive Spoke Data 1

The Receive Spoke Data 1 command (RSPOD1) is used to poke data into the control SPI. See RSPOA0 for the data format. This command is intended for off-line use.

(0 000 0.11 011) RPD—Receive Poke Data

The Receive Poke Data command (RPD) allows any location in the Z80 address space to be modified. The data to be written is taken from this command and the address is taken from the previous RPA command.

(0 000 0.11 100) RSPOD2—Receive Spoke Data 2

The Receive Spoke Data 2 command (RSPOD2) is used to poke data into the generate SPI. See RSPOA0 for the data format. It is important to note that this command is intended for off-line use.

(0 000 0.11 101) RPA—Receive Peek/Poke Address

The Receive Peek/Poke Address command (RPA) serves a dual purpose as it supplies the address to both the TPD and the RPD commands.

(0 000 0.11 110) RSPOD3—Receive Spoke Data 3

The Receive Spoke Data 3 command (RSPOD3) is used to poke data into the detection SPI. See RSPOA0 for the data format. It is important to note that this command is intended for off-line use.

Data Formats (Transmit and Receive Data)

FIG. 13 illustrates the sixteen bit pattern that is used for all transmit and receive data instructions. FIGS. 14 and 15 present the alternate patterns that are used for the mu-law data and the twelve bit linear data transmissions and receptions. It is important to note that for immediate field commands and all commands which interrupt the ADC control processor (commands with the least significant bit set), the spacing is one frame.

Test Descriptions

A description of the various test numbers and a brief description of their functions is provided in FIG. 16. A general description of the format used to describe how each test works and how on-line software should interact with the ADC when running the test. After the Description section, each of the other sections is listed in the chronological order that they must be executed. On-line software actions are referred to as SW and the ADC actions are referred to as ADC.

SW Connections are the TDM connections that on-line software must make before starting the test.

The SW Pre-test section is the RTESTN command that on-line software must use to start the test. If the ADC is busy running a test when RTESTN is received or the test number is invalid, the COMMAND REJECT bit is set in the TZSC/TZS status words and the requested test number is saved in TREJCMD.

The ADC Pre-test section is the initialization that the ADC performs before starting the test. In general, the BUSY bit is set. This bit will be cleared when the test completes. On-line software can poll this bit to determine when the test is done. If any parameter words are to be received, TZDCI will be loaded with the number of words. Each time a word is received via the RZD command, TZDCI will be decremented by one. When TZDCI reaches a count of zero, execution of the test will begin. While a test is running, only the TZS command should be used to poll the BUSY bit. The TZSC command causes an interrupt to the Z80 microprocessor on the ADC and if too many interrupts are received by the Z80, the test results may become invalid.

The SW Parameter Input section is the format of any additional parameters that on-line software may have to send to the ADC. The words are loaded using the RZD command.

The Execution section describes the actions performed by the ADC to execute the test.

The ADC Post-test section describes the actions that the ADC performs after running a test. Generally, TZD is loaded with the first result output word. TZDCO is loaded with the number of result output word available. Then the BUSY bit is cleared and the DONE bit is set.

The SW Post-test section describes the actions that the on-line software must perform after running the test.

The SW Result Output section describes the format of the result output from the ADC. The results are read using the TZD command. TZDCO indicates how many words are available. It is not necessary to read all the words. If more than TZDCO words are read, the pattern received from TZD will be the digital milliwatt shown in FIG. 9.

Test 1

Load Table Data: downloads a test table from system software into the ADC RAM.
SW Connections: None are required.
SW Pre-test:
  0001H to RTESTN, Start Test Number 1.
  NNNNH to RZD First word (i.e. word count) of test table to the Z80.
ADC Pre-test:
  8XXXH to TZSC Set busy
  8XXXH to TZS Set busy
  CCCCH to TZDCI Load the number of remaining words to be read.
SW Parameter Input: See FIG. 19 for a description of the tables to download.
Execution: The on-line software finishes downloading the table by sending one word (a maximum of once every frame) to RZD. The ADC reads one word for each RZD command and decrements the count in TZDCI until the count reaches zero.
ADC Post-test:
0XX4H to TZSC Clear busy and set done
  0XX4H to TZS Clear busy and set done
  The Z80 performs a checksum of the downloaded table.
  If the checksum is incorrect then XX8XH is ORed into TZSC and TZS.
SW Post-test: None
SW Result Output: None Test 2

Analog Loop Back/Channel Test: verifies all of the analog boards. Four measurements are performed: gain, distortion, idle channel noise and crosstalk. The test table specifies both marginal and failure limits. :p. The gain and distortion are calculated using one set of data. Two tones are generated for 128 milliseconds. One is at 305 Hz and the other is at 2992 Hz. The board under test is set into the analog loop back mode and the looped data is sent back to the ADC. A correlation is performed for each received tone to measure the gain of each tone. Distortion is measured by calculating the ratio of the received tone level to the total power received.

Idle channel noise is measured by sending silence to the board under test for 128 milliseconds and measuring the power of thelooped back signal after passing through a C-message weighted filter.

Crosstalk is measured by sending the two tones to the crosstalk channel for 128 milliseconds. A correlation is performed for each tone received from the channel under test to measure the level of any signal that has leaked through from the crosstalk channel.
SW Connections:
  X1ADC→Channel under test
  X3ADC→Channel for crosstalk
  R0ADC←Channel under test (analog loop back selected)

SW Pre-test:
  TT02H to RTESTN
  Start Test Number 2 (TT points to test table)
ADC Pre-test:
  8XXXH to TZSC Set busy
  8XXXH to TZS Set busy
SW Parameter Input: None
Execution: ADC runs channel test.
ADC Post-test:
  BBBBH to TZD load first result output word
  0009H to TZDCO load number of result output words
  0XX4H to TZSC clear busy and set done
  0XX4H to TZS clear busy and set done
SW Post-test: Remove connections.
SW Result Output:
  Word 1: Failures

| OXOX XOXX OXOX XOXX | | |
|---|---|---|
| | 1 | Marginal tone 1 level |
| | 1 | Marginal tone 2 level |
| | 1 | Marginal signal/power ratio |
| | 1 | Marginal idle channel noise |
| | 1 | Marginal crosstalk |
| | 1 | Failed tone 1 level |
| 1 | | Failed tone 2 level |
| | 1 | Failed signal/power ratio |
| 1 | | Failed idle channel noise |
| 1 | | Failed crosstalk |

Word 2: Measured tone 1 level in dB*128.
  Word 3: Measured tone 2 level in dB*128.
  Word 4: Calculated total tone power in dB*128.
  Word 5: Measured RMS power level in dB*128.
  Word 6: Calculated total tone power/RMS power level ratio in dB*128.
  Word 7: Measured idle channel noise RMS power level in dB*128.
  Word 8: Measured crosstalk tone 1 level in dB*128.
  Word 9: Measured crosstalk tone 2 level in dB*128.

Test 3

Digital Loop Back Test (8-bit): provides an 8-bit, mu-law encoded digital loop back verification. It generates a digital pattern that represents a dual-tone signal. The digital pattern is sent to the channel under test and the received loop back data is collected using a signature analysis. The calculated signature is compared against a table of valid signatures to verify that no errors have occurred.

To allow for channels with different delays, the valid signature table contains values for delays from 0 to 6 frame periods. To insure that the delay pipeline is cleared of any old data, the digital pattern is sent for a while before the signature analysis is begun.

A 1KHz tone is also generated that can be sent to another channel to check if there are any crosstalk problems.
SW Connections:
  X1ADC→8-bit digital channel under test
  X3ADC→8-bit digital channel for crosstalk
  R0ADC←8-bit digital channel under test (loop back selected)
SW Pre-test:
  TT03H to RTESTN Start Test Number 3 (TT points to test table)
ADC Pre-test:
  8XXXH to TZSC Set busy
  8XXXH to TZS Set busy
SW Parameter Input: None
Execution: ADC runs loop back test.
ADC Post-test:
  BBBBH to TZD Load first result output word
  0002H to TZDCO Load number of result output words
  0XX4H to TZSC Clear busy and set done
SW Post-test: Remove connections.
SW Result Output:
  Word 1 is used to report failures. If the most significant bit is set, then a failure occurred in the loop back test.
  Word 2 reports back the calculated signature analysis.

| DELAY | SIGNATURE |
|---|---|
| 0 | AE0F |
| 1 | C70C |
| 2 | D470 |
| 3 | 2D31 |
| 4 | 8003 |
| 5 | FC9D |
| 6 | CEA6 |
| 7 | 44A7 |
| 8 | 8C87 |
| 9 | 01E8 |
| 10 | 40BF |
| 11 | A3E2 |

Note:
If the delay is 10 or 11, then an idle TDM slot or a non-mu-law encoding is assumed.

Test 4

Tone Sender Test: verifies that the tones sent by the tone sender are correct. Two simultaneous correlations are performed to check that each tone of the pair is present and above a minimum level. A total power measurement is done to check that no other frequencies are present (such as would be the case if there was too much distortion).
SW Connections:
  R0ADC—Tone sender channel under test
SW Pre-test:
  TT04H to RTESTN—Start Test Number 4 (TT points to test table)
ADC Pre-test
  8XXXH to TZSC—Set Busy
  8XXXH to TZS—Set Busy
SW Parameter Input: None
Execution: ADC runs tone correlations.
ADC Post-test:
  BBBBH to TZD—Load first result output word
  0004H to TZDCO—Load number of result output words
  0XX4H to TZSC—Clear busy and set done
  0XX4H to TZS—Clear busy and set done
SW Post-test: Remove connections.
SW Result Output:
  Word 1 Failures
    Bit 6—Tone 1 amplitude failed.
    Bit 7—Tone 2 amplitude failed.
    Bit 8—Total power failure.
  Word 2—Measured tone 1 level in dB*128.
  Word 3—Measured tone 2 level in dB*128.
  Word 4—Measured RMS power level in dB*128.

Test 5

DTMF Register Test: verifies that the DTMF card can recognize dual tones that meet EIA 464 specifications. The ADC is used to generate a series of dual tones that are sent to the DTMF card. The characteristics of the tones are specified in a table that contains both valid and invalid tones. The ADC also sends dial tone to verify that tones can be recognized in the presence of dial tone. While the tones are being sent, the system software test task must read the buffer on the DTMF card to verify that the valid tones are recognized and the invalid tones are ignored.

SW Connections:
    X1ADC→DTMF channel under test
    X3ADC→DTMF channel for crosstalk Pre-test:
    TT05H to RTESTN—Start Test Number 5 (TT points to test table)

ADC Pre-test:
    8XXXH to TZSC—Set Busy
    8XXXH to TZS—Set Busy

SW Parameter Input: None

Execution: ADC sends tone sequence.

ADC Post-test:
    0XX4H to TZSC—Clear busy and set done
    0XX4H to TZS—Clear busy and set done SW Post-test:
    Read the DTMF channel under test to verify that only the digits 1, 2, 5, 9, 0 and # were received and no other digits were received. Remove connections.

Output: None

Test 6

Rotary Sender Test

This test evaluates the rotary sender by measuring the period of the on and off pulses sent. The test begins by building a table in memory which contains the time period for each received pulse. This table is compared against the table of expected pulse periods. Each entry in the generated table contains a count of the number of frames that the pulse was in the on or off state. When the pulse changes state, a new entry is started. If the length of a pulse exceeds 16384 frames (2.048 seconds) the table generation is terminated and a zero entry is added to the end of the table.

The on or off state of a pulse is determined by looking at the dial pulse state (bit 1) in the data word received from the rotary sender in a permanent field. If the pulse state is the same as the previous state then the table entry is incremented. If the pulse state has changed then a new entry is started. The generated table accommodates a maximum of 255 entries plus the zero word at the end.

The format of the table of expected pulse periods is similar to the generated table. However, to minimize the size of the table, a special control word can be used. The control word is specified by setting the upper byte to hex 'FF'. The lower byte is a count. If the count is zero, the corresponding entry in the generated table is skipped without being checked. This is useful for periods that are indeterminate, such as the interdigit time. A nonzero count specifies that the following two pulse periods should be for count times. For example:
    0FF05H
    480
    320

Would specify that five on/off pulses should be received with an on time of 60 milliseconds and an off time of 40 milliseconds for each pulse. :p. The table of expected periods is terminated with a zero word just as the generated table is.

SW Connections:
    RZDP←Rotary sender channel under test
    R0ADC← Rotary sender channel for crosstalk SW Pre-test:
    TT06H to RTESTN—Start Test Number 6 (TT points to test table). Command rotary sender to send digits.

ADC Pre-test:
    8XXXH to TZSC Set Busy
    8XXXH to TZS Set Busy

SW Parameter Input: None

Execution: ADC collects and analyzes digits. ADC

Post-test:
    BBBBH to TZD—Load result output word
    0001H to TZDCO—Load number of result output words
    0XX4H to TZSC—Clear busy and set done
    0XX4H to TZS—Clear busy and set done SW Post-test: Remove connections.

SW Result Output:
    Word 1 Failures
        If word1 is non zero, then the contents of word1 specifies which transition did not match.

Test 7

Rotary Register Test: this test verifies that the rotary register card can recognize dial pulses that meet the characteristics specified in the rotary register ERS and IRS.

Dial pulses are sent to the rotary register by toggling the dial pulse state (bit 1) in the data word sent in a permanent field. The desired period table specifies how often to toggle the bit.

The desired period table contains two types of entries. One entry specifies the time period for an on or off pulse. The period is specified in units of the frame period (125 microseconds). The other type of entry is a command word that allows looping a block of period words. This helps reduce the size of the table. For example, to send the digit '5' would only require 3 words. The first two words would specify the on and off period and the third word would indicate that the first two words be repeated 5 times. The desired period table is terminated with a hex word of '8000'.

SW Connections:
    TZDP→Rotary register channel under test X0ADC-→Rotary register channel for crosstalk SW Pre-test:
    TT07H to RTESTN—Start Test Number 7 (TT points to test table)

ADC Pre-test:
    8XXXH to TZSC—Set Busy
    8XXXH to TZS—Set Busy

SW Parameter Input: None

Execution: ADC sends rotary sequence.

ADC Post-test:
    0XX4H to TZSC—Clear busy and set done
    0XX4H to TZS—Clear busy and set done SW Post-test:
    Read the rotary register channel under test to verify that only the digits 5 and 0 were received and no other digits were received. Remove connections.

SW Result Output: None

Test 8

Conference Bridge: verifies the conference bridge using a signature analysis and a correlation. A single tone at 1008 Hz is put into the channel under test and a dual tone of 305/2992 Hz is put into the other 3 channels of a 4-way conference. The level of the dual tone signal is varied to force the conference bridge to scale from 0 dB to −3, −6, −12 and then back up to −3 dB. A signature is collected at each gain range and compared against the correct signature contained in the test table. A correlation is performed on the channel under test to verify that no 1008 Hz tone is contained in the received signal. If any 1008 Hz is present then a crosstalk error is indicated.

SW Connections:
   R1ADC←Party D
   R1ADC←Party C
   R1ADC←Party B
   R0ADC←Party A
   X1ADC→Party A
   X3ADC→Party B
   X3ADC→Party C
   X3ADC→Party D
   On the crosstalk conference bridge, connect all channels to R1ADC and X1ADC.

SW Pre-test:
   TT08H to RTESTN Start Test Number 8 (TT points to test table)

ADC Pre-test:
   8XXXH to TZSC—Set Busy
   8XXXH to TZS—Set Busy

SW Parameter Input: None

Execution: ADC executes the conference bridge

ADC Post-test:
   BBBBH to TZD—Load result output word
   0001H to TZDCO—Load number of result output words
   0XX4H to TZSC—Clear busy and set done
   0XX4H to TZS—Clear busy and set done SW Post-test: Remove connections.

SW Result Output:
   Word 1 Failures
      Bit 7 Signature error, 0 dB test
      Bit 6 Signature error, −3 dB test
      Bit 5 Signature error, −6 dB test
      Bit 4 Signature error, −12 dB test
      Bit 3 Signature error, −3 dB test (upscale)
      Bit 0 Crosstalk error

Test 10

Frequency Test

The ADC measures the frequency of the incoming signal by counting the number of positive zero crossings in two seconds and tests for busy by looking at the on/off power ratio.

SW Connections: RZDP←Test signal

SW Pre-test:
   000AH to RTESTN—Start Test Number 10

ADC Pre-test:
   8XXXH to TZSC—Set Busy
   8XXXH to TZS—Set Busy

SW Parameter Input: None

Execution: ADC runs test.

ADC Post-test:
   BBBBH to TZD—Load result output word
   0001H to TZDCO—Load number of result output words
   0XX4H to TZSC—Clear busy and set done SW Post-test: Remove connections.

SW Result Output:
   Word 1 Measurement: contains the frequency of the signal in Hz. If the MSB is set on, then a busy signal was detected. The on/off power ratio of the signal is between 40% and 60%.

Test 11

Send Test Tone and Measure Frequency: generates a 1004 Hz test tone at −3 dBm and measures the frequency of the incoming signal by counting the number of positive zero crossings in two seconds and tests for busy by looking at the on/off power ratio.

SW Connections:
   X1ADC→Channel under test
   RZDP←Test signal
   000BH to RTESTN—Start Test Number 11

ADC Pre-test:
   8XXXH to TZSC—Set Busy
   8XXXH to TZS—Set Busy

SW Parameter Input: None

Execution: The ADC runs this test. There is a one second delay between starting the test tone and measuring the test signal.

ADC Post-test:
   BBBBH to TZD—Load result output word
   0001H to TZDCO—Load number of result output words
   0XX4H to TZSC—Clear busy and set done
   0XX4H to TZS—Clear busy and set done SW Post-test: Remove connections.

SW Result Output:
   Word 1 Measurement: contains the frequency of the signal in Hz. If the MSB is set on, then a busy signal was detected. The on/off power ratio of the signal is between 40% and 60%.

Test 12

Self Test:

This task verifies that the ADC is working correctly. The input and output to the ADC are checked by reading a five word pattern from the input buffer and sending a five byte pattern to the output buffer. The Z80 will verify that the correct pattern was received and the on-line software must verify that the correct pattern was sent.

The Z80 Ram is checked by writing and reading a known pattern. The Z80 ROM is checked by calculating it's checksum and comparing it to the expected checksum. The downloaded test table is also checked using it's expected checksum. The SPIs are checked by running their internal self tests and checking the results.

SW Connections: None

SW Pre-test:
   000CH to RTESTN—Start test number 12

ADC Pre-test:
   8XXXH to TZSC—Set Busy
   8XXXH to TZS—Set Busy
   0005H to TZDCI—Load number of parameter input words required.

SW Parameter Input:
   Five words to RZD, one per frame:
      AAAAH
      5555H
      15 CCCCH
      3333H
      FFFFH Execution: ADC runs the internal self test.
ADC Post-test:
  BBBBH to TZD—Load result output word
  0006H to TZDCO—Load number of result output words
  0XX4H to TZSC—Clear busy and set done
  0XX4H to TZS—Clear busy and set done
SW Post-test: Verify that the correct test pattern was received from the ADC.
SW Result Output:
  Word 1 Failures
    Bit 15—Timed out loading input parameters
    Bit 14—Input pattern incorrect
    Bit 11—ROM checksum failed
    Bit 10—RAM test failed
    Bit 9—Test table checksum failed
    Bit 7—Control SPI bad
    Bit 6—Generate SPI bad
    Bit 5—Detect SPI bad
  Word 2—FFFFH
  Word 3—3333H
  Word 4—CCCCH
  Word 5—5555H
  Word 6—AAAAH

Test 13

Sine Wave Test: generates a sine wave of a specified frequency and level. It also receives, filters and measures a returned signal. The measurement will not occur until a signal of at least −50 dB is detected at the specified frequency or 3 seconds has elapsed. If the selected frequency is zero, the measurement will start after the specified period.
SW Connections:
  X1ADC→Channel under test
  R0ADC←Channel under test
SW Pre-test:
  000DH to RTESTN—Start test number 13
ADC Pre-test:
  8XXXH to TZSC—Set Busy
  8XXXH to TZS—Set Busy
  0003H to TZDCI—Load number of parameter input words required.
SW Parameter Input:
  Word 1 FFSSH
    FF—Filter selection
      00 No filter
      01 C-message filter
      02 3 KHz flat filter
    SS—Start time
      00 Start immediately
      NN Start after NN*32 milliseconds
  Word 2 Level as dB*10. Examples:
    001FH
      +3.1 dB
    0000H
      0.0 dB
    FFFFH
      −0.1 dB
    FD45H
      −69.9 dB
  Word 3 Frequency as NNNNH*0.122070313 Hz.
    Examples:
    09C0H
      304.6875 Hz
    DFC0H
      2992.1875 Hz
Execution: ADC runs the test.
ADC Post-test:
  BBBBH to TZD—Load result output word
  0002H to TZDCO—Load number of result output words
  0XX4H to TZSC—Clear busy and set done
  0XX4H to TZS—Clear busy and set done
SW Post-test: Remove connections
SW Result Output:
  Word 1 Detected level in dB*10
  Word 2 Remainder left after calculation of detected level. The top of the range is +3276. The middle of the range is 0. The bottom of the range is −3276.

Test 14

Sine Wave Test (Continuous): generates a sine wave of a specified frequency and level. It also receives, filters and measures a returned signal. The measurement will not occur until a signal of at least −50 dB is detected at the specified frequency or 3 seconds has elapsed. If the selected frequency is zero, the measurement will start after the specified period.

The sine wave will continue to be generated after the measurement is completed until a RSTOPT command is received. This test is identical to test 13 except for requiring the RSTOPT to terminate the test.
SW Connections:
  X1ADC→Channel under test
  R0ADC←Channel under test
SW Pre-test:
  000EH to RTESTN—Start test number 14
ADC Pre-test:
  8XXXH to TZSC—Set Busy
  8XXXH to TZS—Set Busy
  0003H to TZDCI—Load number of parameter input words required.
SW Parameter Input:
  Word 1—FFSSH
    FF—Filter selection
      00—No filter
      01—C-message filter
      02—3 KHz flat filter
    SS—Start time
      00—Start immediately
      NN—Start after NN*32 milliseconds
  Word 2—Level as dB*10. Examples:
    001FH
      +3.1 dB
    0000H
      0.0 dB
    FFFFH
      −0.1 dB
    FD45H
      −69.9 dB
  Word 3—Frequency as NNNNH*0.122070313 Hz.
    Examples:
    09C0H
      304.6875 Hz
    5FC0H
      2992.1875 Hz
Execution: ADC runs the test.
ADC Post-test:
  BBBBH to TZD—Load result output word
  0002H to TZDCO—Load number of result output words
  0XX4H to TZSC—Clear busy and set done
  0XX4H to TZS—Clear busy and set done
SW Post-test: Remove connections
SW Result Output:

Word 1
  Detected level in dB*10
Word 2
  Remainder left after calculation of detected level. The top of the range is +3276. The middle of the range is 0. The bottom of the range is −3276.

TEST 15

DIGTIAL LOOP BACK TEST (16-BIT): This test provides a 16-bit digital loop back verification. It generates a pseudo-random pattern that is sent to the channel under test and stored in an array. The incoming data is compared with the data stored in the array. A count is kept of the number of mismatches between the generated data and the incoming data.

During start-up, the delay between the generated data and incoming data is determined by waiting until the incoming data matches the first word in the array of generated data. This delay is used for the rest of the test. If the incoming data contains a null (hex 'FFE3') it is ignored and does not count as an error.

SW Connections:
  X0ADC →16-bit digital channel under test X2ADC →16-bit digital channel for crosstalk RZDP←16-bit digital channel under test (loop back selected)
SW Pre-test:
  000FH to RTESTN—Start test number 15
ADC Pre-test:
  8XXXH to TZSC—Set Busy
  8XXXH to TZS—Set Busy
SW Parameter Input: None
Execution: ADC runs the loop back test.
ADC Post-test:
  BBBBH to TZD—Load result output word
  0003H to TZDCO—Load number of result output words
  0XX4H to TZSC—Clear busy and set done
  0XX4H to TZS—Clear busy and set done
SW Post-test: Remove connections
SW Result Output:
  Word 1 Failures—contains the number of words in error. Errors detected or received data never matched output data.
  Word 2—Number of nulls received.
  Word 3—Number of frame delays between outgoing and incoming data.

Test Table Definition

The test table summary illustrated in FIG. 17 and FIG. 18 shows the hex value in the format that is passed to the RTESTN command. The most significant byte is the table number and the least significant byte is the test number that uses the table. The description is the particular test that the hex data invokes. The sum of the checksum and all the bytes in the test table must equal zero. The summation is done using 16-bit arithmetic.

Test Table Format

FIG. 19 illustrates the format of the test table and where information is located. The table entry field is the offset into the table that the information described in the description field can be found.

Recommended Test Values

FIG. 20 specifies the expected signatures for various frame delays. The signatures are calculated empirically. The table is terminated with a zero word.

Analog Cards

These tables specify the required characteristics for the various analog cards. The amplitude of the generated test tones is calculated as: (10**((DB-3.17)/20))*32768, where DB is desired amplitude in dB and the maximum DB is 3.169735. The amplitude limits for the measured levels are calculated as: DB*128, where DB is required amplitude in dB.

Each table has marginal and failed limits. Any measurements that are outside of the marginal limits will cause the corresponding marginal bits to be set in the result word. Any measurements that are outside of the failed limits will cause the corresponding marginal and failed bits to be set in the result word.

The parameters specified in each table are: (1) Dualtone Amplitude to Generate: This specifies the amplitude of the two tones that are sent to the analog card under test. This level should generally be −6.0 dB in order to match the level used in the digital loopback tests. However, the DID card has a large analog loopback gain and a set of tones of −6.0 dB would cause the card to saturate.

(2) Tone Maximum and Tone Minimum: Both of the tones looped back from the analog card must have a level between these two limits in order to pass the test. These numbers should be chosen to allow for the desired maximum amount of gain variation.

(3) Signal/Power Ratio Minimum: This is the difference between the total power level of the two tones and the total power looped back from the analog card. For a perfect card, the total power would be the sum of the two tones. Any additional noise or distortion would increase the total power. This number should be chosen to allow for the desired maximum amount of distortion. The measured signal/power ratio must be greater than the specified limit in order to pass the test.

(4) Idle Channel Noise Maximum: The C-message weighted idle channel noise received from the analog card must be less than this value in order to pass the test.

(5) Crosstalk Maximum: Both of the tones received from the analog card in the channel under test that have coupled across from the crosstalk channel must have a level less than this value in order to pass the test.

The figures listed below illustrate the level of the tone and describe the characteristics of the following analog cards:
FIG. 21—8-channel Analog Telephone Interface
FIG. 22—8-channel MWL Line Interface
FIG. 23—4-channel Direct Trunk Interface
FIG. 24—8-channel DID Trunk Interface
FIG. 25—Public Network 8-channel Tie Trunk
FIG. 26—8-channel OPS Line Interface
FIG. 27—4-wire Tie Trunk Interface
FIG. 28—QDTMF Register (analog loopback)

QDTMF Register (tones)

FIG. 29–39 are tables that specify the series of tones that will be sent to the quad DTMF board. For each dual tone the following are specified:
(1)) Frequency for each tone calculated as:

$$DF*65536/8000$$

Where DF is desired frequency in Hz and maximum DF is 4000. Amplitude for each tone is calculated as:

$$(10**((DB-3.17)/20))*32768$$

Where DB is desired amplitude in dB and maximum DB is 3.169735. On and off duration for each dual tone calculated as:

$$MS/0.125$$

Where MS is desired time in milliseconds and maximum MS is 8191.875.

Rotary Sender

FIG. 40 is a table specifies the series of on and off pulses that should be received by the rotary sender card. Each word is either a control word or a period word.

A control word has an upper byte of hex 'FF'. The lower byte is a count of how many times to repeat the following two words. A count of zero specifies that a time period should be ignored and not checked.

A period word specifies the length of the on or off pulse and is calculated as:

$$MS/0.125$$

Where MS is desired time in milliseconds and maximum MS is 2048. The end of the table is specified with a word of zero. The maximum number of on and off pulses allowed is 255.

Rotary Register

FIG. 41 is a table that specifies the series of on and off pulses that are sent to the rotary register card. Each word is either a command word or a period word. A command word has an MSB of '1'. There are two types of command words:

(1) A command word with bit 14 set (i.e. hex '4000') specifies a loop command. The lower byte contains the offset to loop to. This byte is sign extended and added to the current address location in the table in order to point to the beginning of the loop. The low-order 6 bits of the upper byte contain a count of the number of times that the loop should be executed.

(2) A command word with bit 14 set to 0 specifies the end of the table. A period word specifies the length of the on or off pulse and is calculated as:

$$MS/0.125$$

Where MS is desired time in milliseconds and maximum MS is 2048.

The first period word in the table corresponds to an on hook pulse. Each period word after that alternates between the on hook and off hook states except that the period word following a loop command word is the same state as the period word preceding the loop command word.

To prevent confusion, each loop should contain only an even number of period words and the period word following the loop command word should be considered the continuation of the last pulse in the loop.

Conference Bridge

FIG. 42 is a table that specifies the expected results from the conference bridge test. The results are specified as follows:

(1) The first word specifies the maximum crosstalk level allowed in the channel under test calculated as:

$$DB*128$$

Where DB is allowed amplitude in dB.

(2) The remaining words specify the expected signatures for various gain levels of the conference bridge. The signatures are calculated empirically.

QDTMF Register (PhoneMail)

FIGS. 43 to 45 are tables that specify the series of tones that will be sent to the quad DTMF board when testing the PhoneMail®istered. mode. The format of the table is the same as the QDTMF table.

Tone Sender

FIGS. 46 to 54 are tables that specify the required characteristics of the tones sent by the tone sender. For each dual-tone table the following are specified:

(1) Frequency of each tone calculated as:

$$RF*65536/8000$$

Where RF is required frequency in Hz and maximum RF is 4000. Minimum required amplitude for each tone calculated as:

$$DB*128$$

Where DB is required amplitude in dB. Maximum allowed power calculated as:

$$DB*128$$

ADC Driver

The error analysis tasks execute on the CBX active processor; however, the ADC is used to perform the tests of the CBX cards as described above. All the error analysis tasks that use the ADC must invoke DXXXPR_CME( ) from the calling task initially for preprocessing. The calling sequence is: DXXXPR_CME( ). Additionally, the address of DXXPR_CME( ) must be placed in the test directory entry member named PRE_PROC with any other parameters that are necessary for the test.

Once the preprocessing is complete, the calling sequence for invocation of a test is as follows:

ERR=ADC_DRIVER( LOGICAL_ADC_TEST_NUM,
  CUT_LTID_PTR,
  SCAN_BUFFER_PTR);

where the parameters have the following functions:

LOGICAL_ADC_TEST_NUM—the number of the ADC test to run. The tests and their numbers are discussed above.

CUT_LTID_PTR—the address of the identification number for the channel under test.

XMIT_DATA_PTR —the address of the buffer containing the input data if any is required by the specified test. If the pointer is unused it is set to NULL.

SCAN_BUFFER_PTR—the array that receives the results of the test.

After calling ADC_DRIVER, the calling task receives control until the task has run to completion or an abnormal termination occurs. Some tests get their results from the event queue after the ADC_DRIVER( ) task returns.

ADC Driver States

The ADC driver is a state driven task. The logical test number is used to index into a table containing state sequence segments. Each segment corresponds to a complete test. The following is a list of the states that are used:

ADC_XMIT_TEST, #of data words—transmits the ADC test and table numbers. The test number is obtained from a table that is also indexed by the logical test number. Then the specified number of data words are transmitted to the ADC.

ADC_XMIT, #of data words—This state operates just like the ADC_XMIT_TEST state except that no test number is sent to the ADC.

ADC_SCAN, buffer size—reads the results of a test back into the buffer specified by the parameter IN_DATA. ADC_DRIVER( ) knows the number of words available to read, because they are obtained during the previous SPG_WAIT state. The number of words actually read is the smaller of either buffer size or the number of words available on the ADC.

ADC_WAIT—This state waits until the ADC busy indicator is clear. If it stays in this state longer than ten seconds, the driver aborts and returns an error indicating that the ADC timed out. The ADC performs the timing.

ADC_CONN type, 1 way to ADC—conn type is either FEP_SI_CONN_1 or FEP_SI_CONN_2. If FEP_SI_CONN_1 is specified, then 1 way to ADC must be supplied where TRUE indicates a one way connection to the ADC and FALSE indicates one way connection from the ADC to the device. For other connection types, 1 way to ADC must be omitted.

ADC_BREAK_CONN—breaks the connection made in the ADC_CONN state.

ADC_EXIT—leave the state machine.

ADC_NOP—this state does nothing. It is intended only for debugging and patching.

If a state sequence has more than one XMIT state, the data for each state must appear sequentially in the XMIT_DATA_PTR buffer in the order that the states access them.

ADC DRIVER DESIGN

This task is the entry point for tests utilizing the ADC for execution of the test. The driver initialize the ADC, make any connections that are required, wait for the ADC to finish, and read back the results. The task extracts the identification of the ADC from the accompanying parameters and invokes ADC_DRIVER_IN( ) to perform the test.

ADC_DRIVER_IN( )

This task performs the actual tests as described in the ADC_DRIVER description; however, it is called from the error analysis code or directly from the Monitor program. The task validates the task number first. Then, it uses the test number as an index into a table to obtain the ADC test number and state sequence segment for the test. Finally, a loop is performed that sequences through the states indicated in the state sequence segment until the ADC_EXIT state is reached.

For the ADC_XMIT_TEST, ADC_XMIT, and ADC_SCAN states, the task checks the current TCB to determine if a test is already active. If a test is active, then the task calls TEST_CALLS_FEP( ) to perform the functions. Otherwise, it calls the new task CMNDS_TO_FEP( ) to perform the functions. This procedure facilitates functions such as loading the ADC card during system initialization and restarts.

SPG INIT

This task is invoked by the Diagnostic Monitor task after a system initialization or restart. The task goes through the common equipment list for all ADCs and downloads each one. The task polls the ADC entry of the common equipment directory until it is initialized. Then, for each ADC in the common equipment directory, load the individual test parameters. This is accomplished by invoking ADC_DRIVER_$IN( )$ *for each test. Then, read the ADC status word see if the checksum computed correctly and the card is executing satisfactorily.*

Error Analysis Hardware Environment

Figures 53, 54:
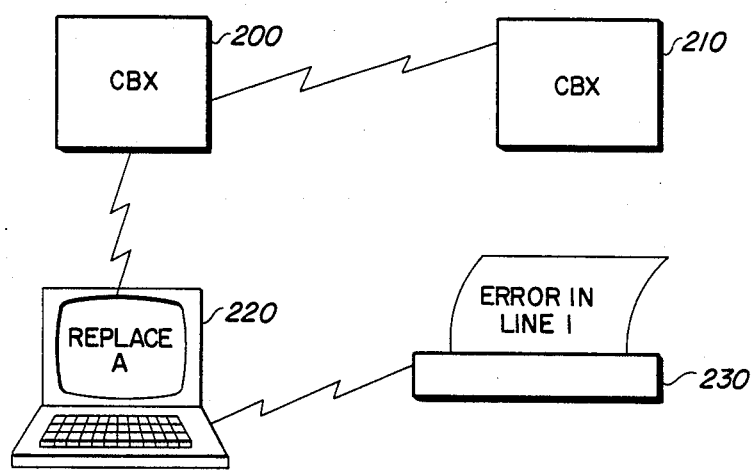
FIG. 53 is a hardware block diagram of the system according to the present invention.
FIGS. 54 is an example of an error analysis display dialogue.

FIG. 53 shows the hardware environment that the error analysis processing executes in. The CBX node 210 is attached to another CBX node 220 via an internodal link. Additionally, the CBX nod=210 may also be attached to a personal computer (PC) 220, which acts as a systems display for the attached printer 230. The CBX node 10 and the CBX node 20 are similar to the CBX described in FIG. 1. Each CBX node has at least one ADC card as described and illustrated in FIG. 2.

Error Analysis Phases

Error analysis consists of three major phases. These phases occur in sequential order during the processing of test results. During the processing of a given test result, processing may or may not proceed through all phases depending on the state of the analysis. These three phases are as follows:

(1) Test Generic: This phase validates the result of an individual failing test by assuring that there were no background errors on the intershelf bus (ISB). The ISB is the data highway for voice and data communications within each node.

(2) Detailed analysis: This phase consists of specific decision trees for each card type under test. These decision trees identify additional tests that are required and processes the conclusions from these tests in order to identify the problems and display the results of the tests. Each of the tests executed by this phase must first pass through the Test Generic phase.

(3) Test analysis: This phase consists of several basic tests to verify that a failure is attributable to the channel under test. This phase is executed only if a failure occurs in the Detailed analysis phase. This test would prevent a failing expander or advanced diagnostics card (ADC) from causing the failing conclusion from being logged against the channel under test.

Errors detected by the system scanners are handled slightly differently. Scanner detected errors skip the Test Generic phase and go directly to the Detailed analysis phase. Scanner detected errors utilize their own trees for the particular error being reported. These scanner trees may cause the specific test trees for the card to be executed.

Test Generic

Test Generic verifies that the test result currently being processed is unaffected by ISB errors. If the test result received indicates a failure, error analysis checks the ISB error to assure that the ISB did not affect the test results. If ISB errors are detected, the test is rescheduled, and upon completion, error analysis rechecks for ISB errors which may have affected the results. This testing continues until a clean result is obtained or until the test has been rescheduled three times. This limit is established because there is a possibility that the current test is causing the ISB errors. Without the three test limit, no other tests would be allowed to execute. If a test result is obtained which is unaffected by ISB errors, it is passed on to the next phase of error analysis. Any results obtained which are affected by ISB errors are discarded. Additionally, if test results are all contaminated by ISB errors, error analysis of this failure is abandoned and intermediate results are discarded.

Detailed Analysis

Detailed analysis isolates problems to a specific FRU by traversing decision trees for a specific card type. Each test along the path of the tree is run once to determine which path is followed next. The decision trees indicate which additional tests need to be run in order to draw a conclusion and what conclusion is to be drawn based on the test results. This level comprises the following types of decision trees:

Generic analysis is used when no other specific tree exists for a particular test.

RLI voice analysis isolates problems to a phone card or a phone station device.

Cypress analysis isolates problems to either the Rolm-Phone RLI-½ cards or the Cypress station device.

DCM analysis isolates problems to either a phone card or a data communications module.

DLI analysis isolates problems to either a Data Line Interface card or a Data Terminal Interface device.

Modified card analysis isolates problems to either a CODEC card or an interface card.

Message waiting analysis is similar to the modified card analysis except that it can also isolate to the phone if it is failing lamp test.

ATI card analysis isolates problems relating to the ATI card.

TIE trunk analysis isolates problems to either the new TIE trunk interface card or to a trunk.

The decision trees ensure that all the necessary tests that declare a device is operative are run. If a failure occurs on one of the required tests, the tree is followed in an attempt to isolate the failure to a field replaceable unit. The schematic logic for the Detailed analysis decision trees is provided in FIGS. 62 to 71. Note that even if no failure occurs, a decision tree is followed to ensure that all necessary tests are run to ensure the proper functioning of the channel under test. The conclusion reached if all tests are passed successfully is simply channel passed.

Decision Tree Attributes

Each node on the tree is either a Test node 1000, an Action node 2000 or a Conclusion node 3000 as shown in FIG. 58. A Test Node 1000 has a F for failed branch or a P for passed branch. All the Test nodes imply running the specified test through the Test Generic phase on the channel under test. An Action Node 2000 is simply an event that transpires as the result of a test. It appears as a textual description of the event within a box 2000. The Action nodes 2000 imply the performance of some error analysis function before going to the next node. The Conclusion nodes 3000 imply that some conclusion was reached and that there are no more nodes in the tree to visit. In other words, they are terminal nodes that indicate the completion of Error Analysis.

Test nodes have two possible exit branches which are passed or failed. Depending on the results of the tests, the task logic follows one of the two branches to the next branch. Marginal results from the individual tests are treated as failures when traversing the decision trees. If a failing conclusion is reached but nothing worse than a marginal test occurred to cause error analysis to formulate this conclusion, the conclusion is not used to take the channel under test out of service.

Figure 59:
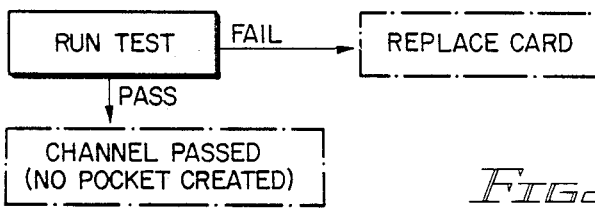
FIG. 59 is a schematic, logic diagram of the Generic Analysis decision tree.
Figure 68:
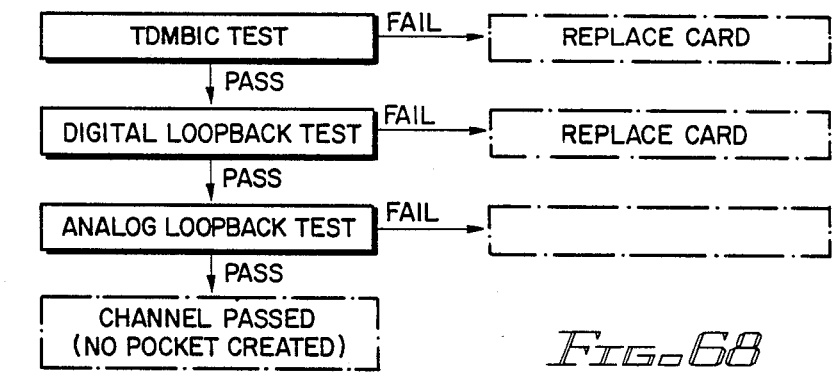
FIG. 68 is a schematic, logic diagram of the Analog Time Division Multiplex (ATI) decision tree. host to the storage system and back.

Any channel type that has only one test required to run and whose only FRU is the single card on which it resides has only a single node decision tree consisting of the one test to be run on it as depicted in FIG. 59. The conclusion on the failing branch is to replace the card. FIGS. 68 to 68 present the schematic logic of each of the decision trees in the error analysis system. The decision trees comprise a collection of the three trees to describe the error analysis logic.

Test analysis

The test analysis task verifies that the associated expander is functioning, that the card id(s) are correct and that the ADC is operational for test purposes. Test analysis is invoked after a failing conclusion node is reached by the Detailed analysis tests. Before invoking test analysis, a check is made to determine if a previous error was logged by error analysis for this channel. If a previous error was logged and the conclusions were identical, the Test analysis phase is skipped to avoid redundant tests of the same faulty hardware.

There are predefined decision trees that are invoked to test each of these components. The first test is the expander retransmit test. It tests the expander to determine the shelf which the channel under test resides on. If the expander test fails, the expander test results are logged in the hardware error table. The suggested action field in the hardware error table data structure is set to indicate that the expander should be replaced. The appropriate switchover logic exists in the expander test. Additionally, an entry is written in the hardware error table indicating the original channel number under test and in the suggested action field to indicate the test failed because of an expander problem. Additionally, this indicates that the channel under test can be taken out of service whenever the expander is failing. Even if no switchover occurs, no further analysis is necessary, because the problem has been fully diagnosed.

If the expander test passed, the card id test is executed for cards associated with the channel under test. If the card id test fails, error analysis cannot attempt further analysis. The task creates an error record in the channel under test data structure and sets the suggested action field data structure to indicate the appropriate action for the operator to take. This message indicates that the operator should replace a card. Additionally, the channel under test is taken out of service.

If the card id test passed, a check is performed to see if any tests run during Detailed analysis required an ADC. If an ADC was required, then a self test is performed on the ADC used during the Detailed analysis phase. The same ADC is used for all the tests run by the Detailed analysis. The test eliminates the ADC as a possible source of error. If the ADC self test fails, all intermediate results are discarded and no result is logged for the analysis. Before terminating, error analysis invokes the first test of the ADC analysis decision tree for the failing ADC. This action invokes normal test scheduling and complete error analysis.

If the ADC passed the test, or the card id test passed if no ADC was employed, the device is tested to determine whether all of the other channels on the card are down, in which case, the card is initialized. This action does not alter the current analysis: however, future tests of this card may pass analysis. Additionally, an entry is created in the error analysis data structure to indicate the results of the test. Finally, if a failing conclusion is reached, the error analysis data structure is written to the hardware error table and testing is repeated for the channel that is under test to try to obtain consistent results.

Intermediate Test Results

During the analysis of a given channel, the.. intermediate results of each test are recorded. Then, when a conclusion is obtained, the intermediate results are checkpointed to the Hardware Error data base to update existing individual error records. If an individual failing result is recorded and no Hardware Error database record exists for it, a new record is not created. If an individual test was run by a user employing the command line interpreter (CLI) and creates an error record for the test, it continues to update the same record if the test is repeated.

Error Analysis For Remote Nodes

Error analysis has the capability to run tests on remot nodes. A procedure schedules tests and checks the channel under test to determine if it is on a remote node. If the test is in a remote node, a message is sent to the error analysis task on the remote node. The test is scheduled on the remote node, execution proceeds through the Test Generic phase and the results are reported back to the local error analysis task.

Internal Scheduler

The internal scheduler schedules the first test used in analysis for each card type being tested. Then, error analysis uses decision trees for the card under test to schedule the appropriate set of additional tests to run. When error analysis is not available, the internal scheduler sequentially executes all pertinent tests for a given channel before proceeding to the next channel.

Suggested Action for Passing Channels

An important feature of the invention is the application of expert system techniques to the communications multiplexing system. One of these techniques is the usage of decision trees to isolate faults in the system. Another important aspect of the invention is the ability to retest faults once they have been isolated. The invention performs a series of tests on faulty cards and brings the card back into service whenever the card passes the tests multiple times consecutively. The suggested action field in the error data structure is retained; however, the header is modified to indicate that this action has already been corrected.

Analysis Unable To Complete

Error analysis executes multiple tests to isolate problems while the channel continues to perform telephony processing. However, other system problems may prevent an individual test from completing. If this occurs, analysis stops and all individual test results are reported and logged as individual results in the hardware error table.

Error Record Priorities

Individual systems integrity tests have preassigned priorities that are established for each test. Since error analysis performs multiple tests it is necessary to identify rules for analysis in assigning error record priorities. The following list of rules is used:

(1) Channel Errors are assigned the priority of the individual channel test of the highest priority that executed and detected failures on the channel.

(2) Card Errors are assigned the priority of the individual card level test of the highest priority that executed and detected failures in the card. If up card level test failed, the channel level priority is logged.

(3) Marginal Errors are logged as exceptions.

(4) Passing Errors (errors that are corrected) remain at their original priority in the Hardware Error table, but corresponding system alarms are turned off.

Inconsistent Results

If a particular test being used by Detailed analysis yields intermittent results, the conclusions from detailed analysis differ. To allow for this possibility, each time an error analysis record is updated, the previous conclusion record is saved for audit purposes. Multiple conclusion records may be checkpointed in this way. For a given channel type, the conclusion records are prioritized based on the length of the physical path to the particular FRU that they correspond to. If the path is short, for example on an adapter card, then the conclusion record has a high priority. If the path is long, for example a phone device, then the priority is lower.

Each time a conclusion indicating a failure is obtained, the failing node contains a pointer to an alternate conclusion. The alternate conclusion is similar to the primary conclusion; however, it contains additional items to test and/or replace. In some cases the alternate is the same as the primary. Both the alternate and the primary share the same conclusion priority.

When the error record is listed, if the failing conclusion records in the error record do not match, the alternate conclusion of the highest priority conclusion node is listed with an additional message indicating that different conclusions were reached at different times but this is the most likely conclusion. This is done because an intermittent failing component may introduce errors into components farther down the path. Therefore, the component on the shortest physical path is the most suspect.

User Interface

The command line interpreter (CLI) is a software facility that enables an authorized individual to log onto the communications system and execute system commands. If the CLI is used to run tests that request information by card type, a message is displayed which indicates which test is being run and upon test completion, the results are displayed to the user. The possible test results are, test passed, marginal or failed. An example of a test result is provided in FIG. 54.

Listing Hardware Errors

A report is provided to list the results of error analysis and summarize the recommended comments and the suggested actions. A sample report is provided in FIG. 55. The report lists a summary of the error information in terms that convey the appropriate information clearly.

Error Analysis Architecture

The procedure ERR_POST_PROCESS is the task which processes the results of the tests and scanners and updates the hardware error table. The test results are passed to ERR_POST_PROCESS as a linked list, each entry being an individual tes result ERR_POST_PROCESS is designed to invoke the task ERROR_ANALYSIS to perform the error analysis function and return the entries to log in the hardware error table.

ERROR_ANALYSIS consists of three phases and an initialization phase. The first phase, initialization, retrieves a pointer (address) to the entry in the error analysis database for the analysis or creates an initial entry if none exists. The second phase, test generic, determines whether the results being reported are affected by ISB errors, and if so, reschedules the test to execute again. The third phase, detailed analysis, traverses the decision trees specific to the type of failure. The fourth phase, testanalysis, verifies that the failure was not the result of hardware failures unrelated to the device being tested.

The mechanism that correlates test results and determines whether they should be ignored or incorporated into an ongoing analysis is the "test sequence". A test sequence of zero identifies results which initiate an analysis.

The initiation of the test sequence is performed by the scheduler. A test sequence of NULL is used to indicate a test result that should be ignored by error analysis. A test sequence other than zero or NULL indicates a result which has been generated as part of an ongoing analysis.

Both individual test results and error analysis results exist in the hardware error table together. It is important that the individual test error records be updated when an individual test is run as part of error analysis. To accomplish this, all intermediate test results are passed to the ERR_POST_PROCESS task which updates the status of any individual error records which may exist. The intermediate results do not cause error records to be created if they do not already exist. Only existing records are updated.

The error analysis database consists of a linked list of header type entries. Each header entry contains general information about the particular analysis which it represents. The header entry also contains a pointer to a list of test results. The first test result is a record created to log the error analysis error. The remaining test results are the intermediate test results which are generated as part of the analysis.

The decision trees are defined as a set of nodes. Each card has its own decision tree. Each monitor error initiates an analysis with its own decision tree. Each node of a decision tree consists of some action to perform, some associated parameters and a relative pointer to the next node in the decision tree, based on whether the specified action passes or fails.

Two data structures are used to point to the heads of the decision trees. One of these structures is used for monitor errors and is indexed by error number. The other structure is for regular tests, and are indexed by card type. Both of these structures are the same, and both contain an index value and a pointer to the head of the appropriate decision tree.

Error Analysis Initialization

The error analysis initialization processing is performed based on the type of test results. There are three types of test results which error analysis encounters. They are as follows:

(1) Results which are coming into error analysis for the first time.

(2) Results which are part of an ongoing analysis.

(3) Results which are not to be processed by error analysis.

The types of results are identified by a test sequence field in the test result record. A test sequence of zero indicates a result which is coming into error analysis for the first time and should be processed by error analysis. A test sequence of NULL denotes a result which should not be processed by error analysis. Any other test sequence indicates a result which is part of an ongoing analysis.

Each time an analysis is initiated, (a test sequence of zero is received) a unique test sequence is assigned to the analysis, a record to report the error analysis test result is allocated, and an entry in the error analysis database is allocated. When subsequent tests are run as part of an analysis, the test sequence of the analysis is passed as a part of the job record. When the new test results are received, the test sequence links the result to the particular analysis it is associated with.

The only condition which causes the test sequence to be set to NULL is a request through the CLI by a test specific mnemonic instead of a card general mnemonic. The results from a NULL test sequence is returned to ERR_POST_PROCESS for logging in the hardware error table.

The initialization process consists of finding the record in the error analysis database for the analysis which is currently in process. If the analysis is just starting, a test sequence is created to record information for later reporting.

An analysis is initiated based on an initial test failure. Only one analysis for a particular initial test failure and channel pair is processed at a time. If analysis is already in process for a particular channel and test id, the new result does not initiate a new analysis. This condition should not occur for most tests, but is very likely for monitor results.

Test Generic

Each test result processed by error analysis is processed by the test generic phase. This includes both initial test results and test results which are part of an ongoing analysis. The only results which are not processed by this procedure are monitor results. The test generic phase assures the integrity of the results by eliminating noise related to ISB problems.

In order to determine whether the results have been affected by ISB related problems, a global flag is used. If the ISB scanner detects an ISB parity error, the global flag is set. The test generic task tests the global flag to determine if an ISB error occurred during the test. If the flag has been set, the current results are discarded and the test is rescheduled. This process is repeated up to three times. If the ISB errors persist, the current analysis is aborted, and no error logged. This is done because the ISB scanner triggers a parity error to be logged.

A record in the error analysis database contains the results of the last action performed. When a test result is not affected by ISB problems, this field is updated to indicate a passing or failing of the test. Marginal results are treated as failures for error analysis purposes. After this, the individual test result is no longer needed. All information required is extracted and placed in the error analysis database. The individual test result is placed in the error analysis database until analysis is complete or analysis aborts. If analysis completes successfully, the results are passed to the ERR_POST_PROCESS task. The test sequence field of the individual errors indicate that they are the result of error analysis and do not cause any error record to be created if an error record does not already exist. If analysis aborts, the test sequence field is changed to NULL before being passed back to ERR_POST_PROCESS. The NULL sequence field causes individual error records to be created if they do not already exist.

Detailed Analysis

Each card type has a detailed analysis decision tree associated with it. Each monitor error may also have a detailed analysis decision tree associated with it. Pointers to these decision trees are contained in two tables. One table is indexed by card type, while the other is indexed by monitor error number.

Monitor results search the monitor table by error number to determine which decision tree to use. If no decision tree is found, then no detailed analysis is performed for the monitor error. The monitor error is passed back to ERR_POST_PROCESS to be logged in the hardware error table as an individual failure.

Tests search the card type tree to determine which decision tree to use. If no decision tree is found, then no detailed analysis is performed for the card type, analysis is aborted, and an individual error is logged in the hardware error table.

The error analysis database contains the current address of the decision tree. As the tree is traversed, the current address is updated as each new node is reached. This means that the tables described above do not require searching each time this procedure is entered, only on the initial entry.

Each decision tree consists of a set of nodes. These nodes have two parts, one to be used if the previous result was a passing result, and the other to be used if the previous result was a failing or marginal result. Each of these parts, contains the type of function performed, some parameters specific to the function performed, and the relative location of the next node in the decision tree.

Test analysis

The test analysis phase verifies that the associated expander is functioning, that the card id of the card under test is valid and that the ADC, if used, is in order. If an error analysis error record already exists for the current channel, and all of the suggested actions in the error record history match the suggested action just obtained in detailed analysis, then the test analysis phase is skipped.

The test analysis phase is implemented as a set of decision trees. There is one decision tree for the general case, one for analysis of an expander, one for the analysis of an ADC, and one for analysis of a card ID failure, Processing the Decision Trees A task is also used to interpret the decision trees. Both the detailed analysis and test analysis phases use this task to process their decision trees. Each node of the decision tree has a function to perform, and pointers to the next node in the tree, based on whether the function performed returns a passing or failing result. Each function is implemented as a code segment in a case statement. The code segments are selected by function number.

Each type of function that is performed has a case statement code segment written to incorporate the function's logic into the decision tree. Any new functions which are required for future developments are added by implementing a decision tree comprising case statement code implementing the new logic. The only requirement for new logic is that it return a pass or fail result, so that the decision tree can continue traversal with the new logic incorporated.

Detailed Architectur

To control processing within error analysis, the internal tasks follow conventions for return states. The conventions are outlined below.

PROCEED—This return state indicates that the next phase of error analysis processing should transpire. The phases are: Initialize, Test Generic, Detailed analysis, Test analysis and Error Analysis Integrity.

GET_NEXT_ENTRY—This return state indicates that error analysis should return to ERR_POST_PROCESS( ) to acquire the next test result from the input queue. This state is set when an internal error occurs or it may be the result of normal processing.

GET_NEXT_NODE—This state is used by the decision tree processing code. It indicates that processing should proceed to the next node in the decision tree. Using a combination of these states, the decision tree processing controls the logic processing of error analysis.

One of the objectives of error analysis is to ensure that channels are not reported as failing if another hardware element is causing the trouble. One of the ways that error analysis performs this filtering process is by testing to determine that no errors occurred on the ISB or related components during the running of any individual test.

Currently a task called the ISB Scanner executes every 500 milliseconds, to check for parity errors on several hardware elements: the expanders, the source bus, the transmit and receive cards (X/R) if any, and any other cards that attach to the bus and use parity checks. If any errors are found, they are logged in the appropriate systems integrity data bases.

The following approach is utilized to detect ISB errors:

(1) A new global structure is defined, TIME_LAST_ISB_ERROR. During a restart or FINIT, the global structure is intialized to the current time.

(2) When the ISB scanner detects an error that may affect the outcome of a test, this structure is updated with the current system time.

(3) When systems integrity is about to run a new test, the current system time is saved in the error analysis data base structure.

(4) When a systems integrity test completes, the job record is checked to determine if any of the results of the test failed.

(5) If any of the results failed, a check is made to determine when the ISB scanner last detected an error before the job started. If an error is detected, a new global pointer TCB_WAITING_FOR_ISB_SCAN- NER is written with the current task control block (TCB). The task is then assigned to the time delay queue for 1 second. This allows the ISB scanner to complete and report any results. This procedure is necessary to ensure that a test runs to completion without the ISB scanner having run. Additionally, it is possible that even if the ISB scanner did run during the test, an ISB error may occur after the scanner ran but before the test finishes.

(6) The ISB scanner wakes up the task pointed to by TCB_WAITING_FOR_ISB_SCANNER when it completes one scan. By following this procedure, the waiting task does not waste additional time for the ISB scanner results.

ADC Management

For consistency reasons, error analysis requires that the same ADC be used for all tests during any analysis, so an additional mechanism is used to keep track of the ADC. Currently, any test requiring common equipment during the test must have a pointer to the task, DXXXPR_CME( ), in its test directory record. CME refers to common equipment, such as tone registers and other common resources for the entire system as opposed to a specific extension. Just before the test is scheduled, this task is called to allocate the requested type of common equipment. The task allocates the next available equipment channel of the specified type (ADC). The task performs the following functions:

(1) The test sequence number is extracted from the job record and an error analysis data base record is obtained with it. This is based on the assumption that an error analysis record has been created for this job before calling PRE_TEST( ).

(2) If the identification number in the error analysis record is NULL, processing proceeds to allocate the next available ADC.

(3) The allocated ADC identification number is put into the identification number field in the error analysis record.

(4) If the identification number in the error analysis record is not null, then an earlier test already required an ADC.

(5) Allocate the ADC that was previously used. When an error analysis data base entry is first allocated, the identification number is set to NULL. If it is still null by the time the Test analysis phase is reached, then no tests required an ADC.

Multinode Considerations

There are certain situations where error analysis needs to invoke a test on a node other than the current node. This is accomplished by:

(1) At the point in the diagnostic monitor that a test has been selected to run, the node number of the channel to be tested is checked.

(2) If it is the current node, the local test is executed.

(3) If it is not the current node, a message is sent to the specified node containing a copy of the original priority queue record which contains the local test sequence number and deletes the local job record.

(4) Step 3 causes a systems integrity process server task to be initiated in the remote node.

(5) The systems integrity task creates a priority queue record with a test sequence and job node number from the originating node.

(6) An error analysis data base record is created for it and the remote test sequence and node number are stored in special fields in the record.

(7) When the initial results of the remote test are reported, error analysis notes the fact that the originating node is not the current node and searches the Remote Test Decision Tree Index to select the tree to use for Detailed analysis.

(8) Then, error analysis proceeds with normal processing up to the point of logging the error.

(9) As error analysis passes the error analysis pseudo-forms back to ERR_POST_PROCESS( ) the originating node's test sequence number is inserted over the local one that was used during analysis.

(10) In ERR_POST_PROCESS( ) at the point where a new error record is logged, the pseudo-form is examined to determine the reporting node.

(11) If it is the current node, it is inserted into the hardware error data base.

(12) If it is not the current node, a message is sent to the specified node with a copy of the pseudo-form.

(13) In the originating node the message causes a process server task to be created to receive the pseudo-form.

(14) This task disassembles the pseudo-form record and passes the pertinent information to the task SI_REPORT_STATUS( ).

(15) The pseudo-form contains the originating test sequence number, which is used to route the results back to the appropriate error analysis decision tree node waiting for this result.

Decision Tree Nodes

Although the primary operations of decision tree nodes is to guide the tests to successful conclusions, several special functions are required to implement and support all the tasks needed by error analysis. The following is a list of the different type of nodes:

Test—Execute the specified test and record whether the test passed or failed.

Initiate analysis—Schedules the initial test from the decision trees for the cardtype associated with the monitor error being reported. The analysis thus generated executes as a separate ending than the current monitor analysis. This node is used on Detailed analysis decision trees associated with monitor errors.

Test Existing Results—This node is similar to the Test node except that no test is actually executed. The node is designed to process results from tests that report multiple results each time they execute. This node processes the next error pseudo-form on the queue for the current analysis and determines if the test passed or failed. The test number in the node is ignored.

Conclusion—This node inserts the failing suggested action in the error analysis pseudo-form record. If the suggested action is channel passed, no processing is done. The pseudo-form initially is set to a passed state. Additionally, this node terminates tree processing and causes analysis to proceed to the next phase or terminate.

Test Expander—Uses the identification number of the card under test to identify the proper expander. Then the specified test is executed on the expander.

Test CME—Using the identification of the CME field, run the specified test. This field is used for testing the ADC during Test analysis. If the identification number field is NULL, simply return a passing result, which indicates that no common equipment was used by any of the tests.

Card ID—Perform a card ID check on all the cards that are required for the channel that is under test. If the card IDs are correct, indicate a passing result. Otherwise indicate a failing result.

Kickoff—This node initiates a new error analysis process. The last error record processed by error analysis is input from the process list, the test sequence is zeroed and the procedure SI_REPORT_RESULTS( ) is called. The kickoff is used in Test analysis to start error analysis when some component other than the one currently being analyzed is detected as bad, such as a failing Expander or ADC.

Abort—This node clears all error analysis records associated with the current test sequence. It returns GET_NEXT_ENTRY to indicate to error analysis to use the next record in the data base.

Dummy—Is the root entry of the Test analysis decision trees. Since the pass/fail branches of the root are the only ones processed, the dummy is set up for the first test node of the Test analysis tree so that we can get the second node and run a test.

Exit—This node causes decision tree processing to terminate. It always returns PROCEED and causes error analysis to proceed to the next Monitor-Exist—Similar to Test Exist, but used for monitor errors.

Decision Tree Data Base

The decision tree data base can be thought of as having three stages or levels:

Initial Index—This is used to select which tree to use based on the test number, the card type and whether the analysis was requested from another node.

Tree Structure—This consists of the nodes and branches for either pass or fail. Some nodes only have one exit condition. When coding this structure, both the pass and fail branches are the same.

Node Descriptors—Depending on the type of node, there are different node descriptor structures. Some node descriptors are used by more than one node if the information used by each one is identical.

Data Base Internals

Error Data Base Indices

There are three indices to the data base. One is by card type, one is by card type for remote node analysis and one is by Monitor error number. The two card type indices are lists of the following structure:

Card Type Index (Remote & Local)

STRUCT EA_CARD_TYPE_INDEX
 INT EA_CTI_TYPE;
 POINTER STRUCT_EA_DT_NODE
 EA_CTI_NODE);

The access method uses the structure provided above to perform sequential searches by card information type. The end of file marker is a NULL node pointer, so that when a structure is reached with a NULL node pointer, a search terminates with no entry found.

Each monitor error index array has the following structure:

Monitor Type Index (Remote & Local)

STRUCT EA_MON_INDEX(
 INT EA_ALTERNAT_TYPE;
 INT EA_MON_ERROR;
 INT EA_CTI_TYPE;
 POINTER STRUCT EA_DT_NODE
 EA_MON_NODE);

NULL entries are only permitted as end of node pointers. The access method is a key sequential search, employing an error number as the key. When a structure is reached with a NULL node pointer, the search terminates with no entry found.

Tree Structure

Each decision tree is an array of the following structures:

Node structures:
STRUCT EA_DT_NODE(
 INT EAN_TYPE;
Pointers to the node descriptor:
POINTER INT EAN_DESC
Offset to the next node if this node passes:
BYTE EAN_PASS_NODE,
Offset to the next node if this node fails:
EAN_FAIL_NODE);

Literals For Type Nodes

The number of nodes in a decision tree varies with the complexity of the analysis. The literals for the different node types are listed below:

LITERAL EANT_TEST(0), Test node
EANT_INITIATE(1), Initial analysis node
EANT_TEST_EXIST(2), Existing results node
EANT_CONCLUSION(3), Conclusion node
EANT_TEST_EXPANDER(4), Test expander node
EANT_TEST_CME(5), Test CME node
EANT_CARD_ID(6), Card Identification node
EANT_KICKOFF(7), Kickoff Node
EANT_RERUN(8), Rerun node
EANT_ABORT(9), Abort node
EANT_DUMMY(10), Dummy node
EANT_EXIT(11); Exit node

Node Descriptors

The following structures are the node descriptors for the node types that require them. The conclusion node is used as an example; however, the test, initiate, expander and CME node all contain similar structures for their descriptor fields.

STRUCT EAND_CONCLUSION(
 BYTE EAD_CONC_PRI;
 INT EAD_CONC_SA, suggested action &
 EAD_CONC_ALT_SA); alternate action

Detailed Data Structures

The following are examples of decision tree data structures for a monitor error and for a card test. The monitor decision tree references the other tree. The index tables logic is described in the schematic, logic diagrams illustrated in FIG. 62 to 71.

| Node Type | Descriptor | Pass Offset | Fail Offset |
|---|---|---|---|
| STATIC STRUCT EA_DT_NODE MON_TREE_RLC[3] | | | |
| EANT_TEST | 0 | +1 | +2 |
| EANT_CONC | PASSED | 0 | 0 |
| EANT_INIT | 0 | +1 | +1 |
| EANT_CONC | REPL RP | 0 | 0 |
| STATIC STRUCT EA_DT_NODE RLI_analysis[16] | | | |
| EANT_TEST | RLI_ECHO | +2 | +1 |
| EANT_CONC | REP_RLI1 | 0 | 0 |

-continued

| Node Type | Descriptor | Pass Offset | Fail Offset |
|---|---|---|---|
| EANT_TEST | RLI_KR | +1 | +8 |
| EANT_TEST | RLI_DR | +2 | +1 |
| EANT_CONC | REP_RP | 0 | 0 |
| EANT_TEST | RLI_KS | +2 | +1 |
| EANT_CONC | REP_RP | 0 | 0 |
| EANT_CONC | RLI_DS | +2 | +1 |
| EANT_TEST | REP_RP | 0 | 0 |
| EANT_CONC | PAS_CON | 0 | +1 |
| EANT_TEST | RLI_DR | +1 | 0 |
| EANT_CONC | REP_RP | 0 | 0 |
| EANT_TEST | RLI_KS | +1 | +2 |
| EANT_CONC | REP_RP | 0 | 0 |
| EANT_TEST | RLI_DS | +1 | +2 |
| EANT_CONC | REP_RP | 0 | 0 |
| EANT_CONC | RLI_ALL | 0 | 0 |

Conclusion Data Structure

Figure 60:
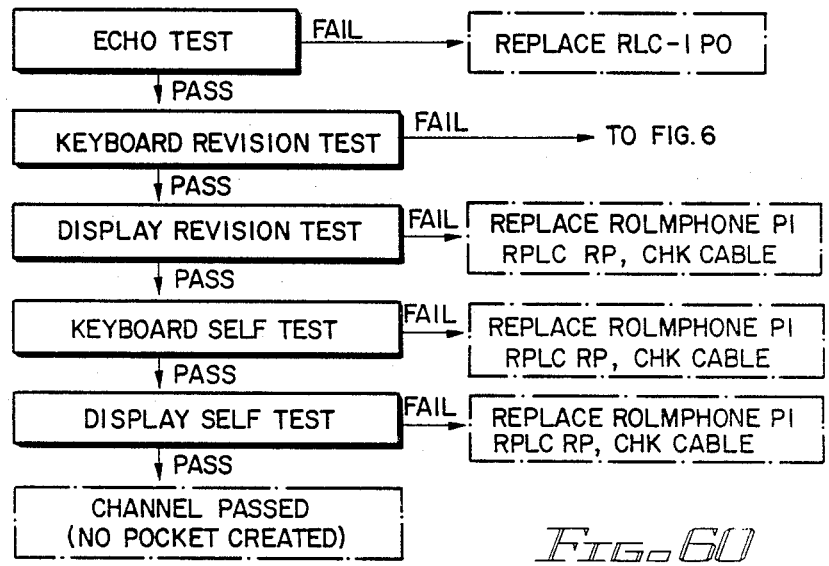
FIG. 60 is a schematic, logic diagram of the RLI Voice Analysis decision tree.
Figure 61:
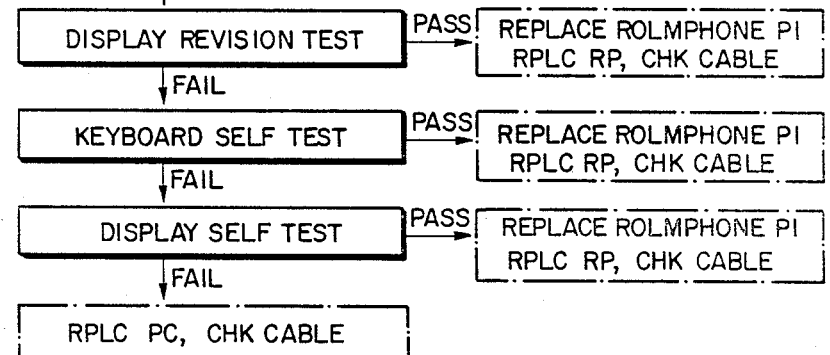
FIG. 61 is a continuation of the schematic, logic diagram of the RLI Voice Analysis decision tree.
Figure 62:
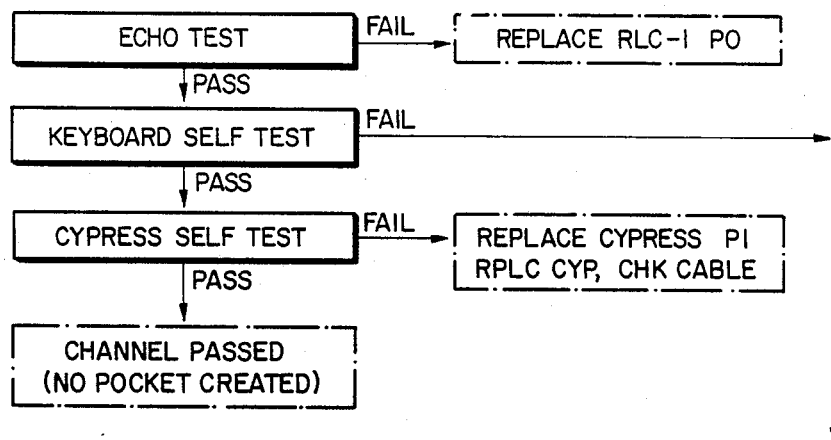
FIG. 62 is a schematic, logic diagram of the Cypress analysis.
Figure 63:
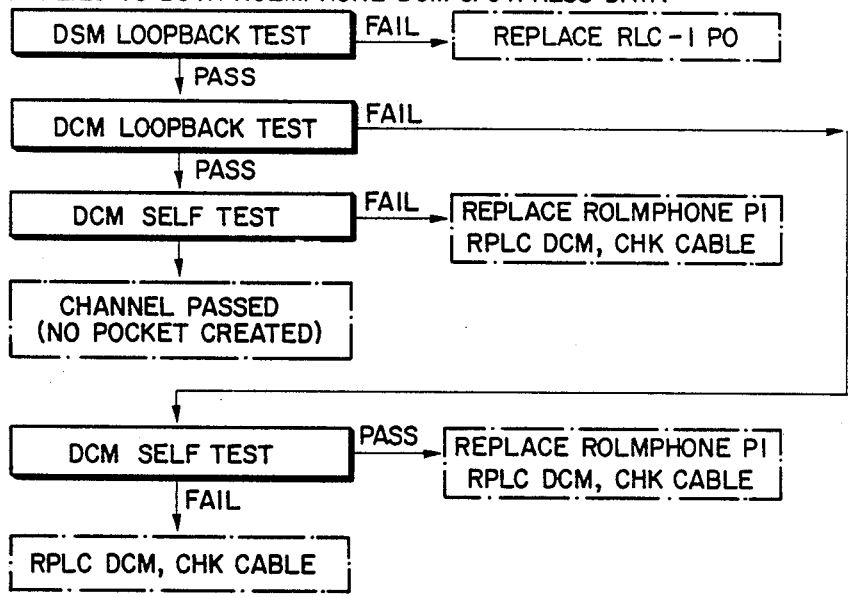
FIG. 63 is a schematic, logic diagram of the Data Communication Module (DCM) decision tree.
Figure 64:
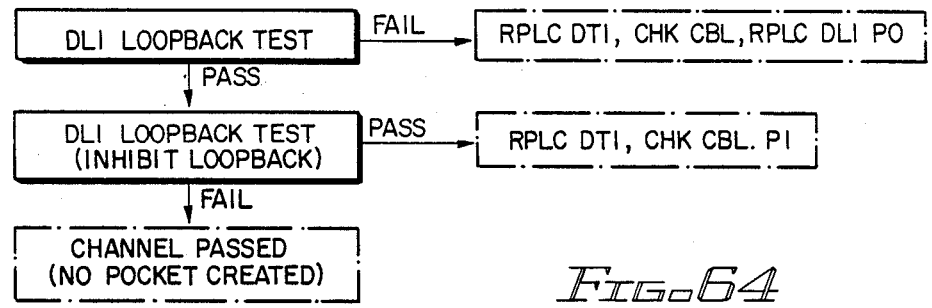
FIG. 64 is a schematic, logic diagram of the Data Link Interface decision tree.
Figure 65:
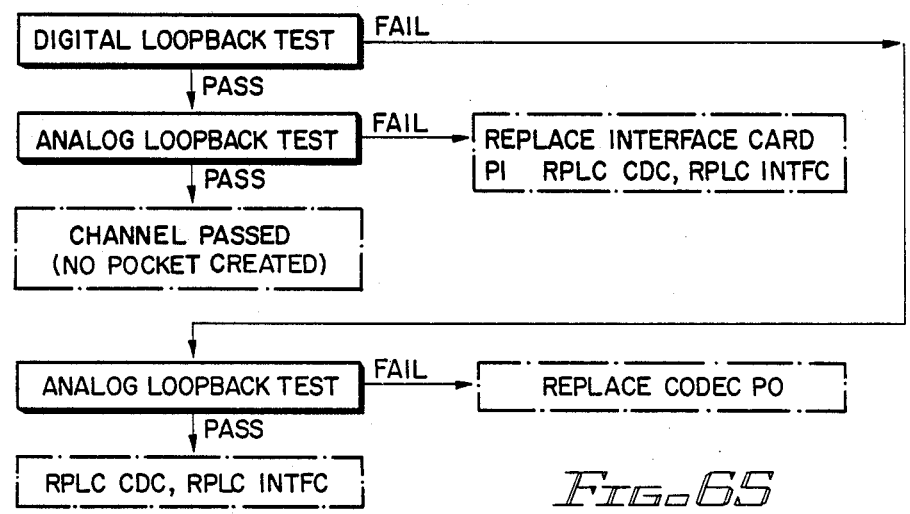
FIG. 65 is a schematic, logic diagram of the Modified Card Analysis decision tree.
Figure 67:
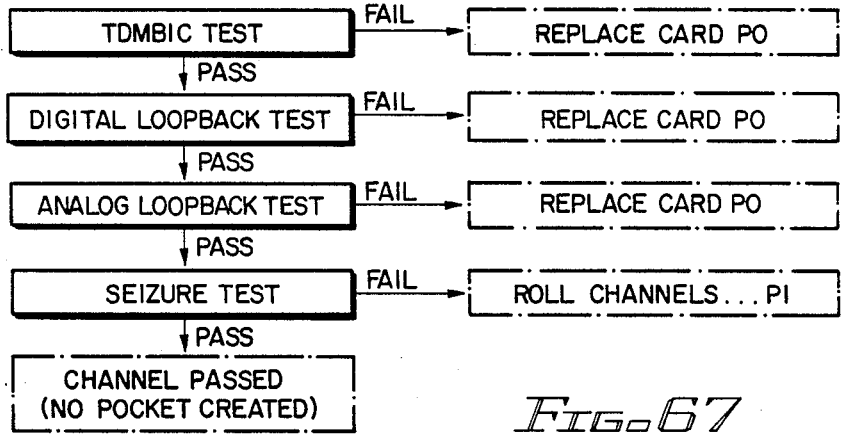
FIG. 67 is a schematic, logic diagram of the New Tie Trunk Analysis decision tree.
Figure 66:
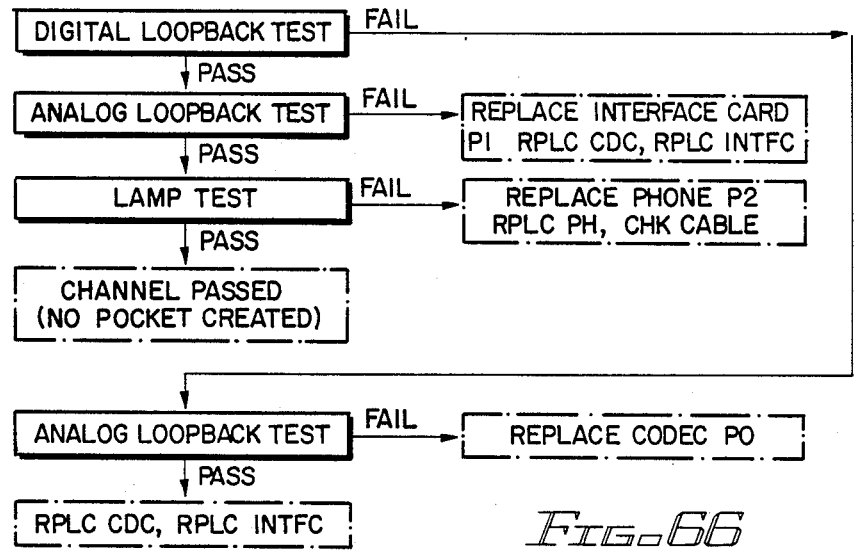
FIG. 66 is a schematic, logic diagram of the Message Waiting Analysis decision tree.

The following are the conclusion descriptors needed by the conclusion nodes above.
STATIC STRUCT EAND_CONCLUSION
PASSED_CONC(
  0, Priority is not used
  SA_TEST_PASSED, Special suggested action
  SA_TEST_PASSED), Alternate action
REPLACE_RLI1(
  0, Highest priority
  SA_REPLACE_RLI1, Suggested action msg.
  SA_REPLACE_RLI1, Alternate same
REPLACE_RP(
  1, Lower priority than RLI-1
  SA_REPLACE_RP, Replace the Phone
  SA_REPLACE_RP_PLUS), Additional Info.
REPLACE_ALL(
  2, Lowest priority
  SA_REPLACE_RLI_ALL, Try everything
  SA_REPLACE_RLI_ALL); Same alternate See FIG. 60 and 61 for examples of additional possible action messages that are used. The structure is flexible enough to support any hardware configuration that might be used for communication massaging or other data processing activities. The trees are traversed as described above.

Task Design

EA_TEST_GENERIC

EA_TEST_GENERIC ensures that a failing test is not failing because of errors on the ISB. All errors reported by the ISB scanner are considered grounds for discarding the current failing test results. The task is invoked by the following task call:
EA_TEST_GENERIC(POINTER STRUCT EA_D_ENTRY_PREC);
Inputs: PREC—POINTER STRUCT EA_DB_ENTRY, which is a pointer to the current error analysis data base entry.
Returns: PROCEED—No ISB errors, continue with analysis or GET_NEXT_ENTRY—Need to re-run the test because ISB errors occurred.

If the EA_TEST_RESULT field of the error analysis data base record is passed, simply return PROCEED. Then, get the pointer of the current pseudo-form record. If the test id field indicates this is a monitor error or the error number field is greater than 1, then return PROCEED. This is because monitor errors cannot be re-run. Also, error numbers greater than 1 indicate that a single test is reporting more than one result so no rechecking for ISB errors is necessary, because they were already checked when the first of several results were reported.

Then, the time stamp in the error analysis data base is compared with the global variable TIME_LAST_IS-B_ERROR. If no ISB error occurred since the last test started, return PROCEED. If an ISB error occurred since the last test started, the last pseudo-form on the list is discarded.

Then, the maximum number of tries that have been completed for running the test with a clean result are tested and if it exceeds a user defined standard, the task ABORT_ERROR_analysis( ) is invoked to indicate that all intermediate results are to be logged, but no new error records are to be created. If the limit was not exceeded, then the task SCHEDULE_TEST( ) is invoked with the same test id. In both cases the task returns GET_NEXT_ENTRY because no further processing is necessary.

EA_GET_RECORD

This is a general purpose task that expects as input a test sequence number and returns the error analysis data base record corresponding to the test sequence number. The message helps to guide the systems analyst to respond to any problems or identify that the problem is resolved. To invoke the task, the following call is made:
EA_GET_RECORD(INT TEST_SEQUENCE;
POINTER STRUCT
EA_DB_ENTRY PPREC);
TEST_SEQUENCE is a simple integer used to identify the particular error analysis data base record. The task returns PPREC, which is the address of the error analysis record that matches the specified test sequence. If there is no record found, PPREC returns a NULL pointer.

The task logic carries out the following actions: perform a linear search of the error analysis data base to find any records whose test sequence number matches TEST_SEQUENCE, set PPREC to its address and return NOERR. Otherwise, if TEST_SEQUENCE is equal to zero, NULL or no match is found, set PPREC to NULL and return NO_MATCH.

CHECK_ISB_ERRORS

This task is invoked from TEST_EXEC( ) when a test returned a failed condition. It is called after DEAL-LOC_RESOURCES( ) because it may suspend. It is also called before the TEST_EXEC TCB control state is set to IDLE. It checks to see if the ISB scanner detected an error since this test started, and if an error is detected, it completes and returns. If an error is not detected, then the task suspends and waits for the ISB scanner to run again before returning. The task is invoked by the following call.
CHECK_ISB_ERRORS( );
The logic of this task begins with the test sequence field in the current job record being used in a call to the EA_GET_RECORD( ) task to obtain the error analysis record. The EA_TIME field in the error analysis record is compared with the last time the ISB scanner detected an error to determine if any error has been detected since the job started, the current TCB is stored into the global variable TCB_WAITING_FOR_IS-B_SCANNER, and the task is placed on the time delay queue for one second to await a time out. If the ISB scanner has detected an error since the job started, then the job simply returns.

ISB_FINISHED_SCAN

This task is invoked from the ISB scanner after it has completed one full scan. This task determines if a task is waiting for the scan to finish and wakes it when the scan has completed. It is invoked as shown below.

ISB_FINISHED_SCAN( );

The following actions take place: if TCB_WAITING_FOR_ISB_SCAN is NULL, then return. If it is not null, and the TCB is on the time delay queue, put it on the dispatch queue with a WHYSCHED of REQUEST. Then, set TCB_WAITING_FOR_ISB_SCAN to NULL.

ISB_ERROR_TIME_STAMP

This task is called from the ISB scanner any time an error occurs that may affect the outcome of a systems integrity test. In order to save time, only one time stamp per scan pass is used. Therefore, a global variable TIME_STAMP_ERROR is used to decide if it is necessary to invoke GET_BIN_TIME again in this pass. This variable is set to false at the beginning of each scan pass. The task is invoked with the following function call:

ISB_FINISHED_SCAN( );

The task tests TIME_STAMP_ERROR, and if it is true, then the task returns. If TIME_STAMP_ERROR is not true, then the task invokes GET_BIN_TIME( ) and places the results in the global structure TIME_LAST_ISB_ERROR. Then, the task sets TIME_STAMP_ERROR to TRUE and returns.

PROCESS_TREE

This task interprets the decision trees. When it is invoked, the specified error analysis data base entry contains a pointer to the current node being processed. One of two nodes of the decision tree is selected, based on the last test results contained in the data base entry. Examples of decision trees and their associated logic is contained in FIGS. 62 through FIG. 71. The task is invoked by the following call:

PROCESS_TREE(POINTER STRUCT EA_DB_ENTRY PREC);

A pointer to the current error analysis data base entry being processed is the only input to the task logic. The task returns a continue processing or GET_NEXT_ENTRY flag indicating that additional processing is necessary for the decision tree, or the next entry should be obtained for additional processing. The task logic obtains the current node address from the specified error analysis data base record. Then, it sets a local state variable to NEXT_NODE. Next, it loops performing the following steps as long as the state variable is NEXT_NODE:

If the last result field of the data base record is passed, add the passed offset of the current node to the address of the current node address. Otherwise add the failed offset to the current node address. Then, update the data base record to this new address. Continue by using the node type to select which of the node processing tasks to call. Each of the node processing tasks is called with a pointer to the current data base record. In addition, every node processing task returns the next state. The possible states are:

PROCEED: Done with processing this tree. So, proceed with the next phase.

GET_NEXT_NODE: Proceed to the next node in the decision tree based on the results field in the data base record.

GET_NEXT_ENTRY: Interrupt processing this tree to wait for the results. Go on to process the results for other analysis taking place. Some of the nodes do not require any processing, they modify the current state. These nodes and the new state they set are as follows:

| NODE NAME | STATE RETURNED |
|---|---|
| Test Existing Results | GET_NEXT_ENTRY |
| Dummy | GET_NEXT_NODE |
| Exit | PROCEED |

PROCESS_TEST_NODE

This task is called by PROCESS_TREE( ) and processes Decision tree test nodes. It is invoked by:

PROCESS_TEST_NODE(POINTER STRUCT EA_DB_ENTRY PREC);

The task requires as inputs: PREC, which points to the error analysis data base structure for the current analysis. The task returns: GET_NEXT_ENTRY, which is the next state that is allowed for this type of node. The task logic obtains the test id from the current node, places a job record on the priority queue for the test based on the identification number under test and returns GET_NEXT_ENTRY.

PROCESS_INITIATE_analysis_NODE

This task is invoked by PROCESS_TREE( ) and processes Initiate analysis nodes. It is invoked by the following call:

PROCESS_INITIATE_analysis_NODE(-POINTER STRUCT EA_DB_ENTRY PREC);

The task requires as input: PREC, which points to the error analysis data base structure for the current analysis. This task returns: GET_NEXT_NODE, which is the next state for this type of node because it is unnecessary to await results. The task logic obtains the test id by looking at the decision tree for the card type repeating the current error. A job record is placed on the priority queue for the test which references the identification number under test with a test sequence of zero and returns GET_NEXT_NODE.

PROCESS_CONCLUSION_NODE

This task is called from PROCESS_TREE( ) and processes the conclusion node. It is invoked with the following call:

PROCESS_CONCLUSION_NODE(POINTER STRUCT EA_DB_ENTRY);

PREC is assumed to contain a pointer to the error analysis data base record when the task is invoked. The task obtains a pointer to the error analysis pseudo-form record and inserts the current node number into the pseudo_form record in order to initialize processing for the conclusion. Then, a sixteen bit value corresponding to the node is computed by subtracting the address of all the tree tables from the address of the current node. The task then, copies the conclusion descriptor information into the pseudoform record, which includes the conclusion priority and the two suggested action indices.

If the suggested action in the conclusion descriptor is channel passed, then set the TEST_STATUS field of the error analysis pseudoform to passed. Otherwise, leave it unmodified. PROCEED is returned to compel error analysis to proceed to the next phase of analysis.

PROCESS_TEST_EXPANDER_NODE

This task is invoked by PROCESS_TREE( ). It processes test expander nodes. The task is invoked by the following call:
PROCESS_TEST_EXPANDER_NODE(-
POINTER STRUCT EA_DB_ENTRY PREC);

The task assumes that PREC, points to the error analysis data base structure for the current analysis. The task returns, GET_NEXT_ENTRY, which is initialized to the next state for this type of node to assure that the next specified test executes.

The task logic obtains the test id from the current node and uses the identification number ,of the channel under test to form the identification number for the expander. Then, it places a job record on the priority queue for that test corresponding to the identification number of the expander. The task returns GET_NEXT_ENTRY.

PROCESS_TEST_CME_NODE

This task is called by PROCESS_TREE( ). It processes Test CME nodes. It is invoked by the following call:
PROCESS_TEST_CME_NODE(POINTER
STRUCT EA_DB_ENTRY PREC);

The task assumes that PREC, points to the error analysis data base structure for the current analysis. The task returns, GET_NEXT_ENTRY, which is initialized to the next state for this type of node to assure that the next specified test executes.

The task logic obtains the test id from the current node and uses the identification number of the channel under test to form the identification number for the expander. Then, it places a job record on the priority queue for that test corresponding to the identification number of the EA_CME_LTID field, and the task returns GET_NEXT_ENTRY.

PROCESS_CARDID_NODE

This task is called by PROCESS_TREE( ). It processes Card id nodes. It is invoked by the following call:
PROCESS_CARDID_NODE(POINTER
STRUCT EA_DB_ENTRY PREC);

The task assumes that PREC, points to the error analysis data base structure for the current analysis. The task returns, GET_NEXT_NODE, which is initialized to the next node for this type of node to assure that the next specified test executes.

The task logic invokes CARD_ID_DISTRICT( ) with the identification number of the channel under test. If the Card Id of all the cards checked is satisfactory, then the last result field of the error analysis data base entry is set to Passed, otherwise it is set to Failed. GET_NEXT_NODE is returned.

PROCESS_KICKOFF_NODE

This task is invoked by PROCESS_TREE( ) and processes Kickoff nodes. It is invoked by the following call:
PROCESS_KICKOFF_NODE(POINTER
STRUCT EA_DB_ENTRY PREC);

The task assumes that PREC, points to the error analysis data base structure for the current analysis. The task returns, GET_NEXT_NODE, which is initialized to the next node for this type of node to assure that the next specified test executes.

The task logic removes the last pseudoform from the error analysis data base list and sets the test sequence field to zero. Then, it calls SI_REPORT_RESULTS( ) with this pseudoform and returns GET_NEXT_NODE.

PROCESS_ABORT_NODE

This task is invoked by PROCESS_TREE( ) and processes Abort nodes. It is invoked by the following call:
PROCESS_ABORT_NODE(POINTER
STRUCT EA_DB_ENTRY PREC);

The task assumes that PREC, points to the error analysis data base structure for the current analysis. The task returns, GET_NEXT_NODE, which is initialized to the next node for this type of node to assure that the next specified test executes.

The task logic invokes EA_ABORT_analysis, passes the specific error analysis data base record, calls SI_REPORT_RESULTS( ) with this pseudoform and eturns GET_NEXT_NODE.

SI_PROCESS_SERVER

SI_PROCESS_SERVER is the systems integrity task that receives messages from other nodes. In response to a message receipt, the task either inserts a job onto the priority queue or reports remote results in the local hardware error data base.

This task is interactively invoked to process messages as they arrive. The task logic responds to an incoming message by receiving the first byte, receiving the rest of the message and then processing it. The first byte is used to identify the requested function. The two functions are remote job or remote results. The first byte also specifies the length of the transaction. A remote job function is processed by testing the test sequence number from the originating node and determining if it is NULL. If it is not NULL, then an error analysis data base record is created for it and the originating node's test sequence and node number is written into it. The local node's test sequence number is used for error analysis processing. Then a priority queue record is created and the requested identification number, test id, local sequence number (or NULL) and originating node number is written into it.

If the function is remote results, the task logic invokes SI_REPORT_RESULTS with the temporary copy of the error pocket received. If there were any problems, a NAK is sent back to the originating node; otherwise, an ACK message is sent to signify a receipt and initiation of the request. The task completes with an EXIT call.

Failing Resource Manager

Functional Description

The failing resource manager takes a failing resource out of service after two consecutive failures. This is also known as soft downing a resource because the out of service status is a state imposed by the software. Information pertaining to each failing resource is stored in the failing resource table (FRT).

The telephone software is prevented from accessing the failing resource by checking if that resource has an out of service state. Then, FRM will return an out of service resource back to service if it consistently passes its tests multiple times (default is 3 times) consecutively.

The failing resource manager tasks interact with the error analysis tasks and the threshold alarm tasks by sharing information through the Hardware Error Table (ERRH) and the Failing Resource Table (FRT).

Each FRT is updated when a change occurs. The failing resource manager also performs priority testing after the system restarts or switches to the standby CPU.

A database for failing resources is maintained to track defective equipment. The database is known as the FRT and is shared by the other tasks associated with error analysis. The Hardware Error Table is the database where Error Analysis results for the resources are stored.

The ERRH is used to track the past history of a resource and increase the severity of a failure based on the past history of the resource. One failure is considered an exception, two consecutive failures are considered a warning. Examples of failing resources include common equipment and interface channels.

The state which prevents a defective resource from impairing telephony services is the out of service state. The counterpart of the above state is returned to service which occurs when a previously failing resource is returned to normal systems service.

Detailed Operation

Introduction

A discussion of the detailed function of the tasks employed by the failing resource manager is contained in the following description of each of the tasks. The first section describes the management of a failing channel or card. Then, the restart/switchover tasks are described. The next sections describe how the failing resource manager interfaces with the error analysis tasks and the threshold alarm tasks. Finally, the restore capabilities are described.

Management of Failed Resources

When a single channel failure is detected by error analysis, the failing resource manager is notified. The failing resource manager requests the error analysis task to test the resource again to assure the validity of the test. This is to verify that it is not an intermittent failure. An entry is written to the FRT to track the channel's failure. Before removing the resource from service, the threshold alarm manager is alerted to request permission for removal. The threshold alarms uses information in the FRT to determine the total number or a percentage of the resources that are currently out of service. The resulting number is used to determine whether those bad resources have caused a minor or major alarm. More information on threshold alarms is provided in the section entitled threshold alarms.

Assuming there are sufficient remaining resources, the resource is taken out of service, and the entry in the FRT is updated to reflect the removal. Once the resource is removed from service, the same series of tests are performed multiple times until the resource passes three times or is considered fatally faulty. When the failing resource passes the first time, the tests are repeated an additional two times and the resource is returned to service if it passes the tests three consecutive times.

When the resource is returned to service, the threshold alarm software is informed via an update to the FRT of the return to service of the failing resource.

Multiple Failing Channels on an Interface Card

The previous description described the scenario of a single channel being managed by the failing resource manager. If an entire interface card is defective, all the channels on the card will ultimately register a failure with error analysis.

Many times, an efficient approach to this type of problem is removing an entire card from service and then returning it to service, referred to as a card reset rather then treating each channel individually. When the card is returned to service, the individual channels are rescheduled for error analysis testing. If all channels pass the tests three consecutive times after the card is reset, they will be returned to service. However, if the card is experiencing intermittent failures, the channels may eventually fail the tests again. When this occurs, the cycle repeats and the card resetting could experience infinite looping. To avoid this kind of a problem, a limit of three reset services is imposed on each card. The reset services are tracked using a card reset database.

Deleting a Failing Resource Entry

There are three situations when an entry in the FRT is deleted:

(1) When the resource implicated by that record, is returned to service after it passes error analysis tests three consecutive times;

(2) when the entry in the ERRH, hardware error, is cleared; and (3) when FEP Scanners return a resource to service.

Interfacing with Error Analysis

The failing resource manager tasks analyze the error analysis results and determine when a resource should be removed from or returned to service. Additionally, the failing resource manager is responsible for handling errors originating from a single channel or a card malfunction. The failing resource manager also verifies malfunctions and functioning of the resource by employing the error analysis tasks. The ERRH and FRT are employed to coordinate the interface between the two sets of tasks.

The error analysis results are stored in the ERRH. The failing resource manager, on receipt of an error analysis result of a resource, examines the past history of the resource to determine if the resource requires further analysis (in order to confirm the current result). If a defective resource is confirmed, the FRM takes the resource out of service. An entry is made to the FRT and the out of service state is also updated in the ERRH. In other words, there is always a failing resource record in the FRT associated with an error analysis record in the ERRH table.

Interfacing with Threshold Alarms

The failing resource manager provides information for the threshold alarms (TA) tasks so that TA can categorize the failure alarms of resources. The two pieces of information given by FRM are the update-count (FR_UPDATE_COUNT) and the record status (FR_RECORD_STATUS).

FRM increments the value of FR_UPDATE_COUNT of a card type by one whenever the failure alarm of the card type needs to be updated. TA is kicked into action when it observes a non-zero FR_UPDATE_COUNT. After evaluating the failure alarm of the card type, TA decrements the FR_UPDATE_COUNT.

FR_RECORD_STATUS is a field in the failing resource table. FRM updates this status field as a means to inform TA that this record needs to be updated or deleted.

In return for the information provided by FRM, TA determines whether a resource can be taken out of service by checking the out of service threshold.

Modification on Error Priority Escalation

Prioritizing errors allows errors to be classified according to severity. Four categories of priorities are employed by error analysis. A value of 1 to 150 is considered a Major error. While, a value of 151 to 246 is considered a Minor error. Additionally, a value of 247 to 250 is considered a warning. Finally, a value of 250 to 260 is considered an exception. Within the warning category of errors, further subdivision is used as shown below.

| Warning Priorities | Error Types |
| --- | --- |
| 240 | Card ID errors |
| 241, 242 | unassigned for now |
| 243 | Common Equipment card |
| 244 | Trunk card |
| 245 | Data card |
| 246 | Line card |
| 247 | Common Equipment |
| 248 | Trunk channel |
| 249 | Data channel |
| 250 | Line channel |

The range for the exception category is subdivided as follows:

| Exception Priorities | Error Types |
| --- | --- |
| 251 | Common Equipment |
| 252 | Trunk card/channel |
| 253 | Data card/channel |
| 254, 255 | Line card/channel |

Failing Resource Database

The Failing Resource Database is a contiguous area of dynamic memory containing pertinent information for any failing resource. It is restart-retained and stored redundantly. It is essentially divided into three distinct portions:

(1) Housekeeping information keeps the index of the next available Failing Resource record. This index is used as the header to a list of free Failing Resource records.

(2) The Card List Array provides Threshold Alarms faster access to all the Failing Resource records that belong to the same card type. In other words, the Failing Resource records are grouped by card types. Each element in the Card List Array contains an index to the record in the Failing Resource Table, which represents the first failing channel for that card type.

(3) The Failing Resource Table (FRT) is an array where the failing resources are recorded. It consists of 301 records. (The dimension of this table is arbitrary because we really do not know how many failing channels there are. Consider the Courtesy Down Map which stores up to 288 courtesy-downed channels, 300 records may prove to be more than sufficient). The 301st record is a dummy sentinel used a delimiter for the free record list and all the card lists.

STRUCT FR DB

Figure 69:
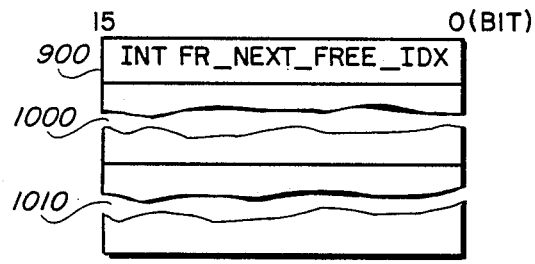
FIG. 69 is an illustration of the Failing Resource Database data structure.

FIG. 69 is an illustration of the failing resource tables data structure. The failing resource table resides in a contiguous area of memory of the system processor. Label 900 indicates the record containing the address of the next free available record to the table. Label 1000 indicates the area where the card list array, FR_CR_LIST[ ], resides. Each card is described by the structure:
FR_CR_LIST_INFO
FR_CR_LIST [N];
The card list array is described by the structure above, where N is the current list being used. Label 1010 indicates the information area, FR_RECORD [ ], referred to as the failing resource table (FRT). It consists of 300 records that indicate the status of the various resources of the system.

Figure 70:
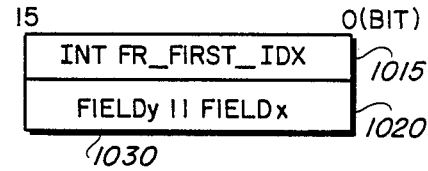
FIG. 70 is an illustration of the Failing Resource List Information Structure data structure.

FIG. 70 is an illustration of the data structure for the failing resource card list information, FR_CR_LIST_INFO. The data structure is used by FR_CR_LIST[ ]at label 1000 of FIG. 69 to define each record. Label 1015 indicates the location of FR_FIRST_IDX, which contains an index to the FR_RECORD[ ]array where the first failing channel of a particular card type is entered. Label 1020 indicates the location of FR_COUNT, which is the number of Failing Resource records all belonging to the same card type. Label 1030 indicates the location of UPDATE_CR_LIST, which is a bit used to indicate to Threshold Alarms that the alarm category needs to be recalculated.

FR INFO Structure

Figures 71, 72:
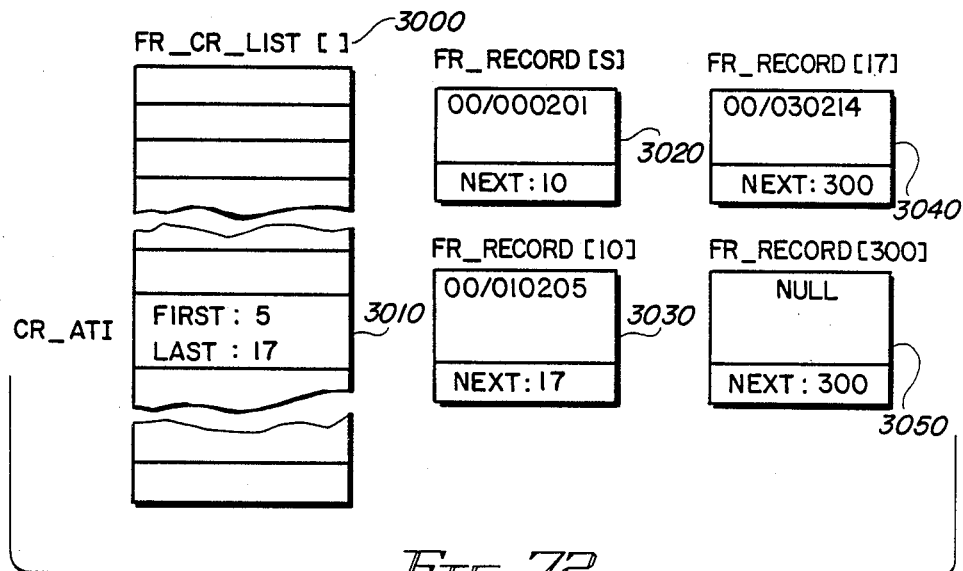
FIG. 71 is an illustration of the Failing Resource record Information data structure.
FIG. 72 is an illustration of a Failing Resource Linked List of Channel Failures.

Each Failing Resource record in the Failing Resource Table stores the service-status of a failing channel and keeps track of who initiates the soft-down request. FIG. 71 is the source code for the data structure for each record of FR_INFO 2000. Label 2010 indicates FR_LTID, which is the identification number of the failing channel. Label 2020 indicates FR_CR_TYPE, which is the card type of this channel. Label 2030 indicates FR_TRK_OR_DATA_GRP, which is only applicable if the card type is either a trunk or data card type. If it is a trunk, then this field contains the trunk group number. If it is a data card type, this field contains the data group ordinal. Label 2040 indicates FR_LAST_UPDATE_BY, which stores the last operation to transpire, either: FR_UPDATE_BY_TEST, FR_UPDATE_BY_MON, FR_UPDATE_BY_FEP, FR_UPDATE_BY_EXC, or FR_UPDATE_BY_RR.

Label 2050 indicates FR_RECORD_STATUS which is one of the following: TA_UPDATE_NEEDED, TA_UPDATE_DONE or TA_UPDATE_CLEAR. It records the current status of the record. There are occasions when a record is ready to be deleted, but Threshold Alarms has not had a chance to recalculate the resource's alarm category (due to a FEP request to return the channel to service). This field will thus have a "TA_UPDATE_CLEAR" status. When the Threshold Alarms task finally gets around to reevaluate the alarm category for that resource, it also deletes that entry.

Label 2060 indicates FR_CHANNEL_STATE, which reflects the service status of the channel: out-of-service, in-service or pending soft-downed. Label 2070 indicates FR_VOICE_OR_DATA, which is either voice or data channel type. This field is only applicable to ROLM phone Interface cards. Label 2080 indicates FR_ASSOC_ERRH, which is a bit flag which toggles between the values, 0 and 1. When the bit is set (1), it means that the channel is soft_downed by ERRH. If it is clear (0), it indicates that ERRH decides to return the channel to-service. Label 2090 indicates FR_ASSOC_OTHER, which is a flag whose function is similar to FR_ASSOC_ERRH. When a channel state request is coming either from the FEP Scanner of from processing an exception table error, this bit is affected. A channel cannot be returned to service unless both FR_assoc_errh and FR_ASSOC_OTHER bits are clear.

Label 2100 indicates FR_RR_NEEDED, which is a flag that indicates the channel associated with the FR_RECORD will be tested first after a restart or switchover. This is a means of achieving priority testing on any out-of-service channels as part of our restart recovery scheme. Label 2110 indicates FR_NEXT_IDX, which contains the index of the next failing channel of the same card type. This field will contain the dummy sentinel record's index if the record is at the end of the list.

Conceptually, one can view the Failing Resource records to be singly linked (by the indices) lists into the Failing Resource Table. Each list of the records represents a collection of failing channels belonging to the same card type. The records within a card list are sorted in ascending order. A separate list links any unused Failing Resource records to form a free list. FIG. 72 uses the ATI card type to illustrate how three failing ATI channels are singly linked together. FIG. 72 shows the FR_CR_LIST information structure 3000 linked hierarchically via the record at label 3010 to the records at 3020, which is the first failing channel and record 3030, which is another failing record. In turn the record at 3040 is linked to the record at 3030 and the free record at 3050. A linked list of failing channels and a pointer to the next free channel is formed in this way.

Card Error Database

In order to prevent a card getting reset too often (due to multiple occurrences of a card error), it is necessary to obtain a time stamp every time a card is reset. If the difference between the time when a card was last reset and the current time is less than 5 minutes, the request for card reset is denied. Also a counter is required so that if the card has been reset three times, subsequent card reset will also be declined. A card reset data structure is provided below with a description of its function.
STRUCT FR_CARD_RESET (
  STRUCT SI_LTID FR_CR_LTID;
  INT FR_CR_RESET_TIME [TVECT];
  NIB FR_CR_RESET_COUNT )

FR_CR_LTID is the LTID of the card where a card error has occurred. The channel field of the LTID will always be the first channel number for that card. (i.e. There are * channels per ATI card. If the first card of an ATI district is to be reset, the channel field in FR_CR_LTID will be 0. Whereas, the channel field will be 8 if a card reset is to be performed on the second ATI card).

FR_CR_RESET_TIME is an integer array containing the absolute system time when a card is last reset. It gets updated every time a card reset occurs.

FR_CR_RESET_COUNT is a nibble counter which keeps track of the times a card reset takes place. The maximum value for this counter is three.

The Card Error Database is an array of 30 elements. It will reside in the dynamic memory area. It is restart retained, but is not kept redundantly. The size of the array is 30 * 6 = 180 words.

Each record has a life span of 4 hours. This life time is arbitrary.

General Purpose Request Queue

To avoid performing card resets in the FEP environment, the Failing Resource Management software does not issue the DOWN and UP packet. Instead, it creates a temporary record and stores the card LTID in the record. The DOWN_MAINT task will be responsible for accessing this Card Reset request and performs the actual card reset operation.

As previously mentioned, special handling will be applied to a soft-downed ROLMphone sending a "Power-Up" event. Error Analysis test will be scheduled after the phone is "soft-upped". EA test are also scheduled when a "too-many-events" event is detected by the Rolmphone Input and Output Scanners.

The following is the structure definition of a general purpose request record for recording a "card reset" request, a "channel retest" request from the Scanner or "soft-down" or "soft-up" request initiated from the FEP:
STRUCT FR_MISC_REQ (
  POINTER STRUCT FR_MISC_REQ
    NEXT_FR_MISC_REQ_PTR,
    PREV_FR_MISC_REQ_PTR;
  STRUCT SI_LTID FR_MISC_REQ_LTID;
  INT FR_MISC_REQ_CR_TYPE;
  BYTE FR_REQUEST_FUNC;
  FR_WHO_REQUEST );

(a) NEXT_FR_MISC_REQ_PTR is the address to the next request record.
(b) PREV_FR_MISC_REO_PTR is the address to the previous request record in the list.
(c) FR_MISC_REO_LTID is the LTID where the FR_REQUEST_FUNCtion is to be applied to.
(d) FR_MISC_REQ_CR_TYPE is the card type of the LTID. This information is needed for the retest requests.
(e) FR_REQUEST_FUNC is the function type of the request:
  FR_CARD_RESET_REQ,
  FR_RPI_FLOOD_RETEST_REQ,
  FR_RPI_PWR_ON_RETEST_REQ,
  FR_CHANNEL_SDOWN_REQ,
  FR_CHANNEL_SUP_REQ,
  FR_RETRY_CME_SDOWN_REQ,
  FR_CLR_CME_SDOWN_REQ,
  FR_RPI_ERR_RETEST_REQ.
(f) FR_WHO_REQUEST is to identify who (SI, FEP, etc.) initiates the specific request.

The standard utilities, LINK( ) and UNLINK( ) will be used to enqueue and dequeue these general purpose request records, Two global entries will be added to the file, DOWN_DYNAMIC as the head and tail pointers to the Card Reset records. An illustration of the linkages they provide is included in FIG. 73.

Global Data for Restart Recovery for Failing Resources

Two variables are needed to support the Failing Resource Restart Recovery scheme. INT FR_R-R_RETEST_DONE: This variable is set to true when all Failing Records that are marked by the Restart Recovery procedure for retesting. Conversely this variable is set to false when there are more "marked" Failing Resource records to be processed.

INT FR_RR_NEXT_IDX: This variable contains an index to a record in the Failing Resource Table. This record will be picked next by the PICK_RE_RECORD( ) task for retesting. Its value is NULL when FR_RR_RETEST_DONE is set to TRUE.

Modification of the Error Parameter Databases

It is foreseeable that we may not want to soft-down some telephony resources when certain types of errors are logged because they may not be affecting the service performance. On the other hand, we would like to see those errors logged and to have their error priorities escalated when the FAILED threshold (number of failures) is reached.

The file TSPARM_DB.sp contains various databases for errors logged from the System Integrity tests, the Monitors and from the Fep Scanners. Each record represents a unique error and consists of the first and, sometimes, the second level priorities for that error, also the PASSED/UP and FAILED/DOWN thresholds for that particular error.

This file inserts a flag in each Error Parameter record. This "Do_Not_Soft_Down" flag, when set, signifies that soft-downing a resource is forbidden even though the FAILED threshold has been exceeded.

The data structure for these error parameter records in file TSPARM_DB is provided below:
STRUCT ALL_ERR_PARM ( INT CRTYPE, MARKER,
  PRIOR, UPTHRESH, DNTHRESH, CHAN_WARNING,
  CARD_WARNING, DO_NOT_SDOWN );

CRTYPE is the card type of the resource. MARKER indicates the type of error parameter record either monitor or test. PRIOR is the first level error priority. UPTHRESH and DNTHRESH are the high and low thresholds for the resource. CHAN_WARNING is the second level channel error priority. CARD_WARNING is the second level card error priority. DO_NOT_SDOWN is a special record indicating that no soft_down is allowed.

Program Design
RE RETEST CHECK( )
Functional Description

This is the main driver for the procedure FR_MANAGEMENT( ). Given the current test result (in the pseudo error form) and the past history (in the error pocket) of a channel, this routine analyzes the information and decides whether the channel needs to be retested. If retesting is not required, it uses the test information and the UP and DOWN thresholds to determine is a channel needs to be returned to or removed from service. It also checks if a card error is detected and passes this observation to FR_MANAGEMENT( ).

Invocation Interface

It is called in STUFF_POCKET( ) which is called by ERR_POST_PROCESS( ). This routine is only executed when it is running on the Active processor.
PARAMETERS:
Pointer to the pseudo error information,
Pointer to the error pocket,
Test Result (TEST_PASSED or TEST_FAILED),
New Current Status of the error pocket,
Previous Current Status of the error pocket,
Request Type,
Pointer to the channel Service-status (to be updated) (UP, RESTORED, DOWN, NULL for no change),
Pointer to a word that indicates that whether the error priority should be upped or downed.
RETURN:
NOERR

Program Design (1) Return here if this procedure is invoked from the standby processor.

(2) Initialize the RE_TEST (local) flag to FALSE. Set a local counter to 0 as the number of test repetitions. Initialize the Service status to "NULL".

(3) Check if the pseudo error is formatted by Error Analysis. Set a local flag, CARD_ERR to contain the value of the card error bit in the pseudo error.

(4) If TANDEM_FLAG is FALSE and the error is a Monitor error (Format 9), set a local flag OK_TO_S-DOWN to TRUE if the card type is one of the following, CR_ETI, CR_RPI, CR_CYP or CR_DIS.

(5) If the test result is TEST_PASSED: If this is the first pass after a series of failures, the failing streak is broken. Set the RE_TEST flag to TRUE, and number of test repetitions to 2. Go to step 6.

If the previous error history indicates that this is not the first occurrence of success, check if the UP (PASSED) threshold has been exceeded. If the UP threshold has not been exceeded yet, return to the calling routine.

If TANDEM_FLAG is FALSE and OK_TO_S-DOWN is FALSE, return to calling routine. If TANDEM FLAG is TRUE but it is not an Error Analysis error pocket, return to caller.

If the UP threshold is reached, invoke FR_MANAGEMENT( ) to request returning to channel to service it is currently out of service (ERST==-DOWNED). If the request is granted, update the service status parameter to "RESTORED". Go to step 7.

(6) If the test result is TEST_FAILED: Check if this is the first failure after a series of passes. If the passing streak is broken, set the RE_TEST flag to TRUE and the number of test repetitions to 1. Go to step 7.

Check if the DOWN (FAILED) threshold has been exceeded. If not, return to the calling routine.

If TANDEM_FLAG is FALSE and OK_TO_S-DOWN is FALSE, return to calling routine. If TANDEM_FLAG is TRUE and the error pocket is not formatted by Error Analysis, return to caller.

If the DOWN threshold is reached and the DONT_SDOWN flag in pseudo error form is not set, and the ERST field in error pocket says that the channel is still in-service, then call FR_CHANGE_CHANNEL_STATE( ) to request removing the channel from service. If the request is granted, update the out-of-service parameter to "DOWNED".

(7) If the RE_TEST flag is TRUE, see if all the following conditions hold TRUE:
TANDEM_FLAG is TRUE,
Error Analysis is enabled,
this is an Error Analysis error pocket, and
it is not a job initiated from the CLI, Call SCH_ERR_ANALYSSI( ) to schedule Error Analyssi for retesting the channel.
(8) Return NOERR.

FR MANAGEMENT( )

Function description

Given the LTID of a channel and the service status to be set, this procedure calls FR_CHANGE_CHANNEL_STATE( ) to alter the channel's service status (out-of-service of in-service). If the channel is a PhoneMail channel, however, any request to change the channel's service-status will be ignored. This procedure is also responsible for resetting a card. If this routine provides an argument to allow the calling procedure to indicate that a card error has occurred. If there is no indication that a card error has occurred, a special check will be made in the case of soft-downing a channel. If all the channels in the card (where the just soft-downed channel resides) are soft-downed the card will be reset and all the channels for that card will be rescheduled for testing.

Invocation interface

This routine replaces the procedures, TRY_CARD_DOWN( ) and TRY_CARD_UP( ). It will be invoked by the new procedure, FR_RETEST_CHECK( ). It is called, in place of DOWN_UP_CHANNEL( ), from the FEP Scanners or the exception table error-processing software.
PARAMETERS:
Pointer to the channel's LTID,
Card type,
Service Status to be set to,
Requestor (System Integrity, FEP . . . ),
Card Error flag,
OK to suspend flag,
Pointer to the resulting service-status.
RETURNS:
NOERR (request for service status change is done)
FAILED (request cannot be granted)
CANT_COMPLETE (unexpected interruption)

Program Description (1) Initialize the parameter, SERVICE_STATUS to NULL (for no change).
(2) If TANDEM_FLAG is FALSE, proceed if the card type of the channel is CR_RPI, CR_CYP, CR_TRUNK, CR_DIS and CR_T1D3 and CR_ETS. Return CANT_COMPLETE if the card type is none of the above.
(3) If the card type is one of the following: CR_RPI, CR_RLC1V or CR_RLC1, locate the channel's TCN record. If the channel type of the TCN record shows that is a PhoneMail channel (CH_VPC), return CANT_COMPLETE.
(4) Call FR_CHANGE_CHANNEL_STATE( ) to update the Failing Resource Table and perform the necessary service-status change.
(5) If TANDEM_FLAG is FALSE, do not proceed to the next step.
(6) If the Card Error flag is not set, check to see if we have just soft-downed a channel and if all the channels in the card are already soft-downed. If this is the case, the card warrants a card reset. Set the Card Error flag to TRUE.
(7) If the Card Error flag is TRUE, allocate and enqueue a temporary Card Reset Request record so that the DOWN_MAINT task can later come around to perform the card reset operation.
(8) Return to calling procedure.

FR CHANGE CHANNEL STATE ( )

Functional Description

This procedure locates the Failing Resource record matching the given channel LTID. It informs the Threshold alarms software to recalculate the alarm category for the failing resource type. It updates the Failing Resource record accordingly depending on what channel state change is required. It then calls DOWN_UP_CH( ) with a soft-down or soft-up function to set/reset the status bit so that various applications know whether a channel is available for service or not.

Invocation Interface

This routine is called from FR_MANAGEMENT( ).
PARAMETERS:
Pointer to the LTID,
Card Type,
Service Status to be set (out of service, in service),
Requestor (System Integrity, FEP Scanners),
Keep in Service flag,
OK to suspend flag,
Pointer to resulting service status.
RETURN:
NOERR (request for service status change is done)
FAILED (request cannot be granted)
CANT_COMPLETE (unexpected interruption)

Program Description (1) Initialize parameter, CARD_RESET flag to FALSE.
(2) Call FR_RECORD_UPDATE( ) with an "update" function to locate a record key by the LTID in the Failing Resource Table. If the record is not found, FR_RECORD_UPDATE( ) will create a new entry.
(3) If no error returns for FR_UPDATE_UPDATE( ), check to see if the channel is already in the state requested to be changed into. If so, update the resulting state in the parameters to the existing service-status. Exit this program and return NOERR.
(4) Call FR_RECORD_REPLACE( ) to assign the record_status field to TA_UPDATE_NEEDED. (This acts as a semaphore).
(5) Call LOGICAL_UPDATE( ) to update the Failing Resource Table on the redundant side.
(6) Pass the OK-to suspend flag and invoke Threshold Alarms to request permission to change the channel state. If permission is not granted, make an exception if and only if the FEP scanner is requesting the channel state-change (set a REQUEST_GRANTED flag to FALSE).
(7) If Threshold Alarms indicate that suspension/s has/have taken place (in the case that it is 0K to suspend), call FR_RECORD_UPDATE( ) with an "update" function to find/create the record again, just in case the record gets clobbered during the suspension.

(8) If Threshold Alarms indicates that the alarm calculation is complete, reset the record-status field to "TA_UPDATE_DONE".

(9) Update the record. If the channel is to be returned to service, but if there are other sources that believe this channel should stay out-of-service, set the REQUEST_GRANTED flag to FALSE.

(10) If the state-change request is granted, call DOWN_UP_CH( ) to actually perform the removal the channel from or return it to service.

(11) If DOWN_UP_CH( ) indicates that the new state of the channel is pending soft-downed and it is a common equipment, call FR_MISC_REQ_INSERT( ) to retry the soft-downed request later. If DOWN_UP_CH( ) indicates that the soft-up or soft-downed request is processed OK, then, just in case, call FR_MISC_REQ_INSERT( ) to abort any "retry soft-downed" requests for that channel.

(12) If the channel is to be returned to service, and if the record status is "TA_UPDATE_DONE", then call FR_RECORD_UPDATE( ) with a "delete" function so that the record will be cleared. Otherwise, the record status must be "TA_UPDATE_NEEDED". Set the record status to "TA_UPDATE_CLEAR" to signal to Threshold Alarms to delete the record when it gets around to recalculating the alarm category.

(13) Call LOGICAL_UPDATE( ) to update the standby side again.

(14) Finally, return to calling procedure.

SCH ERR ANALYSIS( )

Functional Description

Given the LTID of a card, this procedure will attempt to schedule Error Analysis tests on a specific channel or on all the channels for a card.

Invocation Interface

This subroutine is called by FR_RETEST_CHECK( ) when it wants to reschedule Error Analysis tests for a particular channel. It is also invoked from FR_PROCESS_MISC_REQ( ) after a card reset operation is performed so that all the channels on the reset card can be retested.

PARAMETERS:
Pointer to the LTID,
Card Type,
Flag indicating whether the whole card needs to be tested,
Number oftest repetitions.
RETURN:
NOERR
CANT_COMPLETE

Program Description (1) Call CRTY_TO_CIDX( ) to convert the card type to the "card information index".

(2) Pass this index value to EA_DISABLED_FOR_CARD( ) to check if Error Analysis is disabled for this card type.

(3) If Error Analysis is disabled for this card type, return CANT_COMPLETE.

(4) If the whole card needs to be tested, call CHANNEL_RANGE_FOR_CARD( ) to get the range of the channel numbers represented by the card. Otherwise skip this step.

(5) Call INSERT_PRI_0( ) to schedule Error Analysis tests on the channel(s).

(6) If an error is reported from INSERT_PRI_Q( ), return CANT_COMPLETE.

(7) Return NOERR.

FR PROCESS MISC REQ( )

Functional Description

This routine processes each Card Reset Request record, soft-down request record, soft-up request record or Channel Retest Request record on the General Purpose Request Queue. For a card reset request, it builds a Card Error entry in the Card Error Array with the card LTID as the key. It call FR_SEND_CR_RESET_PACKET( ) to send a DOWN and UP command packet to the card where the card-error has occurred. If the reset operation is successful, it invokes SCH_ERR_ANALYSIS( ) to schedule Error Analysis on all the channels on the card.

For a soft-down or soft-up request, it call FR_MANAGEMENT( ) to change the channel's service status. If it is a Channel-Retest Request record, this procedure simply call SCH_ERR_ANALYSIS( ) to schedule Error Analysis tests on the channel specified in the request.

Invocation interface

This procedure is invoked from DOWN_MAINT( ) which is running under the DOWN_MAINT task.
PARAMETERS: None.
RETURN:
NOERR
CANT_COMPLETE

Program Description (1) Access the Card Reset Request List. If is empty, exit this routine.

(2) Traverse through each request until there are no more entries requesting for card resets. Unlink the current card reset request from the list.

(3) If it is a channel retest request, call SCH_ERR_ANALYSIS( ) to schedule Error Analysis tests for the specific channel in the record.

(4) Call FR_MANAGEMENT( ) if it is a soft-down of soft-up request.

(5) If it is a card reset request: Create and initialize a Card Info. recorded in the FR_CR_ERROR array if one does not exist already.

Check if it is the first occurrence of a card failure (the card reset counter would be 0). If it is not, check if it is beyond 5 minutes since a card reset was last performed. If 5 minute have not elapsed, free this card reset request and repeat step 2.

Call FR_SEND_CR_RESET_PACKET( ) to send a DOWN and UP packet to the failing card and do the necessary reconfiguration for the channels on the card.

Store the current time in the Card Info. record in the Card Error Array.

If a bad return code is returned from FR_SEND_CR_RESET_PACKET( ), indicating that the card fails to be reconfigured, free this card reset request records and repeat step 2.

Call SCH-ERR-ANALYSIS( ) schedule Error Analysis priority testing for all the channels that belong to the just reset card.

(6) Free the retest or card reset request record and repeat step 2.

FR SEND CR RESET PACKET( )

Functional Description

This routine sends the DOWN and UP commands/enables in a single packet of a specified card. Depending on the card type, this routine may or may not have to initiate any configuration task for that card.

Invocation Interface

This routine is called from FR_PROCESS_MISC_REQ( ).
PARAMETERS:
Pointer to the LTID,
Pointer to the card-reset flag (to be updated).
RETURN:
NOERR (if all goes well),
FAILED (something bad has happened).

Program Description (1) Convert the district LTID to a hardware-map LTID by calling DIST_TO_HWMAP_LTID( ). Pass FALSE as the CODEC_FLAG to the routine so that the logical slot of the interface card is returned.

(2) Call FORM_UNIV_CMD_ENABLE( ) to form both a DOWN enable and UP enable by referencing the logical hardware-map LTID.

(3) Obtain a packet via GET_TDM_PACKET( ) to send the card reset packet to the specified card.

(4) If the just reset card's type is TTI, call PROCESS_TTI_UP( ) to wait for TTI configuration download is complete.

(5) If the card type is ADG, call ADG_CONTROLLER( ) to initialize the card.

(6) If the card type is T1D3, call PROCESS_CLI_T1D3( ), to initiate the T1 Download Task and to update the clock source. Pass a flag to PROCESS_CLI_T1D3( ) to suppress any print statements from DOWNLOAD_T1( ). (DOWNLOAD_T1( ) suspends)!

(7) If it is a ROLMphone interface card and RPD_EXIST( ) returns DATA_EXIST, then call DOWN_UP_RPD( ) to "up" the dataline and/or "up" the cypress.

(8) Return NOERR if no error is returned from the configuration download routine. Otherwise, return FAILED.

FR CR ERR CLEAR( )

Functional Description

This routine clears any card reset records in the FR_CARD_ERROR [ ] array that are over four hours old since the last card reset.

Invocatio Interface

This routine is invoked by the DOWN MAINT task in five minutes interval.
PARAMETERS: None.
RETURNS: GOOD.

Program description (1) Walk through the whole FR_CARD_ERROR [ ] array and for each non-free record:

(2) Compare the time recorded with the system time. If the difference shows that the record is four hours or older, clear the record.

CHANNEL RANGE FOR CARD( )

Functional Description

Given the LTID, this routine figures out the location of the card within its district. It then can tell the range of channel numbers represented by the card.

For example, LTID 00/020209 in a TTI district is passed to this routine. It indicates the TTI channel (9) is the third card in the district. There are 4 channels in one TTI card, therefore, the range of channel number of the third card in a TTI district is 8 to 11.

Note that this routine assumes that the LTID parameter is valid.

Invocation Interface

This is a utility routine provided for any routine which needs to find out the logical channel range of an interface card in a district. This routine will be defined in file, SI_TUIL02.sp.
PARAMETERS:
Pointer to the LTID
Pointer to the lower channel range (to be updated),
Pointer to the higher channel range [to be updated).
RETURN:
NOERR

Program description (1) Get the card type by calling GET_CARD_TYPE( ).

(2) With the card type as the index into the Connection Data Directory, CONN_DATA_DIR [ ], get the number of channels per card (C_CHNLS field). (Let the value be n).

(3) Let c be the channel field in the LTID structure.

(4) An offset value, x, is obtained by the channel number divided by the number of channels. ($x := c/n$)

(5) The lower channel range is the product of n times x.

(6) The higher channel range is the result of (n * (x=1)−1).

PHONEMAIL CHANNEL EXISTS( )

Functional Description

Given the LTID of a phone channel or the Terminal Configuration (TCN) Record for that channel, this procedure finds out whether this channel is a PhoneMail channel.

Invocation Interface

This routine should be called each time before invoking ACTIVATE_RPI_CHANNEL( ) to activate/deactivate or up/down a ROLMphone channel. If it si a PhoneMail channel, ACTIVATE_RPI_CHANNEL( ) should not be called. This routine will reside in file SI_UTIL02.sp.
PARAMETERS:
Pointer to the LTID,
Pointer to the TCN record for that channel.
RETURNS:
TRUE (1) /? yes, it is a PhoneMail Channel
FALSE (0) /? not a PhoneMail channel

Program Description (1) If the second parameter is NULL, call ERP_TERMINAL_CNFG( ) to locate the TECN for the LTID. Return FALSE if an error code is returned.

(2) With the TCN, compare the channel type field, TCN_RPS_TYP with the literal value of CH_VPC. If there are identical return, TRUE. Otherwise, return FALSE.

FR RESTART RECOVERY

Functional Description

This procedure carries out the recovery action items for the Failing Resource Table in the events of major restarts and switchovers.

On a major restart or switchover, this routine will re-soft-down any channel recorded in the Failing Resource Table. This is done because the status bits (e.g. DND, Message-waiting, SoftDOWN) of some resources (e.g. trunks) are cleared on restarts. After re-soft-downing the channel, it flags the record so that the channel of the record will be tested.

If a switchover has occurred, this procedure will also walk through the Failing Resource Table. It clears the FR_ASSOC_OTHER bits in each record if FR_CR_TYPE does not indicate a trunk card-type. If FR_ASSOC_ERRH bit is zero as well, the channel associated with this record will be returned to service.

Invocation Interface

This routine is invoked from DOWN_MAINT( ) in the case where the DOWN_MAINT task is awaken and it realizes a restart of a switchover has taken place.
PARAMETERS:
Restart type (SYN restart or switchover)
RETURNS: NOER

Program Description (1) Initialize FR_RR_RETEST_DONE to FALSE, and FR_RR_NEXT_IDX to 0.
(2) Traverse all records in the Failing Resource Table.
(3) If the record is not empty and a switchover occurs, and the carry type is not a trunk card type, then clear the FR_ASSOC_OTHER bit. If FR_ASSOC_ERRH is already cleared, call FR_MANAGEMENT( ) to place the channel in service again and go to step 2.
(4) If the channel state indicates that the channel is out-of-service, call DOWN_UP_CH( ) to re-soft-down the channel.
Set the RR_RR_NEEDED flag to TRUE to indicate this channel needs to be retested due to restart or switchover.
(5) Repeat from step 2.

Functional Description

When the Hardware Error Table is discovered to be corrupted, it will be cleared. This procedure will identify any Failing Resource record which is associated with a hardware error entry when ERRH is corrupted. It will clear the FR_ASSOC_ERRH bit. If after disassociating from the ERRH, the record becomes free of other sources of soft-down requests, the channel implicated by the record will be returned to service.

Invocation Interface

It is invoked by REINIT_ERRH_AND_ASSOC_SI( ) which is called by INTEG_INIT( ).
PARAMETERS: None
RETURNS: NOERR

Program Interface (1) Traverse through the Failing Resource Table.
(2) If the record is not empty, clear the field which indicates that there is an ERRH entry associated with this record.
(3) If there is no more indication that this record is soft-downed by other sources, call FR_MANAGEMENT( ) to return the channel to service. Instruct FR_MANAGEMENT( ) not to suspend.
(4) Return NOERR.

LU FR RECORD SLAVE( )

Functional Description

This is the slave routine which updates the Failing Resource database on the standby side. If a switchover occurs and there are queued logical updates request on the ex-active side, this procedure will not process them but discard them.

Invocation Interface

It is called by PROCESS_RDNT_MSG( ) running under the _IOBUS_IN( ) task.
PARAMETERS:
A operation type:
 (FR_OPR_UPDATE—logs an entry in Failing Resource Table,
 FR_OPR_CLEAR—clear an entry from the FR Table).
Pointer to the data buffer,
Size of the data buffer.
RETURNS:
NOERR

Program Description (1) If this is the active side, do not proceed but return NOERR. This will cause the logical update request to be discarded.
(2) If the operation type is FR_OPR_UPDATE, call FR_RECORD_UPDATE( ) with the update function to enter a record in the Failing Resource Table.
(3) If the operation type is FR_OPR_CLEAR, call FR_RECORD_UPDATE_( ) to delete the specified record.

PICK FR RECORD( )

Functional Description

This procedure walks through the Failing Resource Table and picks a Failing Resource record which is marked by the task FR_RESTART_RECOVERY( ). If such a record exists, it initialize the job record. If all "marked" records have been processed, (no more entries), an error will be returned.

Invocation Interface

The routine is called by SEARCH_RQ( ) running under the DM task. It is called before any internal test is picked but after and CLI or Error Analysis scheduled jobs.
PARAMETERS: None
RETURNS:
NOERR
RTN_NOTEST /? can't find a valid record Program Description (1) Get FR_RR_NEXT_IDX as the next index to the Failing Resource Record to be processed.

(2) If the index in NULL, (e.e. no more records to process), reinitializes FR_RR_RETEST_DONE to TRUE, return RTN_NOTEST.

(3) If it is an empty record, increment FR_RR_NEXT IDX by 1 and repeat from step 1. (A local counter will keep track of the times it repeats step 1, if the counter becomes greater than 50, return RTN_NOTEST.

(4) Check if both the channel state in the record is out-of-service and the FR_RR_NEEDED bit is set, initialize the job record.

(5) Clear the FR_RR_NEEDED bit and increment FR_RR_NEXT_IDX by 1.

(6) Return NOERR.

PRINT SDOWN RECORD( )

Functional Description

This routine will format and display all softdowned channels that are recorded in the Failing Resource Table.

Invocation Interface

When a user enters the "LIST DOWN" command, PRINT_MAPS( ) will be called which, in turn, calls PRINT_SDOWN_RECORD( ).
PARAMETERS: None
RETURNS:
NOERR Program Description (1) This routine walks through the FR_CR_LIST array and prints all out-of-service channels (LTIDs) and their channel types in the order of their card types.

FR Database Access Functions

FR RECORD CREATE( )

Functional Description

This procedure finds a free entry in the Failing Resource Table and updates the different counters for housekeeping purposes. It also initialize the new records.

An error will be returned if the table is full. If a free entry is found, it passes the index back to the calling routine.

Invocation Interface

It is called by FR_RECORD_UPDATE( ).
PARAMETERS:
Pointer to the LTID for the failing resource,
Card Type,
Pointer to an integer index (to be updated),
Request type (SI or FEP Scanners).
RETURN:
GOOD (if all goes well)
DB_FULL (if no more free entry is available)

Program Description (1) If FR_NEXT_FREE_IDX is NULL, return DB_FULL.

(2) Get FR_NEXT_FREE_IDX from the Failing Resource Database as the index to the new entry.

(3) Initialize this new entry.

(4) Add this to the FR_CR_LIST [ ] array using the card type parameter as an index into the list. Resolve the index cross references.

(5) Increment FR_NUM_ENTRIES by 1.

(6) If the index of the new entry is greater than FR_MAX_IDX_USED, update this counter with the index value.

(7) Find the next available empty record and assign the index to FR_NEXT_FREE_IDX. If there is no empty record, update FR_NEXT_FREE_IDX to NULL.

(8) Return NO_ERR.

FR RECORD FIND( )

Functional Description

Given the LTID of a failing resource, this procedure determines if there is an entry matching the LTID in the Failing Resource Table. It can be used as a duplicate-checking function.

Invocation Interface

It is called by FR_RECORD_UPDATE( ) and FR_RECORD_CLEAR( ).

Program Description (1) Initialize the index to NULL.

(2) With the card type as the index, get the first index form FR_CR_LIST[index]. If the first index is NULL, return NO MATCH.

(3) Traverse through each FR_RECORD belonging to the same card type, using the parameter LTID as a key. If a match is found, update the index pointer and return GOOD.

(4) All records of the same card type are searched, return NO_MATCH.

FR RECORD CLEAR( )

Functional Description

Given the index of the FR record in the FR Table, this procedure reinitializes the record to make it look like a free entry. It also decrements the counters in the database for housekeeping purposes.

Invocation Interface

It is called by FR_RECORD_UPDATE( ).
PARAMETERS:
Index of the Failing Resource Record to be deleted, card type. RETURN:
RETURN:
GOOD
NO_MATCH Program Description (1) Call FR_RECORD_FIND( ) to locate the record to be deleted from the card list.

(2) If the record is not found, return NO_MATCH.

(3) If the record with the LTID as key is found, decrement FR NUM ENTRIES by 1. With the index returned by FR_RECORD_FIND( ), if FR_NEXT_FREE_IDX is greater than the index, assign index to FR_NEXT_FREE_IDX.

(4) Remove any index cross reference in the card list.

(5) Call BLKMV( ) to initialize the entire record to NULL.

(6) Return GOOD.

FR RECORD UPDATE( )

Functional Description

This procedure uses the miscellaneous access routines described previously to perform different updating functions.

Invocation Interface

It is called by FR_MANAGEMENT( ).
PARAMETERS:
Function type: UPDATE, REPLACE, FIND & DELETE.
Pointer to LTID,
card type,
Pointer to the FR RECORD (to be updated), (Applicable to UPDATE, REPLACE & FIND functions)
requested by (e.g. SI, FEP), **
channel status, **
record status, **
carry type
Pointer to the index (if found) (NULL if not found).
RETURN:
GOOD (if found a match)
NO_MATCH (if not found)
PARAMETERS:
Pointer to the LTID,
flag to indicate which type of error to **
set clear: SET_ASSOC_ERRH, CLEAR_ASSOC_ERRH, SET_ASSOC_OTHER, CLEAR_ASSOC_OTHER.
(Fields denoted with ** are applicable to UPDATE and REPLACE functions only. If no change is required to any field, a NULL value will be passed).
RETURNS:
system return code from the access functions.

Program Description (1) If function is DELETE, call FR_RECORD_CLEAR( ). Return to caller.
(2) Call FR_RECORD_FIND( ) to locate the record keyed by the LTID. An index number, x will be returned.
(3) If the record is found, get the address of FR_RECORD [x] and update the forth parameter.
(4) If the function if FIND, return to caller.
(5) If the function is REPLACE and the record is not found, return to caller.
(6) If the function is UPDATE and the record is not found, call FR_RECORD_CREATE( ) to get a new entry. If an error is returned, exit this routine.
(7) Parse each field that needs to be updated or replaced, and reassign the field with the new value accordingly.
(8) Return NO_ERR.
GOOD
NO_MATCH The next two access routines are provided in the interest of the Threshold Alarms Project. In both cases, the address of a FR_RECORD is returned to the caller so that the information in the record can be read.

FR RECORD FIND FIRST( )

Functional Description

Given a card type, this utility routine finds the first Failing Resource record for this card type. If three are no failing channels belonging to that card type, a bad return code will be passed back to the caller.

Invocation Interface

PARAMETERS
Card Type,
Pointer to the index value of the first Failing Resource record for that card type (to be updated if found),
Pointer to the first Failing Resource record for that card type (to be updated if found).
RETURNS:
NOERR (got it!)
EMPTY (there is no failing channel for this card type)

Program Description (1) Using the card type as the index into the Card List Array, FR_CR_LIST[ ], get the first index value.
(2) If the index is NULL, return EMPTY.
(3) Otherwise, access the FR_RECORD[ ] array with the index.
(4) Load the index and the address for the first failing channel as the contents pointed to by the second and third parameters respectively.

FR RECORD FIND NEXT( )

Functional Description

Given the address to a FR_RECORD, the address of the next record in the same card list is returned to the caller.

Invocation Interface

PARAMETERS:
Address of a FR_INFO record,
Pointer to the index of the next record (to be updated),
Pointer to the address of the next record (to be updated).
RETURNS:
NOERR (got it!!)
NONE_LEFT (end of the card list)
CANT_COMPLETE

Program Description

Validate the address of the FR_INFOR record to see if the pointer is within boundary of the FR_RECORD[ ] array. Return CANT_COMPLETE if the pointer is bad.
(2) Get the next index value from the FR_INFO record and with it, get at the next failing resource of the same card type.
(3) If the next index is NULL, there are no more failing channel records for the card type, return NONE_LEFT to caller, return control to next index value and the address of the next record via the parameters.

Threshold Alarms

INTRODUCTION

The Threshold Alarms tasks are responsible for calculating the percentage or actual number of resources that have failed and the percentage or actual number of resources that are out of service. The number and the percentage of resources that have failed and are out of service are used for two purposes. The failed amount is used to alert the field service personnel that a critical amount of a resource is defective. Also, an entry is logged in the Hardware Error Table indicating the kind and percentage of the resource that have failed.

The second purpose is to manage the removal of resources by the Failing Resource Manager (FRM). A channel cannot be taken out of service by the software or soft-downed if a critical amount of that resource is already out of service.

Functional Overview

Failed Channel Thresholds

Two types of entries are defined in the hardware error table to handle situations that arise when a critical threshold of a resource fails. When a resource exceeds a threshold, one of these entries is logged in the table. The two categories are major and minor alarms. They are based upon the severity of the threshold.

The number of failed resources is calculated by reading records in the Failing Resource Table (FRT). The FRT contains only those channels which have failed. It is important to note that if a technician physically downs a card, it does not appear in this table. A channel is considered to have failed only if it appears in this table. Thus, hard or courtesy downed resources do not count toward the failed channel thresholds.

Out of Service Threshold

Part of Failing Resource Manager's (FRM) responsibility is to put channels in and out of service. FRM does not take a channel out of service if the out of service threshold has been exceeded. There is one exception to this rule. If a scanner reports the failure, FRM does take the channel out of service (OOS) regardless of the OOS threshold. FRM waits for Threshold Alarms to report whether a channel can be taken OOS or not. Another reason is that in cases a scanner must force a channel OOS to prevent the system from being flooded with errors. Since Threshold Alarms may need to suspend, and a scanner can not tolerate suspensions, Threshold Alarms always allows a channel to be taken out of service by a scanner failure.

The number of OOS channels is determined by looking at the FRT. Each record in this table contains a field that indicates if the channel is in or out of service. A channel considers to be OOS if it appears in the table and this field is set to OOS. Note that hard or courtesy downed resources do not count toward the OOS threshold as they are not logged in the FRT.

Nodal Threshold Values

Some resources are checked by node, while others are monitored by the system. For example, suppose a switch has three nodes and each node has sixteen rotary register channels. Rotary registers are to be checked by node. Nine, five, and two channel have failed in nodes, 1,2, and 3 respectively. A major alarm is logged in node 1 (56%), a minor alarm is logged in node 2 (31%), and no alarm is logged in node 3 (12%). The various resources that are checked nodally are listed below with their respective thresholds.

| NODAL RESOURCES | | | |
|---|---|---|---|
| RESOURCE | MAJOR | MINOR | OOS |
| Rotary Register | >50% | >25% | >50% |
| Rotary Senders | >50% | >25% | >50% |
| DTMF registers | >50% | >25% | >50% |
| Conference Bridges | >50% | >25% | >50% |
| Advanced Diagnostics Card | >50% | >25% | >100% |
| Tone Senders | >50% | <=50% | >50% |
| DFEs | >50% | <=50% | >100% |
| Lines (SLIs, Phones, etc.) | >=A | >=B | >=20 |

| -continued | | | |
|---|---|---|---|
| NODAL RESOURCES | | | |
| RESOURCE | MAJOR | MINOR | OOS |
| Originating Data Devices | >=C | >=D | >=20 |

Note:
A, B, C and D are configurable system parameters.

The range of A, B, C and D and default values are:

| | RANGE | DEFAULT |
|---|---|---|
| A | 1-1000 | 20 |
| B | 1-20 | 10 |
| C | 1-1000 | 20 |
| D | 1-20 | 10 |

Lines and originating data switching ports are slightly unique. Their major and minor thresholds are configurable, their OOS thresholds are the default of their major thresholds.

Notice that the OOS thresholds for ADCs and DFEs are 100%. This allows the system to take all of these resources out of service. We do not want to allow a bad ADC to say another piece of hardware is bad.

Global Threshold Values

Global resource are monitored slightly differently. First, the amount of failed or OOS resources in the entire system are compared to the total amount in the entire system to determine if a threshold has been exceeded.

Another difference is that global resources are checked by data or trunk group only. For example, the number of failing trunks in trunk group CO1 throughout the system is compared only to the total number of trunks in trunk group CO1, not the total number of all trunks in the system. Finally, if a major or minor threshold has been exceeded, an error is logged in all nodes, rather than just one node.

For example, in a three node system, assume the default values have been chosen for the major and minor alarm thresholds. In each node there are ten trunks in trunk group CO1, making a total of thirty trunks in trunk group CO1 system wide. Four, three and nine trunks in trunk group CO1 have failed in nodes 1, 2 and 3 respectively. Thus, a total of sixteen trunks in trunk group CO1 (53%) have failed. A major alarm is logged in all three nodes.

The various resources that are checked globally are listed below with their respective thresholds.

| Global Resources | | | |
|---|---|---|---|
| RESOURCE | MAJOR | MINOR | OOS |
| TRUNKS (CO, TIE, ... ) | >=M% | >=N% | >=P% |
| ANSWERING DATA PORTS | >=X% | >=Y% | >=Z% |

NOTE:
M, N and P are configurable by trunk group. Their valid ranges default values are:

| | RANGE | DEFAULT |
|---|---|---|
| M→ | 1-100 | 50 |
| N→ | 10-M | 10 |
| P→ | 0-100 | 50 |

NOTE:
X, Y and Z are configurable by data group. Their valid ranges and default values are:

| | RANGE | DEFAULT |
|---|---|---|
| X→ | 1-100 | 50 |
| Y→ | 1-X | 25 |
| Z→ | 0-100 | 50 |

Notice that the default values for the major thresholds and the OOS thresholds are the same. If the configurable parameters are changed, the entries previously logged in the hardware error table are not modified.

Error Displays:

Major threshold alarms have a priority of 150 and minor threshold alarms have a priority of 180. FIG. 74 is a hardware error table display for the previous rotary register example. It is important to notice that the information displayed is in a natural language that is easily interpreted by an operator. FIG. 75 is a hardware error table display for the previous CO trunk example. The last message on each display summarizes the information for the particular resource.

Other System Integrity (SI) errors require a message on each display summarizes the information for the particular resource.

Other System Integrity (SI) errors require a resource to pass a test X consecutive times (where X depends upon the resource) before its status is changed to PASSED. The status of the major or minor alarm error, however, is changed to PASSED immediately after it passes the first time (i.e. X=1). To pass, the amount of resources that have failed must be below the threshold for that particular resource.

Pending Soft Down (PSD)

If FRM cannot soft down a channel because it is currently busy, it sets its state to pending soft down. Threshold alarms consider all channels with this status to be out of service.

Design Overview

Figure 76:
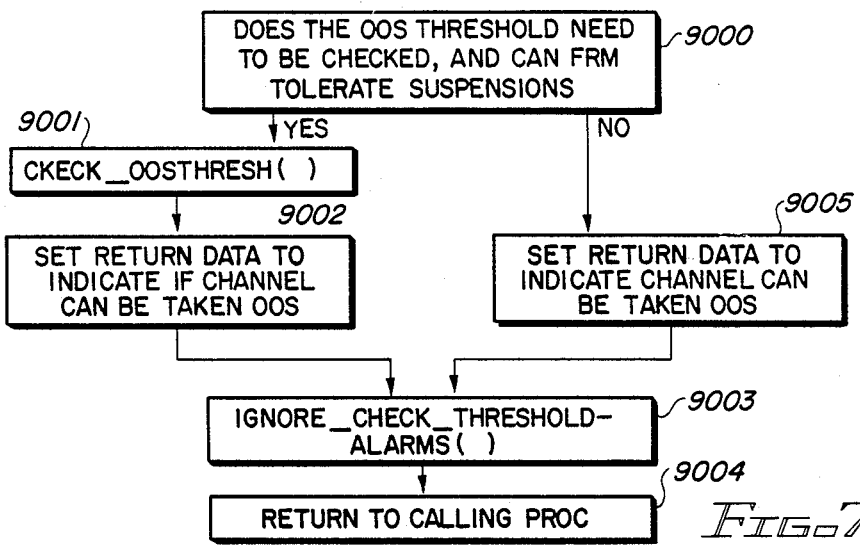
FIG. 76 is a flowchart of the THRESHOLD_ALARMS_CHECK( ) task.
Figure 77:
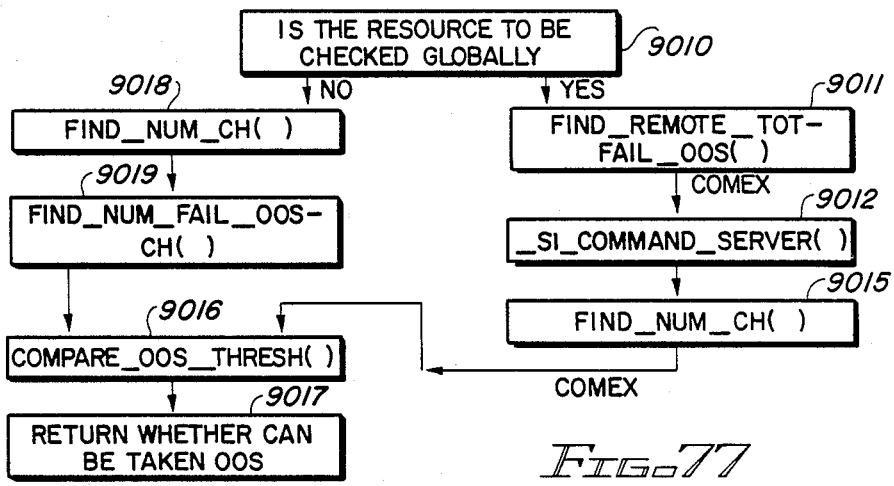
FIG. 77 is a flowchart of the CHECK_OOSTHRES( ) task.

THRESHOLD_ALARMS_CHECK( ) is called by FRM when an entry needs to be added, deleted or updated in the Failing Resource Table. A flowchart of the task is provided in FIG. 76. Control enters with a test to see if the OOS threshold should be checked and FRM can tolerate a suspension as indicated in decision block 9000, CHECK_OOSTHRESH( ) is invoked at function block 9001. CHECK_OOSTHRESH( ) returns data that indicates whether the channel can be removed form service and detects if the channel is already suspended as indicated in function block 9002. Then, _CHECK_THRESHOLD_ALARMS( ) is invoked as shown in function block 9004. However, if the FRM cannot tolerate a suspension, the return data is set to indicate that the channel can be taken OOS, but that it did not suspend as indicated in function block 9005 and control is passed to function block 9003 to invoke _CHECK_THRESHOLD_ALARMS( ) and ultimately to return to the calling task as indicated in function Another task is used to determine if a channel can be taken OOS based on its OOS threshold. This task is CHECK_OOSTHRESH( ) and its logic is diagrammed in the flowchart presented in FIG. 77. At decision block 9010, control enters and an immediate test determines if the resource should be checked globally or not. If it is, then function block 9011 will use a Communication Executive (COMEX) that has the ability to communicate with the other nodes. Functional block 9011 invokes COMEX through _SI_COMMAND SERVER( ), which is functional block 9012. _SI_COMMAND_SERVER( ) resides in the remote node. It deciphers the incoming information, and based upon the message type, it takes appropriate action. In this case, it will call functional blocks 9013 and 9015 to find the total amount of channels for a card type, and the number of out of service (OOS) channels for that card type respectively. Using COMEX, these numbers are sent back to the requesting node. The results are added together, and passed to COMPARE_OOS_THRESH( ), which is functional block 9016.

If this is a nodal resource, functional block 9010 will call functional blocks 9018 and 9019. They will find the number of total channels for a card type, and the number of OOS channels for a card type in the local node. Control will then be given to COMPARE_OOS_THRESH( ), which is functional block 9016. COMPARE_OOS_THRESH( ) determines if the 00S threshold will be exceeded if the channel is removed from service. This conclusion will be returned to FRM.

Figure 78:
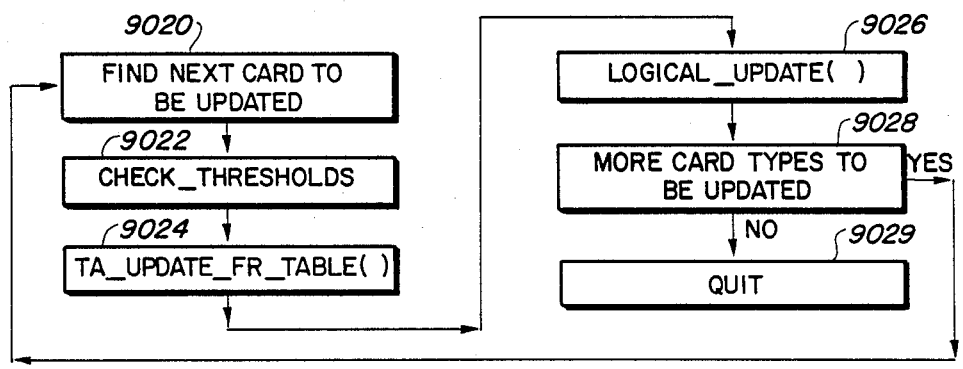
FIG. 78 is a flowchart of the _CHECK_THRESHOLD_ALARMS( ) task.

The task _CHECK_THRESHOLD_ALARMS( ) is principally concerned with checking the thresholds after Failing Resource Table has been updated. The logic for the task is presented in the flowchart of FIG. 78. Control enters at function block 9020 which determines the next card type to be updated. Then, the task CHECK_THRESHOLDS( ) is invoked at 9022 to check each of the thresholds for the particular card type.

TA_UPDATE_FR_TABLE is invoked at function block 9024 to update the failing resource table (FRT). It determines if any entries in the FRT are required to be updated or deleted. If so, the standby CPU must be informed LOGICAL_UPDATE( ), which is invoked at function block 9026, provides a mechanism to update databases on the standby CPU. Then function block 9028 determines if there are any more card types to be updated. If so, control returns to function block 9020. This will continue until there are no more card types in the FRT that require updates. Control will then be given to function block 9029. _CHECK_THRESHOLD_ALARMS( ) will terminate itself until further invocation.

FRM maintains two data structures which threshold alarms needs to use. The first, FR_CR_LIST[ ] is an array based on card type. In this array is an index to the first Failing Resource record of the carry type, the number of records for the card type, and the number of records for that card type that need to be updated by threshold alarms (FR_UPDATE_COUNT).

The second data structure is the actual FRT. This table contains one record for each failing channel in the system. One of the fields in each record is the status field. It can have one of three possible values: TA_UPDATE_DONE (threshold alarms has finished for this record). TA_UPDATE_DONE (this channel is being added and threshold alarms needs to run), or TA_UPDATE_CLEAR (this channel is being deleted and threshold alarms needs to run).

The procedure TA_UPDATE_FR_TABLE( ) is responsible for maintaining the status field in the Failing Resource record and FR_UPDATE_COUNT in FR_CR_LIST[ ] (from threshold alarms point of view). It has four main purposes. The first is to delete any entries that are no longer valid (i.e. their status is TA_UPDATE_CLEAR).

It is also responsible for updating the status field in the Failing Resource record to TA_UPDATE_DONE once threshold alarms has finished.

It is also decrements FR_UPDATE_COUNT whenever changing the status field. FR_CHANGE_CHANNEL_STATE( ) is responsible for incrementing the count before calling THRESHOLD_ALARM-S_CHECK( ). Finally, it updates the standby side if any of the above have taken place.

Fake Card Types

On an integrated voice and data card, where voice and data reside on the same channel, threshold alarms needs to know the difference between voice and data failures. If a voice failure occurs, it is put in the FRT under the card type CR_RPVOICE. If a data failure occurs, it is put in the FRT under the card type CR_RPDATA.

Card Groups

Each card type to be monitored for thresholds is assigned to a card group. Each common equipment card type has its own card group. Trunk card types are assigned to the trunk card group. Similarly, data and line card types are assigned to the data card group and line card group respectively.

PROGRAM DESIGN

THRESHOLD ALARMS CHECK

Functional Description

This procedure calls CHECK_OOSTHRESH( ) if FRM can tolerate suspensions and then invokes _CHECK THRESHOLD ALARMS ( ).

Invocation Interface

This routine is called by FR_CHANGE_CHANNEL_STATE( ) and has the following parameters:
CRD—card type
GRP—trunk or data group ordinal (if any)
OOS_FLAG—check the OOS threshold
CHANNEL_STATE—current state of the channel (in service, out of service, or pending soft down)
CAN_TAKE_OOS—channel can be taken OOS (pointer, to return data)
It returns either GOOD or FAILED.

Program Description (1) If the card should not be monitored for threshold alarms (i.e. this card is assigned to a card group), return to the calling procedure that the channel cannot be taken OOS. This should never happen.

(2) If the OOS_FLAG indicates the OOS threshold should be checked, call CHECK_OOSTHRESH( ). This routine determines whether the channel can be taken OOS or not.

(3) Otherwise, set the return data to indicate that the channel can be taken OOS.

(4) Check if _CHECK_THRESHOLD_ALARMS( ) is currently spawned (i.e. PTCB_THRESHOLD is not equal to NULL). If not and this is the active processor, call SPAWN_TCB( ), PUT_DISPQ( ), and SHIELD_TCB( ) to spawn, schedule, and protect _CHECK_THRESHOLD_ALARMS( ) respectively. This task checks the failed channel thresholds, and at the same time allow FRM to continue without suspending if it isn't allowed to.

(5) Return to FR_CHANGE_CHANNEL_STATE( ).

CHECK OOSTHRESH( )

Functional Description

This routine determines if the OOS threshold has been exceeded for a given card type/trunk or data group.

Invocation Interface

This routine is called by THRESHOLD_ALARMS_CHECK( ). It has the following parameters:
CRD—card type
GRP—trunk or data group ordinal
CHANNEL_STATE—the current state of the channel (IS, OOS, or PSD)
CAN_TAKE_OOS—whether the channel can be taken OOS (return data)
It returns either GOOD or FAILED

Program Description (1) Call GET_CGRP_PERCENT( ) to determine if this card group is to be monitored by actual number or percentage.

(2) Call GET_CGRP_GLOBORNOD( ) to determine if this card group is to be monitored by node or by system.

(34) If the resource is to be monitored globally, call REMOTE_CMMD( ) with the parameter of REMOTE_TOT_FAIL_OOS (to determine the number of total channels, and the number of OOS channel for that resource).

(4) Otherwise, call FIND_NUM_OOS_CH( ) to determine the number of OOS channels. If the channel is currently in service, add it to the number of OOS channels.

(5) If the card is to be monitored by percentage, call FIND_NUM_CH( ) to determine the total number of channels. Calculate the percentage.

(6) Call GET_MJ_MN_OOS_THRESH,( ) to determine the OOS threshold.

(7) If the percentage or actual number that have failed is above the OOS threshold, set *CAN_TAKE_OOS to FALSE.

(8) Return (GOOD).

FIND NUM CH( )

Functional Description This routine determines the total number of channels for a given card type, trunk or data group.

Invocation Interface

This routine is called by _CHECK_THRESHOLD_ALARMS( ) and FIND_REMOTE_TOT_FAIL_OOS( ). It has the following parameters:
CRD—card type
GRP—trunk group or data ordinal
RET_DATA—pointer to return data (total number of channels)
This routine returns either GOOD or FAILED

Program Description (1) call GET_CGRP( ) to determine the card group to which this card type belongs.

(2) If a trunk, set *RET_DATA to TPTR>INFO[GRP].ALL_TKS.

(3) if an answering data switching port, call DX_NUM_DATA_LINES( ) to determine the number of lines in the group.

(4) Otherwise, call FIND_NUM_CH_FOR_CARTY( ).

(5) Return (GOOD)

DX NUM DATA LINES( )

Functional Description

This routine finds the number of lines in a data group in the entire system.

Invocation Interface

This routine is invoked by FIND_NUM_CH( ). It has the following parameters:
GRP—data group ordinal
RET_DATA—pointer to number of data lines

Program Description (1) Call DX_SEARCH_GRPSTATUS( ) to retrieve a pointer to group member database.

(2) If get a good return value, continue. Otherwise, return (FAILED).

(3) Within the group member database, DX_GRPMEM_DB, there is a pointer (GM_MEMBER_LIST) to linked blocks of eight dataline numbers belonging to the datagroup.

(4) Look at contents of GM_MEMBER_LIST.GM_DLUNB[I] where I is set to zero initially. If not equal to NULL, increment NUM_LINES by one.

(5) Increment I.

(6) If I is greater than NUM_SUBGRPMEMS-1, get pointer to next block of data line numbers. Otherwise loop to step (4).

(7) If the pointer to the next block of data line numbers is not equal to NULL, loop to step (4) with the new block of numbers.

(8) Otherwise the pointer should be NULL. Set *RET_DATA to NUM_LINES.

(9) Return(GOOD)

FIND NUM FAIL OOS CH( )

Functional Description

This routine finds the number of failing and OOS channels for a given card type, trunk or data group.

Invocation Interface

This routine is invoked by _CHECK_THRESHOLD_ALARMS( ), CHECK_THRESHOLD( ), and FIND_REMOTE_TOT_FAIL_OOS( ). It has the following parameters:
CRD—card type
GRP—trunk or data group ordinal
NUM_FAIL—pointer to the number of failing channels (return data)
NUM_OOS—pointer to the number of OOS channels (return Data)
It returns either GOOD or FAILED.

Program Description (1) Call FIND_FIRST_CRD_IN_GRP( ).

(2) Call FR_RECORD_FIND_FIRST( ) to find the first entry in the FRT for this card type.

(3) Call FRM_TA_IS_CH_FAIL_OOS( ) to determine if this channel should be counted towards the failing and OOS totals.

(4) If the channel is failing, increment *NUM_FAIL.

(5) If the channel is OOS or PSD, increment *NUM_OOS.

(6) Call FR_RECORD_FIND_NEXT( ) to get the next record in the FR table for this card type. If there is another record, loop to step (3).

(7) Call FIND_NEXT_CRD_IN_GRP( ). If there is another card in the group, call TIME_SLICE( ) and loop to step (2).

(8) Return to the calling procedure.

GET MJ MN OOS THRESH( )

Functional Description

This routine returns the major, minor and OOS thresholds for a given card/type trunk or data group.

Invocation Interface

This routine is called by CHECK_OOSTHRESH( ) and CHECK_THRESHOLDS( ). It has the following parameters:
CRD—card type
GRP—trunk or data group ordinal
PMJ_THRESH—major threshold (pointer to return data)
PMN_THRESH—minor threshold (pointer to return data)
POOS_THRESH—OOS threshold (pointer to return data)

This routine returns FAILED, CANT_COMPLETE, or GOOD.

Program Description (1) Call GET_CGRP( ) to determine the card group for this card type.

(2) If this is a trunk, call GET_TRGP_RCD( ) to get the trunk group record. Set the thresholds for this trunk group.

(3) If this is an answering data port, call DX_SEARCH_GRPSTATUS( ) to get a pointer to the grpstatus data base. Set the thresholds for this data group.

(4) If this is an originating data port, call GET_CGRP_THRESHS( ) to get the OOS threshold. Set the major and minor thresholds to the values in configuration.

(5) If this is a line, call GET_CGRP_THRESHS( ) to get the OOS threshold. Set the major and minor thresholds to the values in configuration.

(6) Otherwise, call GET_CGRP_THRESHS( ) to get all of the thresholds.

(7) Return to the calling procedure.

FIND REMOTE TOT FAIL OOS( )

Functional Description

This routine finds the total number of channels, the number of channels that have failed, and the number of channel that are OOS for a given card type, trunk group, or data group when requested by another node. It sends the result to the requesting node.

Invocation Interface

This routine is invoked by _SI_COMMAND SERVER( ). It has the followin parameters:
PORT—COMEX port to return data to
CRD—card type
GRP—trunk or data group ordinal
It returns GOOD to the calling procedure.

Program Description (1) Call FIND_NUM_CH( ) to determine total number of channels.

(2) Call FIND_NUM_FAIL_OOS_CH( ) to determine the number of failing and OOS channels.

(3) Call SEND_MSG( ) to send the result to the requesting node.

(4) Return(GOOD)

CHECK THRESHOLD ALARMS( )

Functional Description

This task is used to monitor the threshold alarms if the Failing Resource Table is modified, or after a restart. It makes sure there are no inconsistencies in the FRT.

Invocation Interface

This task is invoked from either THRESHOLD_ALARMS_CHECK( ), or INTEG_INIT( ). It terminates when it has completed.

This task uses a private stack. It is scheduled to run a priority 6.

Program Description (1) Call FRM_FIND_TA_CRD_TO UPDATE( ) to determine the next card type that needs to be updated by threshold alarms. If we did not find another card type to update, skip to step (8).

(2) Otherwise, call CHECK_THRESHOLDS( ) to determine if any major or minor thresholds have been violated.

(3) Call TA_UPDATE_FR_TABLE( ) to update the Failing Resource Table.

(4) Call TIME_SLICE( ) to take a break for a while.

(5) Call GET_CGRP( ) to determine if this is a line channel. If so, call CHECK_THRESHOLD( ) and TA_UPDATE_FR_TABLE( ) again, except this time for a data line. Unfortunately, we can not this special check.

(6) Call TIME_SLICE( ) again to make sure we don't hog the processor.

(7) Loop to step (1)

(8) When we get to this step, no modifications were made to the Failing Resource Table the last time we walked through it. Everything should be update. Set the PTCB_THRESHOLD to NULL, and call EXIT( ) to kill the task.

CHECK THRESHOLDS( )

Functional Description

This procedure is used to check if the amount of a resource that has failed is above a certain threshold. If either a major or minor threshold has been exceeded, the appropriate error is logged in the hardware error table.

Invocation Interface

This routine is called by _CHECK_THRESHOLD_ALARMS( )and has the following parameters:
CRD—card type
GRP—trunk or data group ordinal
It returns either GOOD or FAILED

Program Description (1) Call GET_CGRP_PERCENT( ) to determine if this card is to be monitored by actual number or percentage.

(2) Call GET_CGRP_GLOBORNOD( ) to determine if this card is to be monitored by node, or by system.

(3) If the resource is to be monitored globally, call REMOTE_CMMD( ) with a parameter of REMOTE_TOT_FAIL_OOS (to determine the number of total channels, and the number of failed channel for that resource).

(4) Otherwise, call FIND_NUM_FAIL_OOS_CH( ) to determine the number of channels that have failed for that card type.

(5) If the card type is to be monitored by percentage, call FIND_NUM_CH( ) to determine the number of channel that have failed for that card type.

(6) Calculate the percentage if appropriate.

(7) Call GET_MJ_MN_OOS_THRESH( ) to determine the major and minor thresholds t=for this card typ/trunk or data group.

(8) Determine if either of these thresholds have been exceeded.

(9) Call SI_REPORT_THRESH_ALARMS( ) to log and/or clear any threshold alarms that are applicable in the Hardware Error Table.

(10) If this resource is to be monitored globally, call REMOTE_CMMD( ) with the parameter REMOTE_LOGERR to update the other nodes.

(11) Call NEXT_TASK( ) to tkke a break

(12) Return to the calling procedure.

SI REPORT THRESH ALARMS( )

Functional Description

This routine is responsible for logging and clearing the threshold alarm entries in the Hardware Error Table.

Invocation Interface

This routine is called by CHECK_THRESHOLDS( ). It has the following parameters:
CRD—card type
GRP—trunk or data group ordinal
MJ—major alarm status
MN—minor alarm status
AMT—amount of the resource that has failed

Program Description (1) Call GET_CGRP( ) to get the card group for this card type.

(2) If it a line channel, set the card type for the error pocket to CR_LINE.

(3) If it is data port, set the card type for the error pocket CR_DATA.

(4) Call SI_REPORT_STATUS( ) twice. Once for the major alarm status, and once for the minor alarm status.

(5) If the major alarm status is FAILED, call SI_REPORT_STATUS with a passing result for the minor alarm to clear it from the Hardware Error Table.

(6) Return (GOOD).

TA UPDATE FR TABLE ( )

Functional Description

This routine updates the FRT for a given card type/trunk or data group.

Invocation Interface

This routine is called by _CHECK THRESHOLD_ALARMS( ). It has the following parameters:
CRD—card type
GRP—trunk or data group ordinal
It returns GOOD.

Program Description (1) Call FIND_FIRST_CRD_IN_GRP( ) for the card type. This task detemines the first card type in CRD's card group.
(2) While there are still cards left in this card group, keep going. Otherwise skip to step (8).
(3) Call FR_RECORD_FIND_FIRST( ) to find the first record in the FRT for this card type.
(4) Call FRM_TA_FIND_FR_UPDATE_COUNT( ) to determine if there are any more records to be updated for this card type. If not, loop to find the next card type in the card group.
(5) Call FR_RECORD_FINE_NEXT( ) before we may possibly delete the current one Of we would delete it first we would have no way to find the next record.
(6) If this record needs to be updated, call TA_UPDATE_FR_RECORD( ).
(7) Set the record to be look at to the one found two steps above. Loop to step (4)
(8) Call FIND_NEXT_CRD_IN_GRP( ) to determine the next card in the card group.
(9) Call TIME_SLICE( ) to take a break and not hog the processor. Loop to step (3)
(10) Return to the calling procedure.

FRM FIND TA CRD TO UPDATE( )

Functional Description

This routine determines if there are any entries in the Failing Resource Table that need to be updated by threshold alarms. If so, it returns the card type, and trunk or data group ordinal of that entry.

Invocation Interface

This routine is called by TA_UPDATE_FR_TABLE( ). It has the following parameters:
CARTY—card type (pointer to return data)
GRP—trunk or data group (pointer to return data)
It returns FAILED or GOOD.

Program Description (1) Determine if there are more card types to look at (i.e. The last one looked at was less that the largest one in the system). If there are more card types, and we haven't found one yet, continue. Otherwise, skip to step (7).
(2) Call FRM_TA_FIND_FR_UPDATE_COUNT( ) to determine if there are any FRT records that need to be updated for this card type.
(3) If there are records for this card type, call FR_RECORD_FIND_FIRST( ) to get the first record for this card type.
(4) If there are still records left for this card type, and we haven't found one that needs to be updated yet, continue. Otherwise, skip to step (7).
(5) If this record needs to be updated by threshold alarms, set the return data appropriately. Otherwise, call RE_RECORD_FIND_NEXT( ) to get the next FR record for this carry type.
(6) Loop to step (4).
(7) Return to the calling procedure.

TA UPDATE FR RECORD( )

Functional Description

This routine updates a record in the FR Table depending on its current status. It either updates it, or deletes it. It also takes care of logically updating the standby processor.

Invocation Interface

This routine is called by TA_UPDATE_FR_TABLE( ). It has the following parameters:
PREC—pointer to the FR record
This routine returns GOOD.

Program Description (1) If the record's status is TA_UPDATE_CLEAR, call LOGICAL_UPDATE( ) to update the standby side. We have to do this before we can delete the record. Then, call FR_RECORD_UPDATE( ) to delete the record on this side.
(2) If the record's status is TA_UPDATE_NEEDED, call FR_RECORD_UPDATE( ) and then LOGICAL_UPDATE( ).
(3) Return to the calling procedure.

FRM TA FIND FR UPDATE COUNT( )

Functional Description

This routine accesses the FR table, and retrieve the FR_UPDATE_COUNT for a given card type.

Invocation Interface

This routine is called by FRM_FIND_TA_CRD_TO_UPDATE( ). It has the following parameters:
CRD—card type
NUM_LEFT—the number of record to be updated (pointer to return data)
This routine returns GOOD.

Program Description (1) Set *NUM_LEFT to the FR_UPDATE_COUNT for this card type (i.e. FR_CR_LIST[CRD] FR_UPDATE_COUNT).
(2) Return to the calling procedure.

FRM TA IS CH FAIL OOS( )

Functional Description

This routine determines if a channel should be counted towards the failing channel total, and the OOS total. It first makes sure this channel is not to be deleted from the FR table. It then makes sure the trunk/data groups match as appropriate.

Invocation Interface

This routine is called by FIND_NUM_FAIL_OOS_CH( ). It has the following parameters:
PREC—pointer to the FR record GRP—trunk or data group ordinal
CH_FAILING—whether the channel should be counted as failing (pointer to return data)
CH_OOS—whether the channel should be counted as OOS (pointer to return data)
This routine returns GOOD.

Program Description (1) If the record's status is TA_UPDATE_CLEAR, do not count the channel. Skip to step (3).

(2) If the GRP parameter is NULL or matches the group in the record, set *CH_FAILING to TRUE. If the channel's state is OOS or PSD, set *CH_OOS to TRUE.

(3) Return to the calling procedure.

FIND FIRST CRD IN GRP( )

Functional Description

This routine returns the first card type in a given card type's card group.

Invocation Interface

This routine is called by TA_UPDATE_FR_TABLE( ). It has the following parameters:
CRD—card type
FIRTTCRD—Pointer to the first card type in CRD's card group (return data)

Program Description (1) Call FIND_GRP( ) to find the next card in the group starting with the first card in the system.
(2) Return to the calling procedure.

FIND NEXT CRD IN GRP( )

Functional Description

This routine finds the next card type in a card group. This is called by TA_UPDATE_FR_TABLE( ). It has the following parameters:
CRD—card type
NEXTCRD—pointer to the next card type in CRD's card group (return data)

Program Description (1) Set the starting card to CRD plus one.
(2) Call FIND_GRP( ) to find the next card in the group starting with the one directly after the card currently on.
(3) Return to the calling procedure.

FIND GRP( )

Functional Description

This routine finds the next card in the given card's group.

Invocation Interface

This routine is called by FIND_FIRST_CRD_IN_*GRP*( ) and *FIND*_NEXT_CRD_IN_GRP( ). It has the following parameters:
CRD—given card type
CRD_TO_START—card type to start looking at
NEXTCRD—pointer to the next card in the card group (return data)
This routine returns FAILED, GOOD, or NONE_LEFT.

Program Description (1) Call GET_CGRP( ) to determine the card group we are dealing with.

(2) If there are no more card types in the system, skip to step (6).

(3) Call GET_CGRP( ) for the card type that may be in this card group.

(4) If the card groups from steps (1) and (3) match, we have found the next card. Set the return data and return GOOD.

(5) Increment the next card to check and loop to step (2).

(6) Return NONE_LEFT.

GET CGRP( )

Functional Description

This routine finds the card group for a specific card type.

Invocation Interface

This routine is called by FIND_NUM_CH( ), GET_MJ_MN_OOS_THRESH( ), _CHECK_THRESHOLD_ALARMS( ), SI_REPORT_THRESH_ALARMS( ), FIND_GRP( ), GET_CGRP_THRESHS( ), GET_CGRP_GLOBOR-NOD( ), and GET_CGRP_PERCENT( ). It has the following parameters:
CRD—card type
GRP—trunk or data group ordinal
CRDGRP—pointer to the card group (return data)
This routine returns FAILED or GOOD.

Program Description (1) Make sure we have a valid card type (i.e. CRD←largest in system). If not, return FAILED.

(2) Set the card group to the group designated in the CARTY_TO_GRP array for this card.

(3) If the card group is an originating data port and data group ordinal is not NULL, set the card group to an answering data port.

(4) Return(GOOD)

GET CGRP THRESHS( )

Functional Description

This routine returns the non-configurable major, minor, and OOS thresholds for a given card type.

Invocation Interface

This routine is called by GET_MJ_MN_OOS_THRESH( ). It has the following parameters:
CRD—card type
GRP—trunk or data group ordinal
MAJOR—major threshold (pointer to return data)
MINOR—minor threshold (pointer to return data)
OOS—out of service threshold (pointer return data)
It returns GOOD or FAILED.

Program Description (1) Call GET_CGRP( ) to determine the card group for this card type.

(2) Get a pointer to the card group data base for this card group.

(3) Set the thresholds to the appropriate fields in the data base.

(4) Return to the calling procedure.

GET CGRP GLOBORNOD( )

Functional Description

This routine returns whether a card type is to be monitored by node, or by system.

Invocation Interface

This routine is called by CHECK_OOSTHRESH( ) and CHECK_THRESHOLDS( ). It has the following parameter:
CRD—card type
GRP—trunk or data group ordinal
GLOBORNOD—monitored globally or nodally (pointer to return data)
This routine returns GOOD or FAILED.
(1) Call GET_CGRP( ) to determine the card group for this card type.
(2) Get a pointer to the card group data base for this card group.
(3) Set the return data according to the value of the GLOBORNOD field in the data base.
(4) Return to the calling procedure.

GET CGRP PERCENT( )

Invocation Interface

This routine is called by CHECK_OOSTHRESH( ) and CHECK_THRESHOLDS( ). It will has the following parameters:
CRD—card type
GRP—trunk or data group
PERCENT—monitor by percentage or actual number (pointer to return data)
This routine returns GOOD or FAILED

Program Description (1) Call GET_CGRP( ) to determine the card group for this card type.
(2) Get a pointer to the card group data base for this card group.
(3) Set the return data according to the value of the PERCENT field in the data base.
(4) Return to the calling procedure.

CARD GROUP DATA STRUCTURES

Card Type to Card Group

The following structures maps a card type to its card group:

| | | |
|---|---|---|
| (A) | STRUCT CTOG (NIB CTOG_GRP); | |
| (B) | STRUCT CTOG CARTY_to GRP[NUMBER_OF_TYPES]( | |
| | NULL, | /? 0- expander |
| | NULL, | /? 1- coder |
| | NULL, | /? 2- Decoder |
| | CG_CONFBRG GRP, | /? 3- Conf. Bridge |
| | CG_TONGEN_GRP, | /? 4- Tone Generator |
| | NULL, | /? 5-AFACTS Super Card |
| | CG_ROTSEND_GRP, | /? 6- Rotary Sender |
| | CG_ROTREG GRP, | /? 7- Rotary Register |
| | CG_QDTMFREG_GRP, | /? 8- QDTMF Register |
| | CG_TRUNK_GRP, | /? 15 - 8UNIV_TRK |
| | CG_TRUNK_GRP | /? 16 - 8UNIV_TIE |
| | CG_TRUNK_GRP, | /? 17 - 4UNIV_TIE |
| | CG_LINE_GRP, | /? 33 - PRI |
| | CG_LINE_GRP, | /? 34 - 2nd RPI |
| | CG_DATA_GRP, | /? 35 - 3rd RPI |
| | CG_DATA_GRP, | /? 36 - 4th RPI |
| | CG_DFE_GRP, | /? 71 - DFE |
| | CG_TRUNK_GRP, | /? 168 - |
| | CR_TRUNK | |
| | ); | |

Functional Description

This routine determines if a card is to be monitored by percentage or actual number.

Card Group to Thresholds

This structure maps a card group to its thresholds.

| | | | | | |
|---|---|---|---|---|---|
| STRUCT CGRP | (Byte CGRP_MJTHRESH, | | | | |
| | CGRP_OOSTHRESH, | | | | |
| | CGRP_MNTHRESH, | | | | |
| | NIB CGRP_GLOBORNOD, | | | | |
| | BIT CGRP_PERCENT); | | | | |
| STRUCT CGRP CG_DB[NUMBER_OF_GRP_TYPES]( | | | | | |
| 51, | 50, | 26, | THRESH_NODAL, | TRUE, | /? CONFRBRG |
| 51, | 50, | 1, | THRESH_NODAL, | TRUE, | /? TONGEN |
| 51, | 50, | 26, | THRESH_NODAL, | TRUE, | /? ROTSEND |
| 51, | 50, | 26, | THRESH_NODAL, | TRUE, | /? ROTREG |
| 51, | 50, | 26, | THRESH_NODAL, | TRUE, | /? QDTMFREG |
| 51, | 100, | 1 | THRESH_NODAL, | TRUE, | /? DFE |
| 51, | 100, | 26, | THRESH_NODAL, | TRUE, | /? ADC |
| NL, | NL, | NL, | THRESH_GLOBAL, | TRUE, | /? TRUNKS |
| NL, | NL, | NL, | THRESH_GLOBAL, | TRUE, | /? ANSWR DATA |
| NL, | 20, | NL, | THRESH_NODAL, | FALSE, | /? LINES |
| NL, | 20, | NL, | THRESH_NODAL, | FALSE, | /? ORIG DATA |

-continued

);

NOTE:
NL is equivalent to a null value.

While the invention has been described in terms of a preferred embodiment in a specific operating system environment, those skilled in the art will recognize that the invention can be practiced, with modification, in other and different operating systems within the spirit and scope of the appended claims.

Having thus described our invention, what I claim as new and desire to secure by Letters Patent is set forth in the following claims:

1. A method to analyze errors in a system, the system having a plurality of resources with replaceable units, a display, a processor, and memory means for storing decision trees, data structures, threshold alarm tasks, failing resource manager tasks and error analysis tasks, the resources including a diagnostics card having a processor and memory means for storing resource analysis tasks, and communication resources, the method comprising the steps of:
    (a) testing said resources intermittently by said error analysis tasks invoking a card analysis task on said diagnostics card to test for an error in said communication resources in said system;
    (b) detecting an error and invoking an appropriate error analysis task to process said error;
    (c) processing said error by said appropriate error analysis task to isolate said error to a replaceable unit by automatically traversing said decision trees;
    (d) writing data to record said error in said data structures in said memory means of said system;
    (e) invoking said failing resource manager tasks to retest said replaceable unit;
    (f) invoking said threshold alarm tasks to determine an effect of removal of said replaceable unit on said system;
    (g) indicating to said failing resource manager tasks if said replaceable unit can be removed;
    (h) removing said replaceable unit from service if said retest detects said error and said threshold alarms tasks indication is favorable;
    (i) retesting said replaceable unit to detect a return to normal operation;
    (j) returning said replaceable unit to service if normal operation is determined; and
    (k) displaying a message based on said error on said display of said system.

2. The method of analyzing errors as recited in claim 1, wherein said step of automatically traversing said decision trees includes the step of:
    (a) identifying a particular decision tree to traverse based on a communication resource.

3. The method of analyzing errors as recited in claim 1 wherein said step of automatically traversing said decision trees includes the step of:
    (a) identifying additional decision trees to traverse to eliminate any failure other than said error in said replaceable unit.

4. The method of analyzing errors as recited in claim 1 wherein said step of automatically traversing said decision trees includes the steps of:
    (a) testing said communication resources in a predetermined sequence based on said error to draw a preliminary conclusion;
    (b) analyzing said preliminary conclusion;
    (c) performing an action comprising further testing and analyzing to refine said preliminary conclusion; and
    (d) terminating when said action reaches a final conclusion.

5. The method of analyzing errors as recited in claim 1 wherein said step of displaying a message based on said error on said display of said system comprises the steps of:
    (a) formatting said data into a natural language message; and
    (b) displaying said natural language message on said display.

6. The method of analyzing errors as recited in claim 5 further comprising the step of:
    (a) displaying a suggested action message on said display.

7. The method of analyzing errors as recited in claim 1 wherein said error analysis task is invoked manually.

8. The method of analyzing errors as recited in claim 1 further comprising the steps of:
    (a) calculating a number of said resources that have failed;
    (b) calculating a number of said resources that are out of service; and
    (c) comparing said number of resources that are out of service and said number of resources that have failed with a preselected threshold in said data structures of said memory of said system to determine an effect of removal of said replaceable unit on said system.

9. Apparatus for analyzing errors in a system having a plurality of communications resources with replaceable units, a display, a processor and memory means for storing data structures, decision trees, failing resource manager tasks and error analysis tasks comprising:
    (a) means for testing said plurality of communications resources by an error analysis task to detect an error in a communication resource in said system and generating a signal indicative of an error;
    (b) means for detecting said signal indicative of said error and invoking an appropriate error analysis task to diagnose said error;
    (c) means for isolating said error to said replaceable units by automatically traversing said decision trees;
    (d) means for writing data recording said error in said data structures in said memory means of said system;
    (e) means for invoking said failing resource manager tasks to retest said replaceable units;
    (f) means for invoking said threshold alarm tasks to determine an effect of removal of said replaceable unit on said system;
    (g) means for indicating to said failing resource manager tasks if said replaceable unit can be removed;
    (h) means for removing said replaceable unit from service if said retest detects said error and said threshold alarms tasks indication is favorable;
    (i) means for retesting said replaceable unit to detect normal operation;

(j) means for returning said replaceable unit to operation if normal operation is detected; and (k) means for displaying a message based on said error on said display of said system.

10. The apparatus for analyzing errors in a system as recited in claim 9 further comprising:

(a) means for identifying each of said decision trees that are appropriate to test said communication resource.

11. The apparatus for analyzing errors in a system as recited in claim 9 further comprising:

(a) means for identifying additional decision trees to traverse to eliminate any failure other than said error in said communication resource.

12. The apparatus for analyzing errors in a system as recited in claim 9 further comprising:

(a) means for providing a decision tree for each of said communication resources.

13. The apparatus for analyzing errors in a system as recited in claim 9 further comprising:

(a) means for testing said system in a predetermined sequence based on said error to draw a preliminary conclusion;

(b) means for analyzing said preliminary conclusion;

(c) means for performing an action comprising further testing and analyzing to refine said preliminary conclusion; and (d) means for terminating when said action reaches a final conclusion.

14. The apparatus for analyzing errors in a system as recited in claim 9 further comprising:

(a) means for formatting said data into a natural language message; and (b) displaying said natural language message on said display.

15. The apparatus for analyzing errors in a system as recited in claim 9 further comprising:

(a) means for displaying a suggested action message.

16. The apparatus for analyzing errors in a system as recited in claim 9 further comprising:

(a) means for manually invoking said error analysis task.

17. The apparatus for analyzing errors in a system as recited in claim 9 further comprising:

(a) means for calculating a number of said resources that have failed;

(b) means for calculating a number of said resources that are out of service; and (c) means for comparing said number of resources that are out of service and said number of resources that have failed with a preselected threshold in said data structures of said memory of said system to determine an effect of removal of said replaceable unit on said system.

* * * * *